United States Patent
Atkinson et al.

(10) Patent No.: US 10,468,053 B2
(45) Date of Patent: Nov. 5, 2019

(54) VERIFYING MESSAGES PROJECTED FROM AN INTELLIGENT AUDIBLE DEVICE

(71) Applicants: Paul Atkinson, Poway, CA (US); John Rilum, Tustin, CA (US); Edzer Huitema, Belmont, CA (US)

(72) Inventors: Paul Atkinson, Poway, CA (US); John Rilum, Tustin, CA (US); Edzer Huitema, Belmont, CA (US)

(73) Assignee: Chromera, Inc., Poway, CA (US)

( * ) Notice: Subject to any disclaimer, the term of this patent is extended or adjusted under 35 U.S.C. 154(b) by 36 days.

(21) Appl. No.: 15/668,482

(22) Filed: Aug. 3, 2017

(65) Prior Publication Data

US 2018/0233165 A1      Aug. 16, 2018

Related U.S. Application Data

(63) Continuation-in-part of application No. 15/368,622, filed on Dec. 4, 2016, now Pat. No. 10,078,977.

(60) Provisional application No. 62/370,376, filed on Aug. 3, 2016, provisional application No. 62/263,053, filed on Dec. 4, 2015, provisional application No. 62/341,768, filed on May 26, 2016, provisional application No. 62/365,108, filed on Jul. 21, 2016.

(51) Int. Cl.
| | |
|---|---|
| *G10L 25/69* | (2013.01) |
| *G08B 29/24* | (2006.01) |
| *G10L 13/04* | (2013.01) |
| *G10L 15/20* | (2006.01) |
| *G06F 3/16* | (2006.01) |
| *G08B 3/00* | (2006.01) |
| *H04R 29/00* | (2006.01) |

(52) U.S. Cl.
CPC .............. *G10L 25/69* (2013.01); *G06F 3/165* (2013.01); *G08B 3/00* (2013.01); *G08B 29/24* (2013.01); *G10L 13/043* (2013.01); *G10L 15/20* (2013.01); *H04R 29/007* (2013.01)

(58) Field of Classification Search
CPC ......... G08B 29/24; G08B 3/00; G10L 13/043; G10L 15/20; G10L 25/69; G06F 3/165; H04R 29/007
USPC ...................................................... 340/573.3
See application file for complete search history.

(56) References Cited

U.S. PATENT DOCUMENTS

| | | | |
|---|---|---|---|
| 6,982,640 B2 | 1/2006 | Lindsay | |
| 2002/0023020 A1 | 2/2002 | Kenyon | |
| 2004/0001553 A1* | 1/2004 | Steentra | ............... H04L 27/2602 375/260 |
| 2004/0162726 A1 | 8/2004 | Chang | |

(Continued)

OTHER PUBLICATIONS

Search Report for PCT/US17/45354 issued by the International Searching Authority for the PCT dated Nov. 27, 2017.

*Primary Examiner* — Tony O Davis

(57) ABSTRACT

An intelligent audible device is provided that is constructed to monitor for an event, such as actual or elapse time, or a sensor exceeding a threshold. Responsive to the event, a sound input transducer is activated, and an output sound signal representing an intended message is projected into the local environment by a sound output transducer. The sound input transducer captures the actual sound projected into the local environment. The captured actual sound is processed and compared to the output sound signal. In this way it may be confidently determined if the intended message was actually properly projected into the local environment.

49 Claims, 37 Drawing Sheets

(56) References Cited

U.S. PATENT DOCUMENTS

| | | | |
|---|---|---|---|
| 2007/0222624 A1* | 9/2007 | Eicken | A01K 15/021 340/573.3 |
| 2007/0299783 A1 | 12/2007 | Beenau et al. | |
| 2011/0050397 A1 | 3/2011 | Cova | |
| 2015/0033864 A1* | 2/2015 | Kumar | G01N 29/265 73/636 |
| 2015/0187234 A1 | 7/2015 | Atkinson | |

* cited by examiner

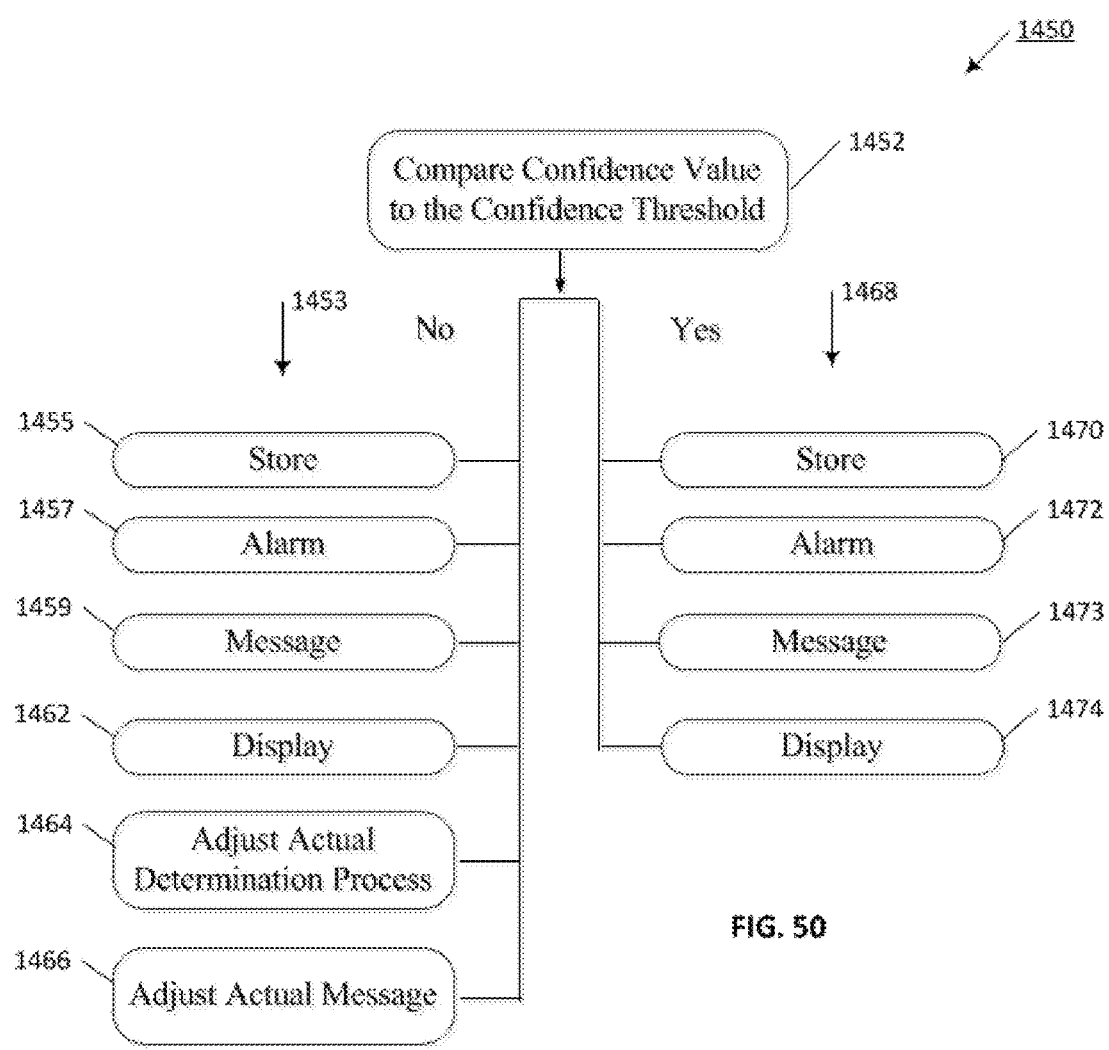

under the (US 10,468,053 B2) document header:

VERIFYING MESSAGES PROJECTED FROM AN INTELLIGENT AUDIBLE DEVICE

RELATED APPLICATIONS

This application claims priority to U.S. provisional patent application No. 62/370,376, filed Aug. 3, 2016 and entitled "Determining Audible Messages." This application is also a continuation-in-part to U.S. patent application Ser. No. 15/368,622, filed Dec. 4, 2016 and entitled "Optically Determining Messages on a Display," which claims priority to U.S. provisional patent application No. 62/263,053, filed Dec. 4, 2015 and entitled "Optically Determining Messages on a Display;" to U.S. provisional patent application No. 62/341,768, filed May 26, 2016 and entitled "Systems and Methods for Independently Determining Visible Messages on Intelligent Visual Devices;" and to U.S. provisional patent application No. 62/365,108, filed Jul. 21, 2016 and entitled "Devices, Systems, and Methods for Optical Detection of Visual Displays;" all of which are incorporated herein by reference as if set for in their entirety. This application is also related to U.S. patent application Ser. No. 14/927,098, filed Oct. 29, 2015 and entitled "Symbol Verification for an Intelligent Label Device," which is also incorporated herein as if set forth in its entirety.

FIELD OF THE INVENTION

The field of the present invention is the design, manufacture, and use of electronic audible systems with audible output and input devices. In some cases the audible system will include an electronic display, such as LCD, OLED, or electrophoretic displays.

BACKGROUND

In U.S. patent application Ser. No. 14/479,055, entitled "An Intelligent Label Device and Method," which is incorporated herein, a new intelligent label is described. An intelligent label is associated with a good, and includes one or more electro-optic devices that are used to report the condition of that good at selected points in the movement or usage of that good. These electro-optic devices provide immediate visual information regarding the good without need to interrogate or communicate with the electronics or processor on the intelligent label. In this way, anyone in the shipping or use chain for the good, including the end user consumer, can quickly understand whether the product is meeting shipping and quality standards. If a product fails to meet shipping or quality standards, the particular point where the product failed can be quickly and easily identified, and information can be used to assure the consumer remains safe, while providing essential information for improving the shipping process. It will be understood that the intelligent label may take many forms, such as a tag attached to the good, integrated into the packaging for the good, integrated into the good itself, or may even be an information area on a prepaid card for example. The intelligent label may also include, for example, print information regarding the good, usage or shipping rules, or address and coded information.

In a particular construction, the intelligent label includes a computer processor for managing the overall electronic and communication processes on the intelligent label. For example, the processor controls any RFID communication, as well as storage of information data. The processor also has a clock, which may be used to accurately identify when the good changed hands in the shipping chain, or when the good failed to meet a quality standard. In this regard, the intelligent label may also have one or more sensors that can detect a chemical or gaseous composition, optical, electrical or an environmental condition such as temperature, humidity, altitude, or vibration. If the processor determines that the sensor has a condition that exceeds the safe handling characteristics, then the processor may store information regarding the out-of-specification handling, and may take additional actions as necessary. For example, if the out-of-specification handling is minimal, the processor may cause an electro-optic device such as an electrochromic indicator or display to show a "caution" as to using the product. In another example, the processor may determine that the sensor has greatly exceeded the outer specification criteria, and cause an electro-optic indicator to show that the product is spoiled or otherwise unusable. Note that the term 'display' as used herein is to be understood to encompass indicators and other electro-optic devices capable of displaying visually perceptible states, data, information, patterns, images, shapes, symbols etc. which are collectively referred to herein as "messages".

Advantageously, the intelligent label provides a robust, trustworthy, easily usable system for tracking goods from a point of origin to delivery to the consumer. Importantly, the intelligent label provides important visual alerts, updates and information throughout the shipping process without the need for expensive communication, RFID, or interrogation equipment. Further, the intelligent label facilitates simple and reliable communication of shipping information from a consumer back to a manufacturer or seller, for example, for confirming warranty or replacement information. In this way, a shipping and delivery system having a high degree of trust, and resistance to fraud, is enabled.

A particularly difficult problem occurs when an intended message has been sent to the display for the intelligent label, and then something occurs, either external or internal to the good or label, that makes the message imperceptible to the reader, which can be a human or a machine. In this way, the intelligent label, and any network to which it communicates, has a record that a particular message was displayed to a reader at a particular time. However, due to some problem, the intended message could not be communicated to the reader. Accordingly, there is a need to detect what was actually displayed to a reader, and to do so in a reliable, compact, and cost efficient manner. It will be appreciated that the need for such message detection would be useful in many display applications other than the use of intelligent labels.

In a similar way, the intended message may be an audible message, such as an alarm or human recognizable message. Just as with the visual message, there presently is no way to confirm that an audible message was properly projected into a local environment. For example, an intelligent label may sound an alarm if a temperature threshold is exceeded. Presently, there is no way to verify that the alarm was actually projected into the local environment and perceptible.

SUMMARY OF THE INVENTION

A verifiable display is provided that enables the visual content of the display to be detected and confirmed in a variety of ambient lighting conditions, environments, and operational states. In particular, the verifiable display has a display layer that is capable of visually setting an intended message for human or machine reading, with the intended message being set using pixels. Depending on the operational condition of the display and the ambient light, for example, the message that is actually displayed and perceivable may vary from the intended message. To detect what message is actually displayed, a light detection layer in the verifiable display detects the illumination state of the pixels, and in that way is able to detect what message is actually being presented by the display layer.

An intelligent audible device is provided that is constructed to monitor for an event, such as actual or elapsed time, or a sensor exceeding a threshold. Responsive to the event, a sound input transducer is activated, and an output sound signal representing an intended message is projected into the local environment by a sound output transducer. The sound input transducer captures the actual sound projected into the local environment. The captured actual sound is processed and compared to the output sound signal. In this way it may be confidently determined if the intended message was actually properly projected into the local environment.

Advantageously, the verifiable display allows the automated and electronic detection of messages that were actually displayed, and with supporting circuitry and logic, may determine a level of perceptibility. With this information, decisions may be made regarding setting alarms, communicating warnings, or refreshing the intended message, for example. Further, an accurate electronic history of the actual messages may be saved for use in determining whether appropriate actions were taken responsive to the messages actually presented on the verifiable display.

BRIEF DESCRIPTION OF THE DRAWINGS

FIG. 50 is a flow chart of method of operating an intelligent audible device in accord with the present invention.

DETAILED DESCRIPTION

Figure 1:
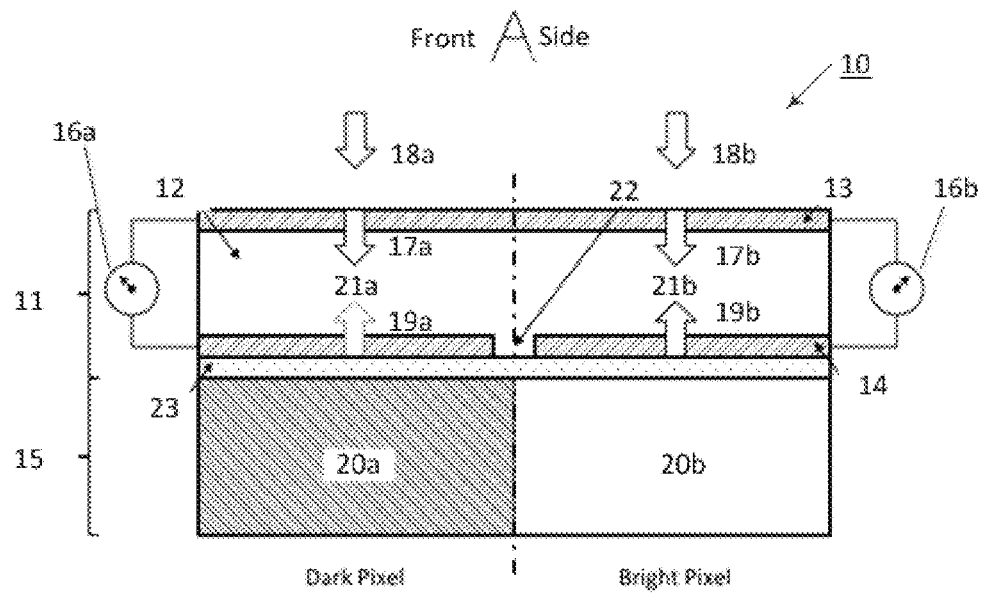
FIG. 1 is an illustration of a display in accord with the present invention.

Messages displayed by bi-stable displays such as electrophoretic displays manufactured by E Ink and certain LCDs (e.g., zenithal bistable and cholesteric) are to varying degrees stable without the continuous application of power. By design, they are however reversible and the displayed messages are therefore subject to accidental or intentional erasure or alteration. It can't be certain therefore whether the displayed information is as intended or otherwise determined (unlike irreversible displays such as those described in U.S. Pat. No. 9,030,724 B2).

Of particular interest here are reflective displays that are illuminated with ambient light and read from the same side in reflection. However, the example displays described herein can be extended to other types of displays including, but not limited to, transmissive, transreflective or emissive (e.g. back or front lit) configurations. The inventions described herein cover determination and verification systems for reflective electrophoretic and reflective bistable liquid crystal displays, however, they are also applicable to other types of bi-stable or multi-stable displays and to electro-optic displays in general.

For the purposes of these example descriptions, pixels are single addressable visual elements of the display. In some instances, a pixel may be a 'dot' and in others it maybe a shape such as a 'segment' used in the formation of a 'seven segment' alphanumeric display. Pixels may also be a variety of shapes, symbols or images that are determined by the surface areas of the electrodes used to signal them. A shape of course may be comprised of multiple pixels.

Note that in many applications such as intelligent labels, the density, variety and resolution of the displayed messages is not typical of that required for consumer electronics. As such the messages may be generated using comparatively large pixels in shapes optimized for messages appropriate for the application instead of arrays of much larger numbers of significantly smaller pixels.

As used herein, a message consists of the 'state' of one or more pixels. In a monochrome display for example, a pixel typically has at least two intended states, one each of two distinct colors (e.g. black and white) and depending on the display, a third state which is not one of the distinct colors (e.g., gray or semi-transparent).

The intended state of a pixel may be different from its actual displayed state however due to damage, hardware or software malfunction, loss of power, age, radiation, tampering, being subjected to environmental conditions outside of allowed operating or storage conditions, etc. By extension, an intended message also maybe different from the corresponding displayed message.

The visible state of pixels that make up a message (message pixels), and by extension the visible state of the displayed message, depends on available light (intensity, wavelengths etc.). The perceptibility of a visible message further may depend on other variables that affect its understandability or interpretability. The perceptibility of a message for example, may depend on the contrast between the pixels comprising a message and their areas surrounding them. The clarity and sharpness of the pixels, individually and in combination, may also impact the perceptibility of a message.

Accordingly, a message may have an intended display state, a visible state, and a perceptible state. The displayed state is the state of the message pixels independent of the available light. The displayed state of a message corresponds to what could have been visible to man or machine (observable, seen) if light was available. The visible state is the state of the message pixels visible (by man or machine) with available light. The visible state of a message corresponds to what could be observed (seen) with available light. The perceptible state is the state of a set of message pixels that is understandable or interpretable (by man or machine) with available light. The perceptible state of a message corresponds to what could be understood or interpreted with the available light.

Note that it may be advantageous to determine the states of pixels and messages independent of (without reference to) their intended state (if any). For example, it may be advantageous to know exactly what message was viewable or perceptible even if it wasn't the intended one.

Described herein are devices, methods and systems for verifying and determining displayed messages and their corresponding states, either by human or with automation. And further, for enabling transactions, analytics, monitoring conditions and outcomes, and managing outcomes based on access to, receipt of, and access to information that is verifiable, verified or enhanced by being a product of, a component of, or an outcome of such devices, methods or systems.

The terms 'verify' and 'determine' may sometimes be used herein interchangeably, particularly in the different context of the users' and systems' perspectives. From a system perspective for example, the term verify typically implies a comparison between a displayed message and a known dataset—e.g. an intended message. The term determine typically implies determining the displayed messages or patterns independent of an intended message. Reference data however may be used to make sense of the patterns. From the user's perspective, verify typically implies being able to confirm 'what' the user saw (or thought they saw) and was the basis of their decision or action.

A display device, as defined hereinafter, comprises a display layer and a light detection layer. Devices may also have a light source layer. These functional 'layers' may be configured in different ways and in different combinations depending in part on their respective reflective, transreflective or transmissive properties. They may also share common elements (e.g. common electrodes). The term 'layer' should be construed broadly to encompass configurations other than those where the functions ascribed to the terms above are literally layered. Of particular interest are configurations where the display layer, light detection layer and light source layer, as well as, the assembled device, are flexible. Devices however, and their components, may also be semi-rigid and rigid. Devices may also include electronics, methods and systems described herein.

The display layer displays the message and may be any of different types including, but not limited to, electrophoretic, liquid crystal, plasma, OLED, and electrochromic. Of particular interest are displays (display layers) that are bi-stable or irreversible. Display layers may be further distinguished in accordance with their ability to reflect/absorb or pass/block light. An example of the latter that is of particular interest are electrophoretic displays comprising transparent electrodes where the charged particles may be positioned so that in one state they block light from passing, and in a second state they are moved out of the light path, and allow light to pass.

A light detection layer is typically sized appropriately to detect/measure light associated with the state of the display pixels and optionally, other areas such as that for detecting/measuring ambient light. A light detection layer (photoactive sensor) can be made of photovoltaic materials, light harvesting proteins, or other photoactive compounds. Preferred photovoltaic materials include organic photovoltaic materials (OPV) for ease of roll-to-roll manufacturing and optical properties (e.g. high transparency).

An exemplary embodiment of a light detection layer consists of a transparent electrode layer of ITO, an organic photovoltaic material based on for example Poly 3-hexylthiophene (P3HT) and an electrode layer (transparent or non-transparent) such as ITO, PEDOT:PSS, graphene, a metal conductor (e.g. Al), or a combination thereof. Of particular interest are organic photovoltaic devices that are near transparent or semitransparent (see e.g. US Pub. No. US20140084266 "Semi-transparent, transparent, stacked and top-illuminated organic photovoltaic devices," and US20120186623 "Transparent Photovoltaic Cells," and U.S. Pat. No. 5,176,758 "Translucent Photovoltaic Sheet Materials and Panels"). Bacteriorhodopsin (see, e.g., "Photoelectric response of polarization sensitive bacteriorhodopsin films," Q. Li et al., Biosensors and Bioelectronics 19 (2004) 869-874, and included references) is a preferred light harvesting protein for the photoactive layer. In certain devices a light detection layer (e.g. photovoltaic photoactive sensor) also may serve a dual purpose and be used for message determination/verification and for energy harvesting.

In bistable liquid crystal display layers the pixel state corresponds to a change in the polarization of the light transmitting through the reflective display. This polarization change is in many configurations converted into a display reflectivity change by means of a linear polarization filter at the front (viewable) side of the display layer. Thus, as ambient light is typically randomly polarized, the maximum brightness of such a display, assuming an otherwise ideal display and polarizer, would be only ½ of that of a non-polarizing display. Furthermore, in the configuration illustrated in FIG. 1, a polarizing display layer 15 would also generate a smaller detected contrast ratio between bright and dark pixels in the light sensing layer 11. To first order and for an ideal polarizing liquid crystal display layer, the sensor (light sensing layer) would see 100% of the ambient light illuminating the sensor, for both bright and dark pixels, and 50% of the reflected light in a bright pixel (the other 50% is absorbed by the polarizer) versus 0% in a dark pixel, resulting in a maximum detected optical contrast ratio of 1.5:1 by the light sensing layer.

A display device may include a light source layer to improve the effectiveness and/or efficiency of light detection or measurement. The light source layer may be a thin film such as an OLED or transparent OLED (T-OLED) that generates light in the viewable area of the device. Alternatively the source of light in a light source layer may be outside the viewable area although the light is emitted in the viewable area. An exemplary embodiment of such a light source layer is an LED and a lightguide. Other techniques and processes are also know to one skilled in the art.

The light source layer is preferably optimized to emit light in wavelengths to which the light detection layer is most sensitive. For example, an LED that outputs light in a wavelength range of approximately 450-600 nm for a photovoltaic light detection layer consisting of P3HT. The light source layer and light detection layer may be optimized for, or intentionally limited to, wavelengths outside the visible light spectrum (e.g. to be machine but not human readable).

Figure 4:
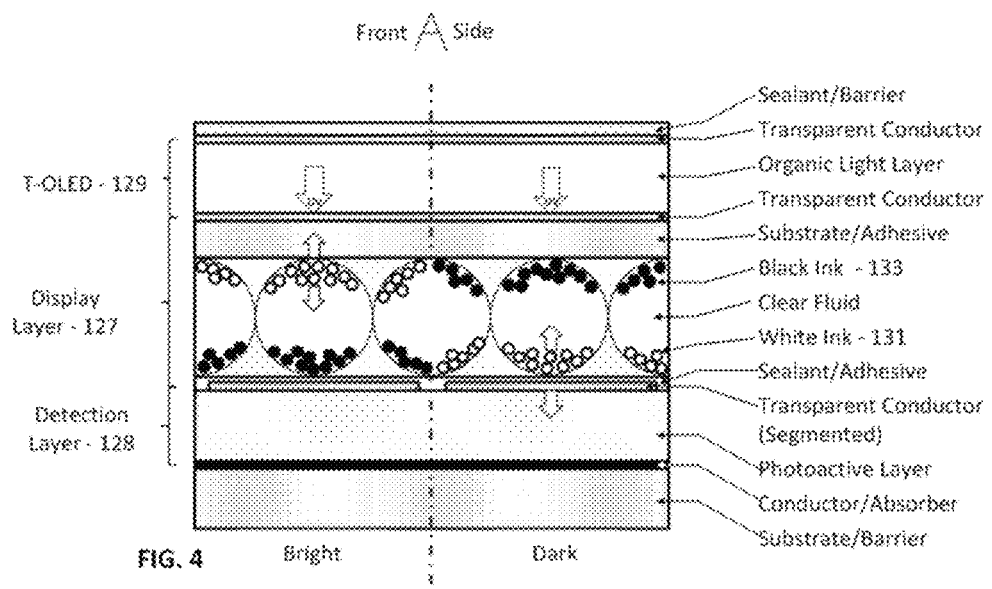
FIG. 4 is an illustration of a display in accord with the present invention.

The display layer also may be optimized to absorb/reflect/transmit particular wavelengths of light in conjunction with the light source layer and/or light detection layer to enhance performance (detection, measurement, visibility, power etc.). The ink particles in an electrophoretic display (or the fluid in which they are suspended) for example, may be colored or otherwise optimized for that purpose. An example of an electrophoretic display with ink particles possessing photoluminescence is shown in FIG. 4.

Display layers, light detection layers and light source layers require electrodes typically configured on the top and the bottom of each layer. Each electrode layer may be configured with multiple electrodes. Depending on the display layer, light detection layer, or light source layer one or both of the electrode layers may be patterned. The pattern determines the shape and addressability of the display pixels, detection pixels and less often, light source pixels (typically the light source consists of two non-patterned electrodes effectively creating a single light pixel or layer).

Depending on the configuration of the device (and its composite structure), one or both of the electrode layers may be a transparent conductor such as ITO and other transparent conductive oxide, PEDOT:PSS and other conductive polymers, nanoparticle inks etc.). Typically, the electrodes in the light detection layer are configured so that they are in electrical contact with the photovoltaic material. Similarly, electrodes in light source layers consisting of a photoactive layer in the viewing area (e.g. OLED or T-OLED) are typically in electrical contact with the photoactive layer.

The electrodes in the certain display layers however, may be positioned on the outward facing surfaces of the display (e.g. on the outward facing surface of a barrier film). In some device configurations, an electrode layer can be used in more than one of the display, light detection and light source layers. For example, a single non-patterned electrode layer may be used when setting the display message, and separately used when activating a T-OLED light source layer.

In another example, a single patterned electrode layer is used when setting the states of the display pixels and separately when sensing/measuring light via the detection pixels. In this case, the patterned electrode layer determines the shape, position and addressability of both the display pixels and the detection pixels. And importantly it assures they are near-perfectly aligned so that the reflected light from, or transmissive light through, one display pixel corresponds to that detected/measured by the appropriate (paired) light detection pixel.

Electrode layers (transparent or opaque, patterned or non-patterned) can be configured in a variety of ways and placed in contact with other layers of a device. This allows for simpler devices and considerable flexibility in manufacturing, particularly where different processes are involved (e.g. chemical etching, vapor deposition, printing etc.). In one example, a transparent electrode layer is applied to the surface of a lightguide that is then placed in contact with the surface of a display layer (e.g. a barrier film or adhesive layer without an electrode layer of its own). Depending on the overall design, the common electrode layer could be patterned or non-patterned.

Alternatively, a photovoltaic material is deposited directly on a transparent electrode layer previously deposited on a lightguide. A separate display layer with an outward facing patterned electrode layer could then be combined to create a device consisting of a display layer, a light detection layer, and a light source layer—and using only three electrode layers. In a variant of the previous example, the photovoltaic material is deposited directly on the outward facing transparent electrode layer on the barrier film of display layer to which a light guide with a transparent electrode layer is placed in contact.

To simplify the overall device design and manufacturing processes the display, light detection and light source layers may be separately manufactured and then combined. A shared common patterned electrode manufactured as part of either the display layer or the light detection layer for example would avoid alignment problems common to roll-to-roll manufacturing processes. Alternatively, the component layers that make-up the display layer, light detection layer and light source layer may be fabricated advantageously in part or in whole, directly onto adjacent device layers. Devices may incorporate light absorbing or light reflecting materials to enhance the performance of the light detecting layer and the light source layer.

Figure 3A:
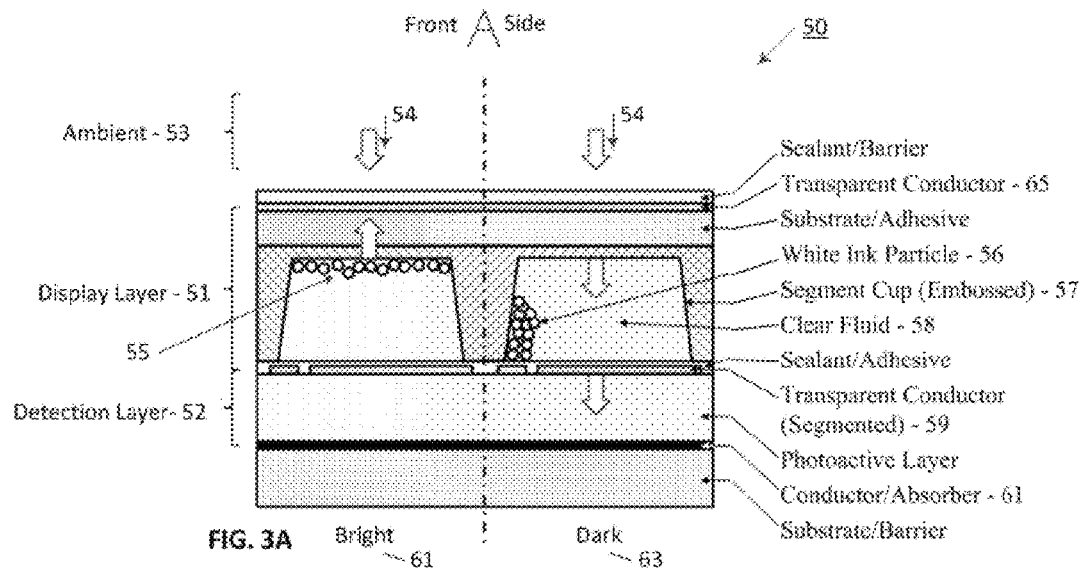
FIGS. 3A and 3B are illustrations of a display in accord with the present invention.

In an exemplary embodiment FIG. 3A, a display device 50 consists of display layer 51 and a light detection layer 52 where the light detection layer 52 is on the back side of the display layer 51, which front side 54 is facing the viewer and ambient light 53 impinges (if present). Further, the display layer 51 is of an electrophoretic micro-cup 57 configuration where each micro-cup 57 corresponds to a single pixel with charged and reflective particles of a single type suspended in a clear liquid 58 (shutter mode).

In a first state 61 the charged particles 55 are set along the viewable surface of the micro-cup 57 (through the application of a voltage across the front and appropriate back electrode of the display layer) thus blocking light from reaching the light detection layer. In a second state 63 the charged particles are moved to one side of the micro-cup 57 allowing light to pass through to the light detection layer 52. In the first state 61 the display pixel is reflective and from the viewer's perspective 'bright' compared to the second state 63. In the second state 63 the display pixel is largely transmissive as the ink particles 56 collect in a corner, and the light detection layer absorbs most of the light. From the viewer's perspective the display pixel appears comparatively 'dark'. The shutter mode of the display layer can also be implemented with other display technologies than that of electrophoretics including that of LCD technology.

Figure 3B:
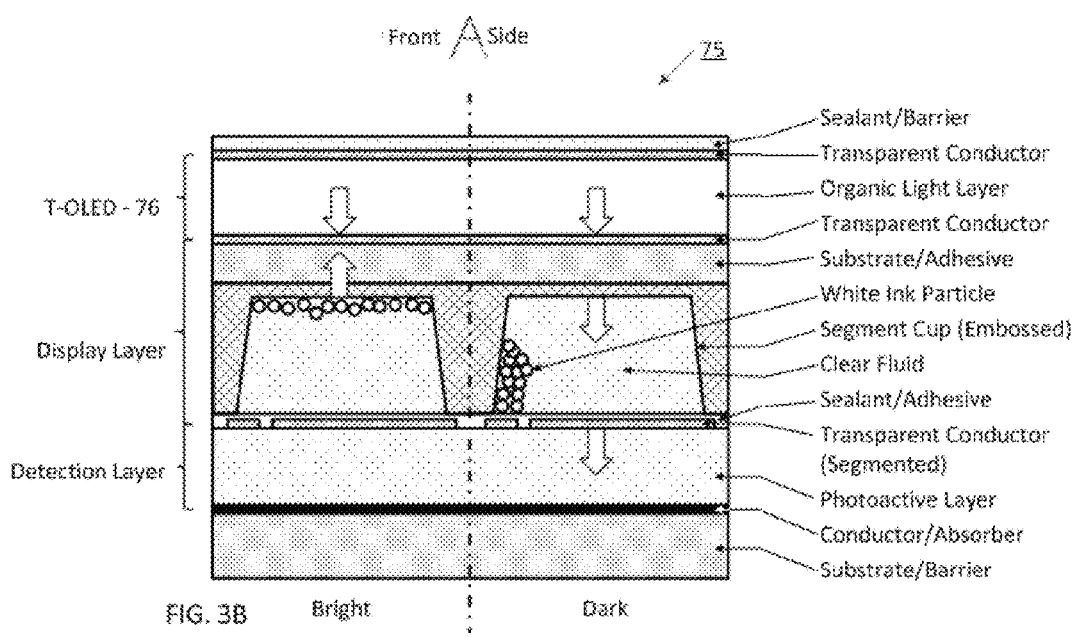

In a preferred embodiment, the color of the charged particle is chosen to maximize the reflectivity of visible light (e.g. 'white') and the composition of the light detection layer (top and bottom electrodes, photovoltaic materials) is chosen to absorb visible light. In configurations where the light detection layer is semitransparent, a light-absorbing material (which may be part of or separate from and behind the back electrode 61 of the light detection layer) may be incorporated to maximize the absorption (or reflectivity in combination with light absorbing ink particles). FIG. 3B shows the device 75 similar to the device 50 of 3A but with the addition of a T-OLED 76 light source layer. For pixels with high aspect ratios, in which the vertical to lateral dimensional ratio of the pixels is high, it is further advantageous to directionalize the typically Lambertian distribution of the OLED emission to minimize any lateral crosstalk from adjacent pixel illumination consequently reducing state detection contrast. For instance, by employing external films to the OLED, adding microstructures or diffractive optical elements, the normal incident directionality can be enhanced to reduce such crosstalk.

Electronics may be integral, proximate or local to a device (or devices), distributed or remote and advantageously include a processor and circuits for receiving signals from the light detection layer, for transmitting signals to the display layer or light source layer. The communications or signaling may be by electrical connection or wireless.

The processor may be a microprocessor, and in some cases may be an embedded RFID or other purpose built (fit for use) processor. The processor may also include signal processing units for improved efficiency in processing received signals. Such a signal processing unit may be useful for more efficient determination of messages or patterns, for verifying messages, for determining states of a message, and for determining displayed, visual, and perceptible states. The processor may also be used for monitoring conditions, for example absolute timing or elapsed timing, or for receiving inputs from environmental sensors. In this way, the processor will provide conditional rules for making decisions as to what may be displayed, and possibly what level of perception is needed for the particular environment. Also, the electronics may include memory for storing messages, and processes for determining a subset of critical messages to store to save power and memory space. Electronics may also include various clocks, timers, sensors, antennas, transmitters, and receivers as needed. For particular applications the communication paths may also include encryption and decryption capability. The device may be powered locally by a battery or a capacitor, and may have energy harvesting systems such as RF, optical, thermal, mechanical, or solar. A device may further have of a switch, button, toggle or control for scrolling or switching between multiple messages on the same screen.

Methods and systems for verifying a displayed message with an intended message and for determining the message (or displayed patterns) and associated message state independent of an intended message, with electrical signals corresponding to electrical properties of display pixels are described in U.S. provisional patent application Ser. No. 14/927,098, entitled "Symbol Verification for an Intelligent Label Device."

Those methods and systems may be used with electrical signals that correspond to the optical states of display pixels that correspond to reflected and/or transmitted light that corresponds to the state of display pixels; wavelengths of reflected and/or transmissive light that corresponds to the state of display pixels; or polarization of reflected and/or transmitted light that corresponds to the state of display pixels. Those methods and systems may further use measures of ambient light and/or light emitted by a light source layer (e.g. reference pixels, calibrated measurements). Those methods and systems may use electrical signals corresponding to the optical states of display pixels with and without ambient light, pre and post activation of a light source layer or different combinations thereof.

Importantly, and especially in the case of display layers with limited message stability, electrical signals corresponding to the optical states of display pixels are preferably stored along with the time or period the measurements are taken. As with electrical measurements of the electrical properties of display pixels, optical measurements can be initiated in response to events such as the setting message pixels, time, change in monitored/detected condition, absolute or elapsed time, external signal (e.g. electrical, RF, human and machine readable light etc.) etc. Similarly, the light source layer can be activated in response to a variety of 'events' and as appropriate precede or follow the setting of message pixels.

In one exemplary embodiment, an event first initiates a measurement of ambient light to determine if it is sufficient to effectively detect/measure the optical states of the message pixels. If the ambient light is insufficient (or uncertain), then the light source layer is activated and the optical measurements taken. Further, the output of the light source layer may be regulated in response to the level and composition of the ambient light. In some applications, the light source layer may be activated (e.g. flash) to alert users to a changed condition that warrants their attention (and in low light environments allows them to see an appropriate message). The detection signals from the light detection layer may be compensated for (e.g., through a calibration procedure) temperature (e.g. the conductivity of many organic polymers increase with higher temperature), supply voltage variation, detector dark current, average ambient light level, uneven light source distribution, pixel or segment size, manufacturing defects, etc. This allows for a more precise determination of the optical state of the pixel/segment (consequently allowing, for example, for detection of smaller pixels or more grey levels). In some preferred embodiments the calibration procedure may involve pixels (e.g. stable black and stable white reference pixels) outside of the active display area which may or may not be shielded from receiving any ambient light. In some embodiments a set of messages may be displayed in a series, randomly, pseudo randomly, in response to user control (e.g. by scrolling through them) etc. In such embodiments the displayed messages and their states may be individually verified or as a set. In the case of user control, the user inputs and timing may be recorded along with the verification data to encourage users to view/perceive the complete message set.

The results of message verification (e.g. of a displayed message to an intended message) can be used to trigger a separate viewable message independent of the first/primary message. The second/separate message for example could alert the user as to uncertainty regarding to the accuracy, visibility, perceptibility etc. of the primary message despite it being sensible. Preferably this "state of the message", message would be simple and thus robust, reliable and serve to alert the viewer as to a fault with, or uncertainty in regards to, the primary message.

Meta systems receive data from devices/electronics/methods/systems (collectively "device data") capable of verifying displayed messages (e.g. electrically or optically) and combine/use it with data from other sources to transact, analyze, monitor, etc. items, events and outcomes. Knowing that messages (and patterns) can be, or have been, verified/determined increases participation and proper usage, and confidence in the data, outcomes and meta systems. Meta systems typically involve data from multiple, often independent, parties. Some meta systems are typically centered on the item to which the device is attached and associated events or monitored conditions. An insurance or payment system for example may use device data received from the buyer (condition of an item), the seller (customer information) and shipper information (time of delivery). Other meta systems are typically centered on outcomes from the human (or machine) use of device data (as well as the device data itself). Meta systems for example, can analyze the impact of human (or machine) usage of device data of outcomes. Meta systems can help identify device or system failures vs. those of humans, whether they have been tampered and appropriately 'localized' (e.g. messages displayed in languages and date format appropriate to the location, custodian or user).

The outcomes (results) of a clinical trial for example, may depend on displayed messages being not only correct but also used correctly by healthcare professionals and participants. A meta system may therefore analyze outcomes of a clinical trial (e.g. marginal efficacy, adverse reaction etc.) with "action data" (human or machine actions in response to device data) as well as received device data.

The financial performance of a grocer for example may depend on messages as to the state of perishable foods (e.g. as ordered/acceptable, not as ordered/unacceptable or not as ordered, but acceptable at discount) being correct, perceptible etc. and appropriately used (e.g. accept, reject or request a discount). A meta system may therefore analyze outcomes such as sales, cost of goods sold, shrinkage or profit figures with action data (rejected shipments or discounts requested) as well as received device data. The meta system may further analyze outcomes involving suppliers (e.g. shipment condition over time, discounts issued etc.) in context of received device data.

In an exemplary display device 10, shown in FIG. 1, a detector layer or photoactive thin film sensor 11 consisting of a light sensitive layer 12 sandwiched between two transparent conductive layers, a front layer 13 respectively back layer 14. This photoactive thin film sensor is inserted on the front (i.e., readout side) of a reflective display 15. The light sensitive layer, or photoactive layer, may consist of a single compound or many layers, in order to provide an electrical signal (16a, 16b), e.g., a voltage differential, between the respective transparent conductive layers, when ambient light (18a, 18b) impinges onto the photoactive sensor system. In the configuration shown in FIG. 1, the electrical signal is dependent on not only on the ambient lighting (18a, 18b) conditions (intensity over the visible and/or invisible part of the electromagnetic spectrum), but also on the amount of light reflected back from the reflective underlying display pixel (19a, 19b). In effect, the ambient light (17a, 17b) passing through the front electrode 13 will act as an electrical bias on the detected electrical (16a, 16b) originating from the display pixel. This electrical signal (16a, 16b) can, in a similar way to that of the electrophoretic display described above, be used to verify the state of the display, preferably by first subtracting out the electrical bias signal. In the example illustrated in FIG. 1, the reflective display layer 15 has two pixels, one dark 20a and one bright 20b, with corresponding sensor pixels (21a, 21b). A proper separation 22 between the electrode layer 14 of the sensing pixels must be provided in at least one of the transparent layers (e.g. through gaps), i.e. 14 or 13, in order to measure the states of the desired pixels of the bistable display. The detector layer (photoactive film sensor) 11 can be fabricated with proper alignment directly onto the reflective display layer 15 or onto a supporting carrier film 23 for subsequent transfer onto the display. Many of the examples/illustrations described thus far presume that at least one of transparent electrodes (e.g. 33 in FIG. 2) that drive the display layer (e.g. the photoactive material 12 in FIG. 1 or 31 in FIG. 2) are on the surface of the substrate opposite that facing the display material (e.g. 38 in FIG. 2). It will be appreciated that there may also be a transparent electrode facing the display material. E.g. the carrier film 23 may have patterned ITO on both sides, each aligned to the other.

The photoactive layer in the above configurations can be made of photovoltaic materials, light harvesting proteins, or other photoactive compounds. Preferred photovoltaic materials include organic photovoltaic materials (OPV) for ease of roll-to-roll manufacturing and with optical properties of high transparency (for configurations shown in FIGS. 1 and 2) to minimize the impact of the display readability. Of particular interest are organic photovoltaic devices that are near transparent or semitransparent developed primarily for automotive and building window applications (see e.g. US Pub. No. US20140084266 "Semi-transparent, transparent, stacked and top-illuminated organic photovoltaic devices," and US20120186623 "Transparent Photovoltaic Cells," and U.S. Pat. No. 5,176,758 "Translucent Photovoltaic Sheet Materials and Panels"). Bacteriorhodopsin (see, e.g., "Photoelectric response of polarization sensitive bacteriorhodopsin films," Q. Li et al., Biosensors and Bioelectronics 19 (2004) 869-874, and included references) is a preferred light harvesting protein for the photoactive layer.

Figure 2:
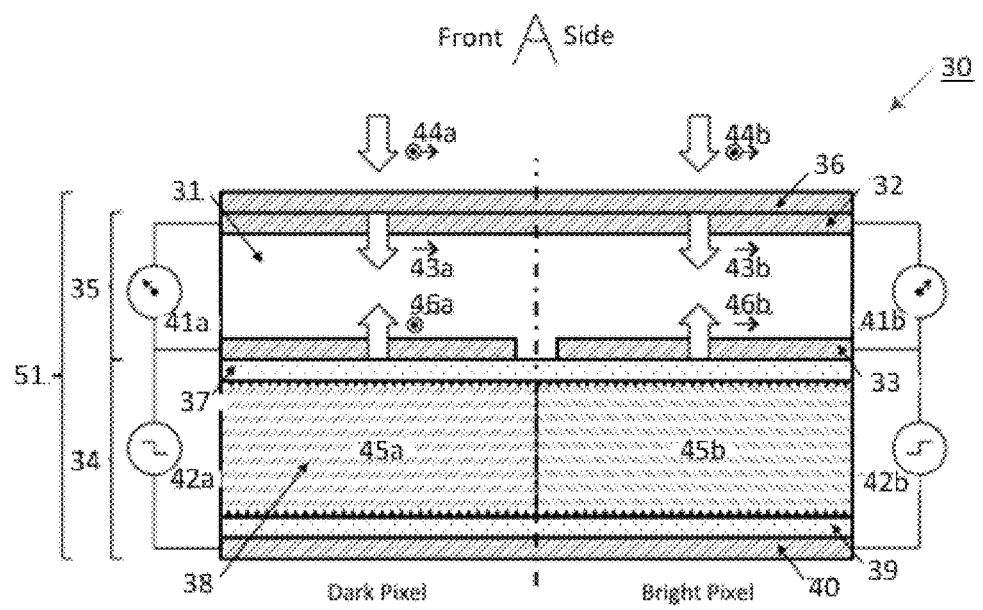
FIG. 2 is an illustration of a display in accord with the present invention.

In an exemplary display device 30, illustrated in FIG. 2, the photoactive layer 31 of the light detection layer 35, sandwiched between its front 32 and back 33 electrodes, is polarization sensitive and integrated with the polarizing display layer 34. The polarization sensitive photoactive sensor (light detection layer) 35 is inserted between the polarizer 36 and the front alignment layer 37 (typically glass or polymer film) of the bistable liquid crystal display layer 34. A typical reflective bistable liquid display layer also includes the liquid crystal layer itself 38, a back alignment layer 39 and a reflector 40, which also acts at the back electrode. However, depending on the configuration it may also include additional layers, such as a quarter-wave plate and an additional back polarizer (not shown for simplicity). Furthermore, as shown in FIG. 2, the pixelated back transparent conductor layer 33 for the sensor signal (41a, 41b), also acts as the pixelated front electrode of the display and is used for the display switching signal (42a, 42b), thus eliminating one transparent conductive layer in the (integrated sensor) display device 51 (or 30). In this configuration, with an ideal polarizing liquid crystal display and an in-plane-only polarization sensitive sensor, the sensor would see 50% (43a, 43b) of the ambient light (44a, 44b) illuminating the sensor (the other 50% is absorbed by the polarizer), for both a dark (45a) and a bright pixel (45b), and 0% of the reflected light in a dark pixel (46a) due to liquid crystal induced orthogonal polarization versus 50% in a bright pixel (46b), resulting in a maximum optical sensing contrast ratio of 2:1. The polarization sensitive film 31 maybe made from incorporation of nanowire or nano-tube technology, or by preferentially photochemically bleaching of bacteriorhodopsin (see, e.g., "Photoelectric response of polarization sensitive bacteriorhodopsin films," Q. Li et al., Biosensors and Bioelectronics 19 (2004) 869-874).

In this exemplary display 50, illustrated in FIG. 3A, the light detection layer 52 is located behind a bistable electrophoretic display layer 51. The electrophoretic display 51 illustrated contains visibly white ink particles (55, 56) in a clear fluid 58 contained in a segmented microcup 57 configuration. In a first state 61, corresponding to a bright segment from the viewing side 54, the white ink particles 55 are distributed at the front surface of the microcup 57 after applying an appropriate switching voltage to the electrodes 59 and front transparent conductor 65 of the display layer 51. In this state 61, the ambient light is reflected by the white ink particles 55 (creating a bright viewable segment) and largely blocked from going through the segment cup 57 and reaching the light detection layer 52. In the second state 63, corresponding to a viewable dark segment, the white ink particles 56 are displaced to a smaller lateral region at the side and toward the back of the segment cup 57 after applying an appropriate switching voltage to a smaller area-sized electrode 59 in the back and the front transparent conductor 65 of the display layer 51. In this mode most of the ambient light passes through the microcup cell 57 and further onto the light detection layer 52. A visible light absorbing conductor 61 is preferred on the back of the light detection layer 52, in order to yield a higher contrast of the displayed message. In this configuration the light detection layer 52 is exposed to the complementary light level of the segment state as compared to that viewable by the observer of the display.

In the exemplary display service, illustrated in FIG. 3B, a device 75 similar to the device 50 of FIG. 3A is shown. An integral light source layer 76 (e.g., as illustrated here: T-OLED) advantageously with normal incidence emission directionality, is added to the front face of the device configuration. The integral light source layer 76 allows for increased detection levels at the light detection layer and ability to discriminate between the states of the display. This exemplary configuration is preferred when the state detection takes place under low ambient lighting conditions or in a dark environment.

In the exemplary display device 125, illustrated in FIG. 4, a display is shown similar to devices of FIG. 3A/B, previously described, so only the differences will be highlighted. In device 125, an electrophoretic display layer 127 comprising a two ink particle system with the light source layer 129 emitting a shorter wavelength (e.g., UV illumination) and first ink particles 131 (e.g. visibly white) possessing a photoluminescent property in which the first ink particles 131 emit a longer wavelength(s) (e.g. in the visible spectrum) when subjected to the illumination of the light source layer through phosphorescence or fluorescence. This longer wavelength can further be used to illuminate the display layer 127 (front or back) and enhance the detection by the light detection layer 128. When illuminated from the front and detected from the back of the display as shown in FIG. 4, it may be advantageous to also select the second ink particles 133 (e.g., visibly black) to also transmit the shorter wavelength (e.g., UV) of the light source layer 129 such that the illumination can pass through the second ink particle layer 133 in order to reach the first ink particle 131 layer further allowing for the longer wavelength radiated light to be detected.

Figure 5:
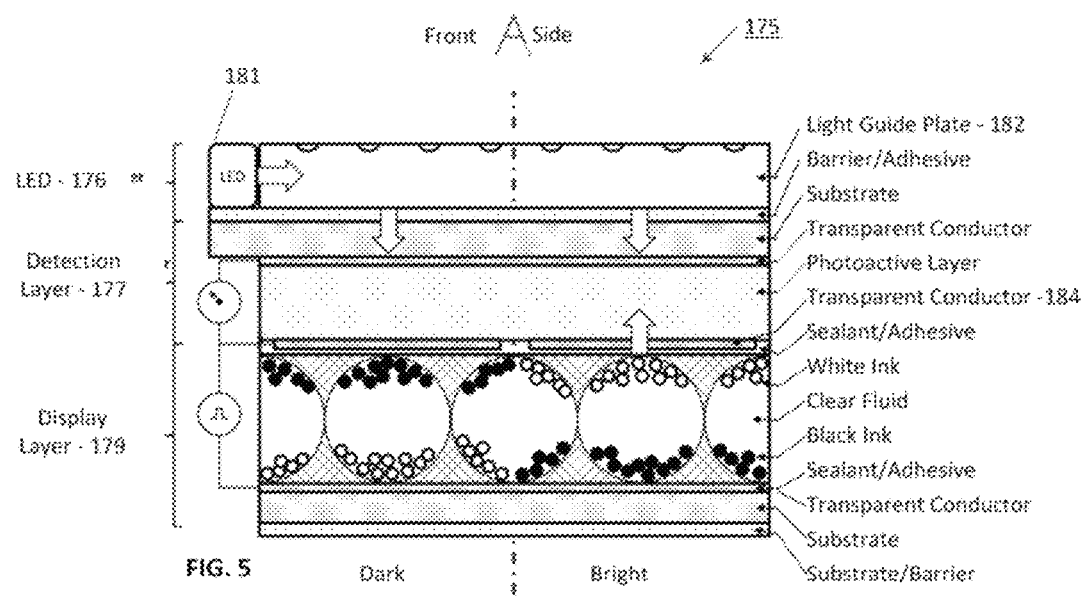
FIG. 5 is an illustration of a display in accord with the present invention.

In the exemplary device, illustrated in FIG. 5, a display device 175 is shown similar to the devices of FIGS. 3A/B and 4, previously described, so only the differences will be highlighted. In display device 175, both the light source layer 176 and the light detection layer 177 are situated in front of the display 179 (here illustrated as a microencapsulated electrophoretic display). This configuration allows for optical state detection, with or without the presence of ambient light, from the same side as the observer, and is particularly favorable for reflective displays that do not have a complementary optical state detection capability from the back side of the display. The exemplary light source layer 176 illustrated consists of an LED 181 edge-lit light guide plate 182 (see e.g. Planetech International or FLEx Lighting), which redirects and distributes the light from the LED towards the display layer 179. This particular configuration also allows the light source layer 176 to aid the observer in viewing the display under dark ambient lighting conditions.

However, it should be noted that this front lit configuration also induces undesirable bias light (independent of the display state) onto the light detection layer 177. Furthermore, both the light source layer 176 and the light detection layer 177 must provide significant optical transmission as to not significantly deteriorate the brightness and contrast of the observed display. As in other configurations, the segmented (or patterned) transparent conductor 184 can favorably both be used to switch the state of the display segment, as well as, to determine the state of the corresponding segment by the light detection layer.

Figure 6:
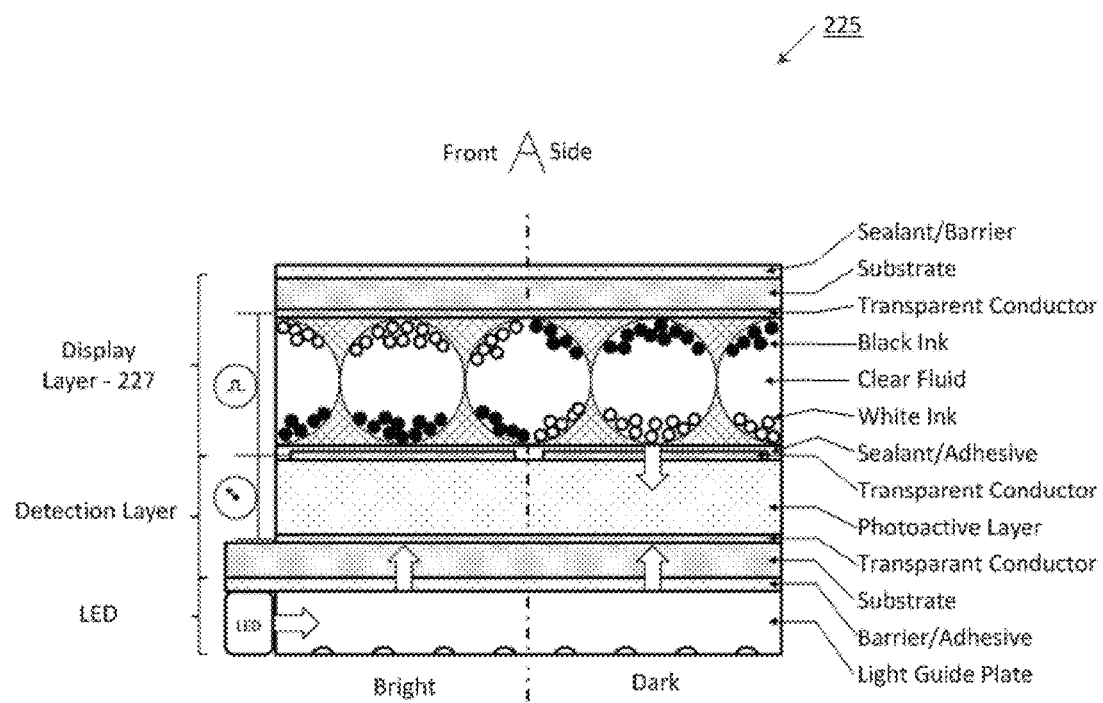
FIG. 6 is an illustration of a display in accord with the present invention.

In the exemplary device, illustrated in FIG. 6, a display device 225 is shown similar to the devices of FIGS. 3A/B, 4 and 5, previously described, so only the differences will be highlighted. Device 225 has reverse stack configuration as compared to that in FIG. 5, and is shown with a two particle microencapsulated electrophoretic display layer 227. By using complementary optical state detection from the back side of the display, the display performance, including brightness and contrast, from the viewer side is uncompromised. Additionally, the common segmented transparent conductor is on the back side of the display further improving the displayed message, by reducing any potential visual ghosting effects from the (non-ideal) transmission of the conductor.

Figure 7A:
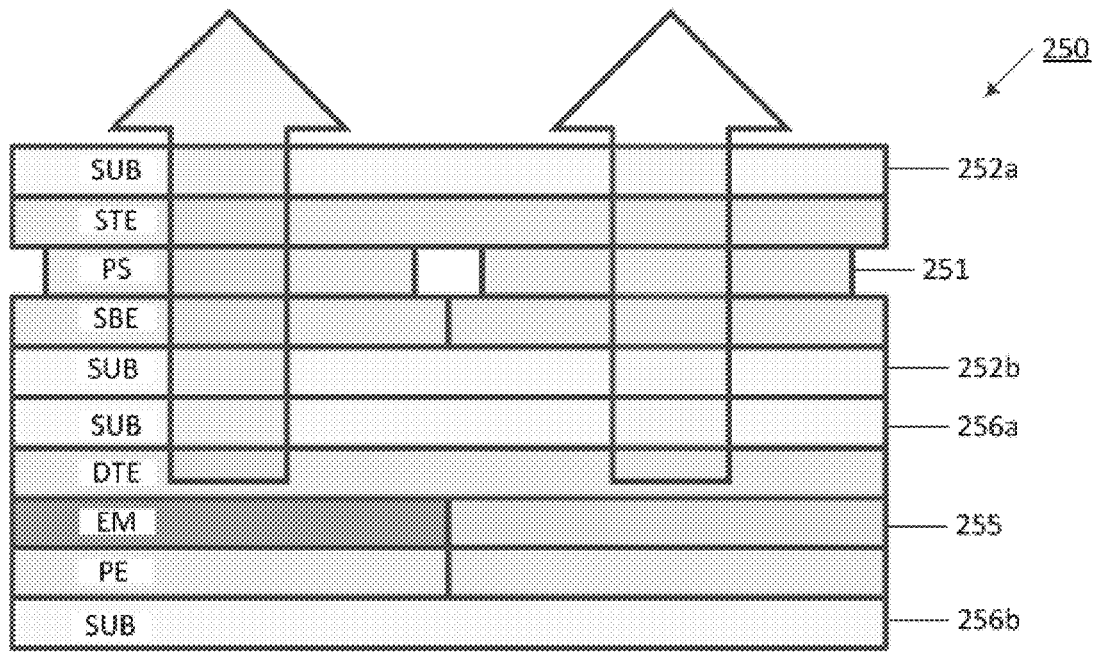
FIG. 7A is a diagram of an emissive display with the photosensitive detector in front of display in accord with the present invention.
Figure 7B:
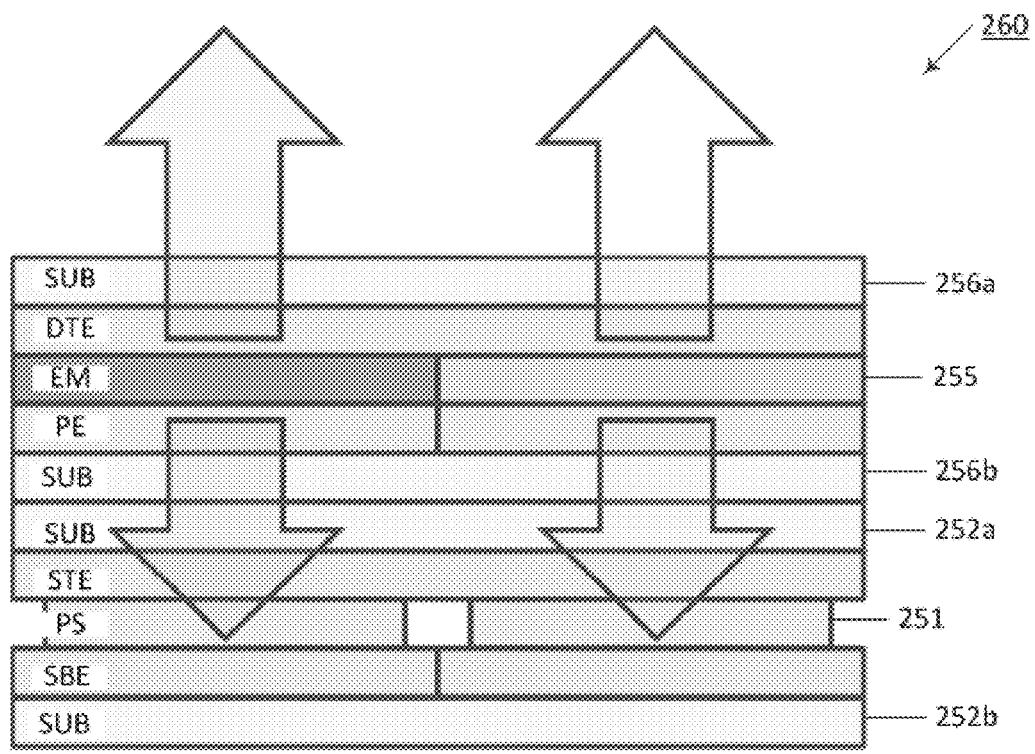
FIG. 7B is a diagram of an emissive display with the photosensitive detector behind the display in accord with the present invention.
Figure 8:
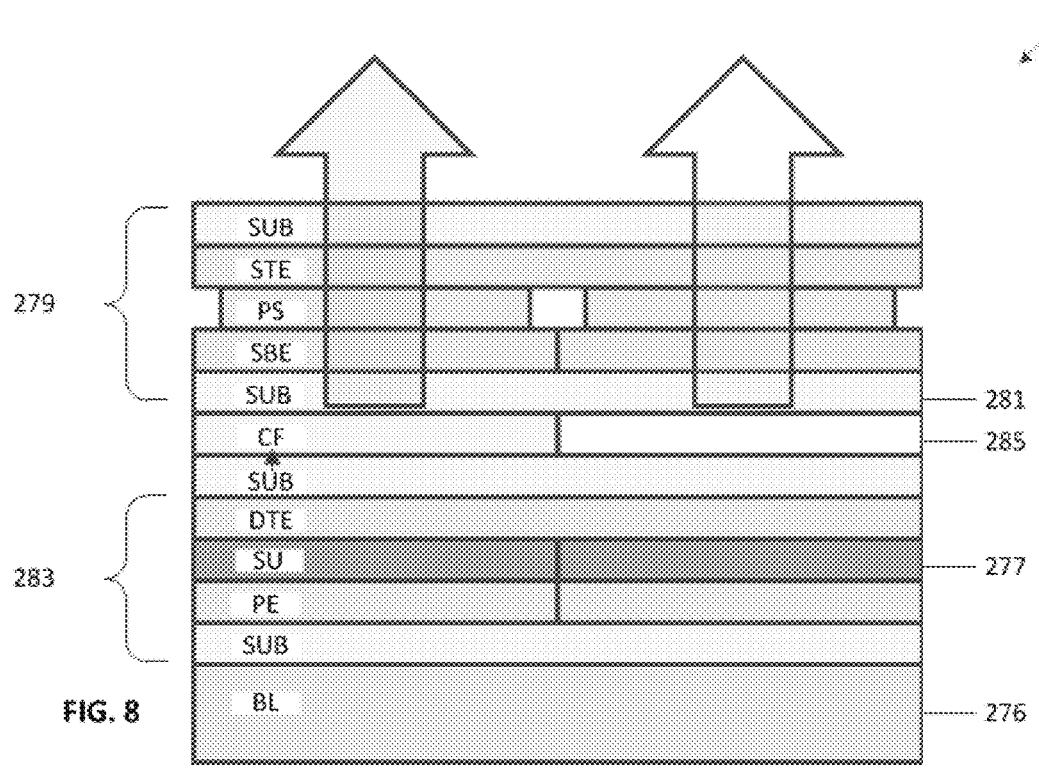
FIG. 8 is a diagram of an emissive display using a backlight and a shutter, like an LC layer with the detector placed on top of the display in accord with the present invention.

FIGS. 7A and 7B show two configurations for an emissive display device 250 with a photosensitive detector 251. Detector 251 has the same general structures as already discussed with reference to FIGS. 3-6, so will not be discussed in detail in this section. Detector 251 and display layer 255 both have their own top and bottom substrates, 252a/b and 256a/b respectively, but it is also possible that they share a substrate or are even integrated without a substrate separating the two. In FIG. 7A, configuration 250 shows the detector layer 251 configured in front of the display layer 255. As will be understood, the top of device 250 is the front side that is positioned toward a viewer, and the bottom of the device 250 is the back side that is positioned away from a viewer. In FIG. 7B, configuration 260 uses the fact that emissive displays in general emit light in both directions. By placing the detector 251 under the display 255 the back emission is detected. The amount of back emission can be tuned by the reflectivity of the back electrode of the emissive display. The additional advantage of this configuration is that the sensor receives less ambient light. The abbreviations in FIGS. 7A, 7B and 8 are defined as follows: SUB (substrate); DTE (Display Top Electrode); EM (Emissive Layer); PE (Pixel Electrodes); STE (Sensor Top Electrode); PS (Photo Sensitive Layer); CF (Color Filter); SU (Shutter); BL (Backlight); and SBE (Sensor Bottom Electrode).

FIG. 8 shows an exemplary embodiment of a display device 275 with a backlight 276, a shutter 277 (for example an LC layer with polarizers) and a front detector 279. The middle substrate 281 can again be shared, or the detector 279 and the display 283 can even integrated without a separating substrate and the color filter 285 is optional.

The exemplary embodiments of display devices 250, 260, and 275 require power in order to show the image. An intelligent label that is directly connected to a large power source or to the power grid could operate continuously or for extended periods of time. This could be possible in for example a store setting where the intelligent label is showing the price of an item. The intelligent label can be continuously powered in that case and can show the information continuously. The exemplary embodiments make it possible to also continuously verify if the information is displayed correctly or verify this whenever needed.

An intelligent label may have an actuator that activates the display temporarily from time to time responsive to an activation signal, for example a signal from an environmental sensor. The sensor could be a proximity sensor, an (IR) movement sensor, a push button, a touch interface, a bend sensor (strain gage), a microphone or an accelerometer, etc. The message actuator ensures that the display is mostly off in order to conserve power. The display could be activated for a certain amount of time or until the sensor does not detect movement, touch, finger push or bending (movement) or sound for a certain amount of time. Detecting the state of the display now becomes more energy efficient, as the display is only on for certain short periods of time. Detecting the state just at the start of an activation period may be sufficient, instead of detecting the state of the display at various moments in time for a permanent (bistable) display as used in selected other embodiments.

Figure 9:
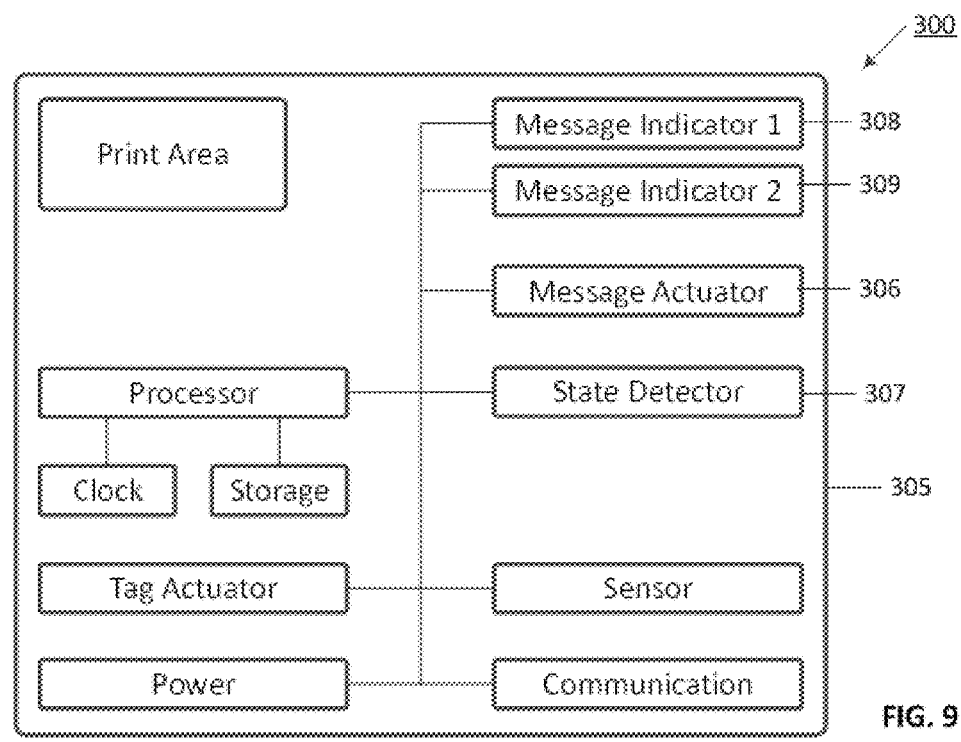
FIG. 9 is a block diagram of an intelligent label in accord with the present invention.

A block diagram 300 of the intelligent label 305 with the message actuator 306 is show in FIG. 9. The different elements have the same function as outlined in co-pending U.S. patent application Ser. No. 14/586,672, filed Dec. 30, 2014 and entitled "Intelligent Label Device and Method," which is incorporated herein by reference as if set forth in its entirety. The message actuator 306 communicates with the state detector (sensor) 307 as described above that sends the activation signal to the electronics of the intelligent label to activate the display (i.e. the message indicators 308 and 309) and shows the message and also sends a deactivation signal based upon a timer or a sensor deactivation signal, or a combination of these two.

Compensating for ambient light with an emissive display is possible by inserting short periods of time where the display is not emitting light. During that time the sensor only senses the ambient light. That measurement can be used to correct for any bias, such as high ambient light intensity or spatially or temporal changes in ambient light intensity over the display. For the OLED or Quantum Dot (QD) displays the emission can be turned off by powering off the pixels. In a backlit LC display this can either be done by changing all pixels to the black state or by turning off the backlight.

Typically, emissive displays, such as OLED, LC (with integrated light), or QD can switch very fast. For example, OLED or QD can switch between on and off within microseconds, while modern LC can switch within 1 millisecond. A scheme can thus preferably be implemented for each image frame update (of for example 20 ms (50 Hz)) wherein a small portion (e.g., a few milliseconds) would be reserved for ambient light sensing. As this can be done very fast, the viewer will not see any flickering. Alternatively, ambient light sensing could be done at the start and/or at the end of displaying the information in case the display is not always on. Further, it is also possible to insert the off-period per row, column, pixel, etc instead of for the whole display at the same time. This could have the advantage of being more pleasing to the viewer.

It is desirable that an emissive display is almost always visible, even in dark environments as it does not rely on an external light source. Also, the state detection of the display could become more easy for a display that only show the information when activated. Further, due to the fast switching capabilities of most emissive displays, efficient compensation of the ambient light is possible.

Integrated Optical Detection of Content on Displays

Optical touch solutions. Touch systems are interesting to use for inspiration as they are used to detect an object touching (or being in proximity) to the display. Especially in-cell optical touch systems are interesting as they are using light to detect an object. The following optical in-cell touch solutions currently exist.

Figure 10:
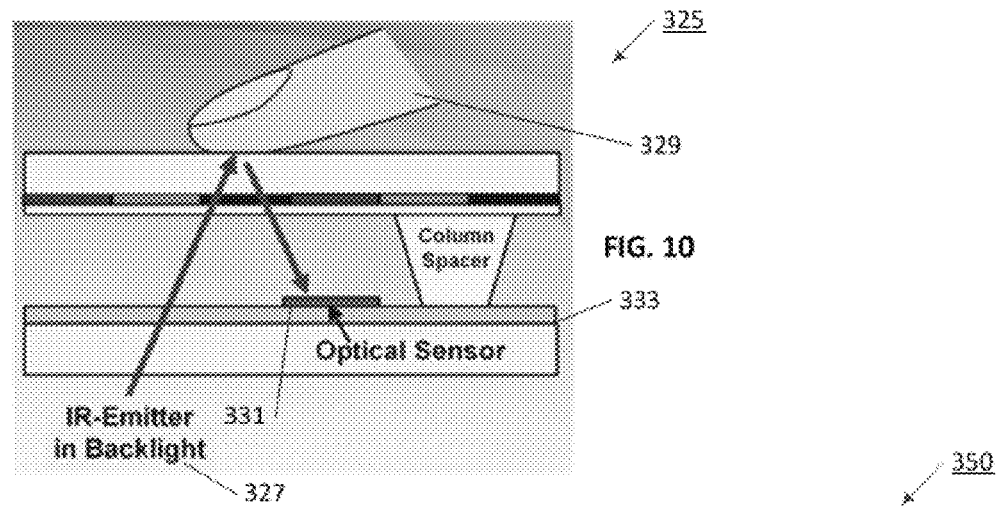
FIG. 10 is illustrates a light-sensing in-cell touch integrates optical sensors into the thin film transistor layer in accord with the present invention.

Light-sensing in-cell touch. The basic principle for sensing of light within the display 325 in shown in FIG. 10. Typically, a backlight 327 is used behind the display 325, usually an LCD, where an object, e.g. a finger 329, on the display 325 reflects the light from the backlight 327 back to a detector 331 that is integrated on the backplane 333 of the LCD. One of the major difficulties with this technology is sensitivity under all lighting conditions. Therefore high intensity IR light is added to the backlight 327 and an IR sensitive sensor 331 is used.

Figure 11:
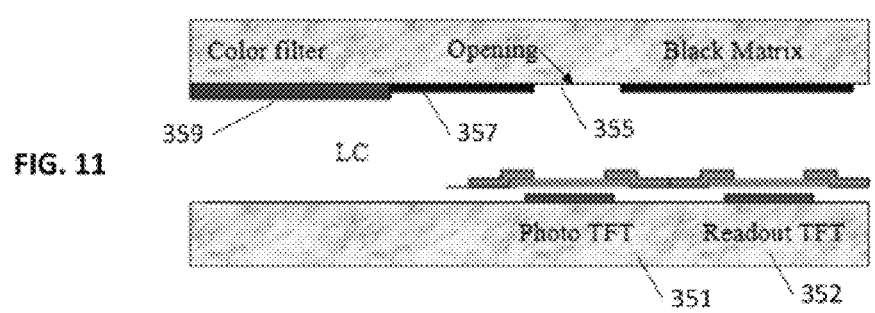
FIG. 11 is a cross-section of readout and photo a-Si TFT with opening in black matrix in accord with the present invention.

In FIG. 11, a structure 350 using a photo TFT 351 (thin film transistor) and a readout TFT 352 that is used to read-out the photo sensor is shown. The photo TFT 351 can receive reflected light through the opening 355 in the black matrix 357 laterally offset from the color filter 359, while the read-out TFT 352 is under the black matrix 357. The photo TFT 351 typically has a light blocking layer as a first (bottom) layer in order to avoid direct illumination from the back light. As the photo diodes are typically sensitive to temperature as well, the accuracy of the light sensing can be increased by adding a 2nd diode that only measures the effect of the local temperature (i.e. has a bottom and top light blocking layer) and is subtracted from the photo diode signal.

Figure 12:
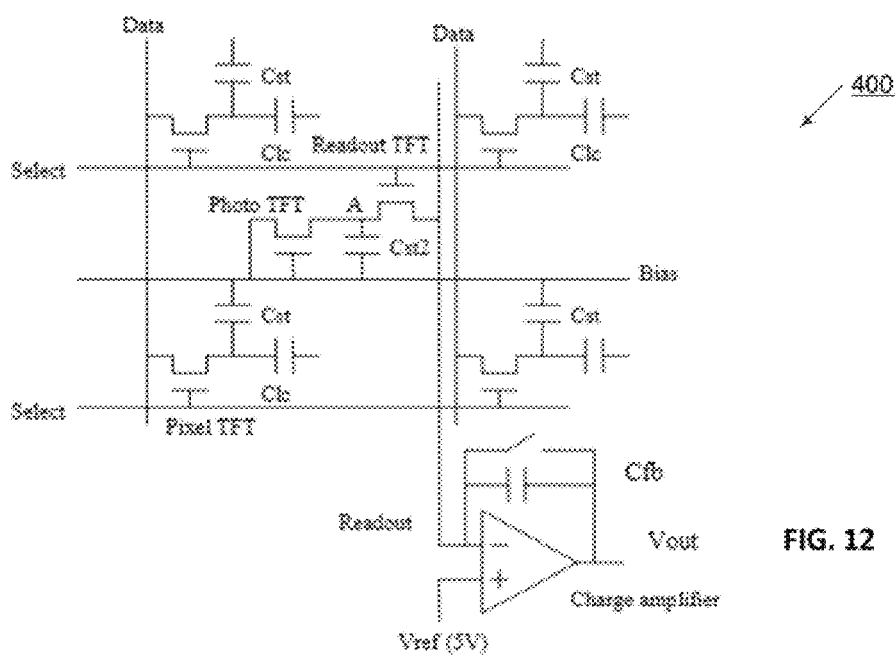
FIG. 12 is a circuit diagram of four LCD pixels and one sensor circuit in accord with the present invention.

In FIG. 12 a backplane circuit 400 for an active-matrix LCD with integrated light sensors is shown. One light sensor is implemented for every 4 pixels, although it is possible to implement more or less light sensors as well. The light sensing circuit is a simple 2 TFT circuit as shown in FIG. 11. The sensing circuit shares a number of line with the pixel circuits to simplify the external wiring. The circuits works by first putting a bias on the capacitor Cst2 that leaks away through the photo TFT depending on the light intensity. By reading the remaining bias on the storage capacitor after a certain amount of time (e.g. 20 ms) the average light intensity on the photo TFT can be calculated.

Figure 13A:
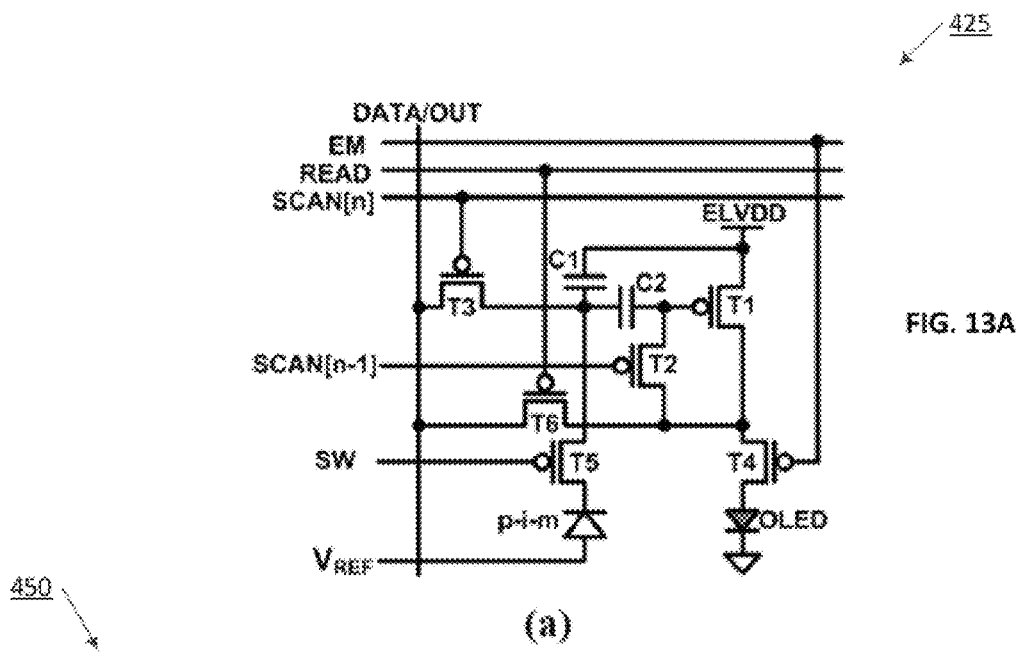
FIG. 13A is a schematic diagram of AMOLED pixel circuit in accord with the present invention.
Figure 13B:
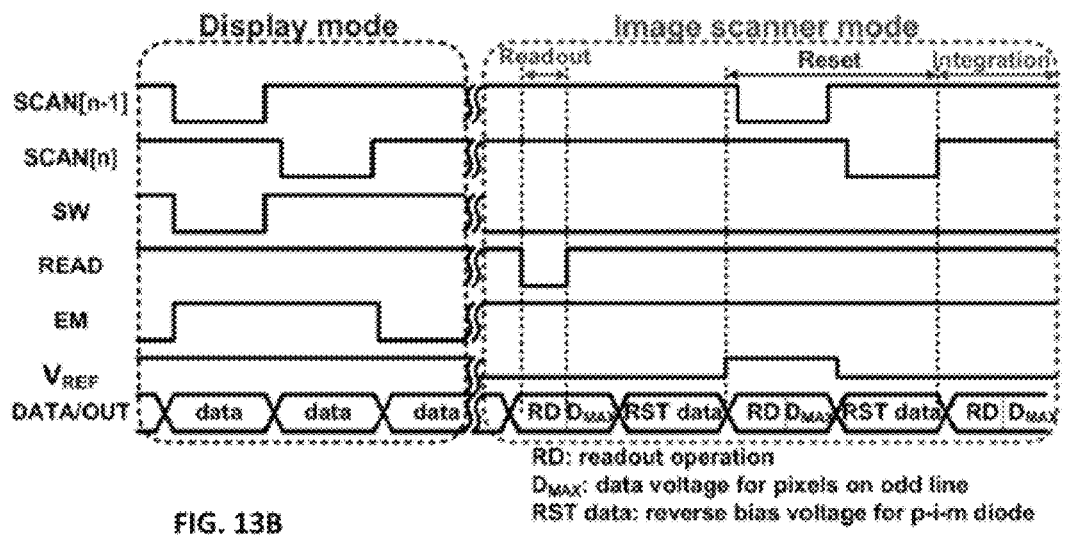
FIG. 13B is a timing diagram for a AMOLED pixel circuit in accord with the present invention.

In FIG. 13A a pixel circuit 425 for an AMOLED is shown with integrated scanner function. The photodiode is made from a p-i-m amorphous silicon diode. FIG. 13B illustrates a timing diagram 450 for the circuit of FIG. 13A.

Figure 14:
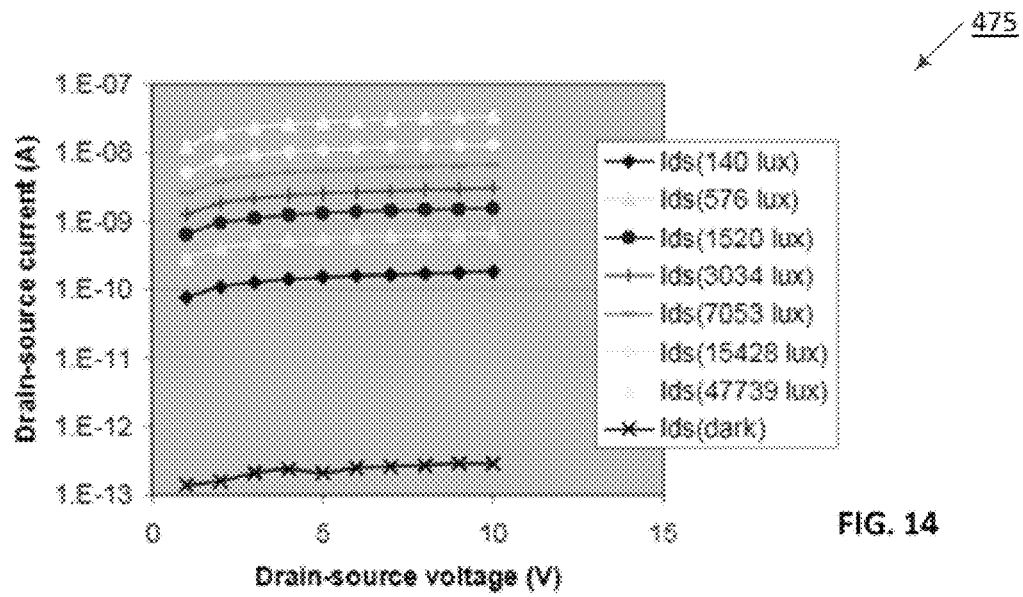
FIG. 14 is measured photo-current under varying light intensity for an a-Si TFT with gate shorted to source and W\L=36 μm/6 μm in accord with the present invention.

In FIG. 14, the relationship 475 between the drain-source current through the photo TFT as a function of the light intensity is shown. It is clear that an a-Si photo diode can be used very effectively for light sensing.

Figure 15:
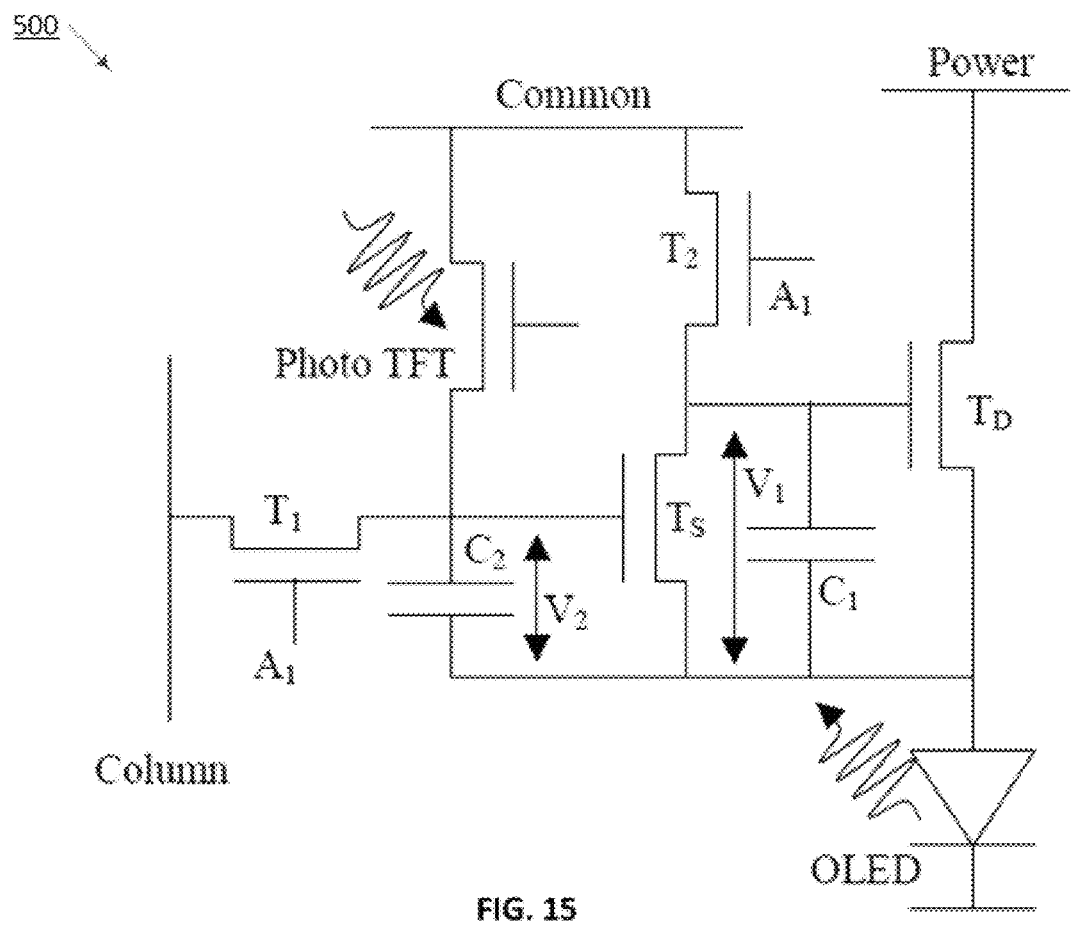
FIG. 15 is a-Si:H optical feedback pixel circuit in accord with the present invention.

OLED compensation circuits using optical sensors. In FIG. 15, an OLED compensation circuit 500 based on optical feedback is shown. The photo TFT is an a-Si NIP diode integrated on the backplane. The photo TFT detects the light coming from the OLED. The drain-source current from the photo TFT determines the amount of time the OLED is on during a frame. This compensates for degradation of the OLED by making the on-time of a degraded OLED longer such that the integrated light output over one frame is equal to that of a fresh OLED.

In one embodiment, the general implementation consists of integration of or adding a light sensitive element to the display. For an active matrix display the optimal solution is to integrate the light sensitive element directly in the active matrix as already proposed for in-cell touch and OLED compensation. For a segmented or passive matrix display the light sensitive element can be incorporated into one of the substrates or can be created on a separate substrate and adhered to the bottom or the top of the display as already proposed for the light sensitive layer in previous embodiments.

In the various embodiments below a light blocking layer is proposed to shield contribution from the ambient light falling onto the photo detector. This light shielding layer can also be used in various embodiments as previously described in order to improve the signal to noise ratio.

Figure 16:
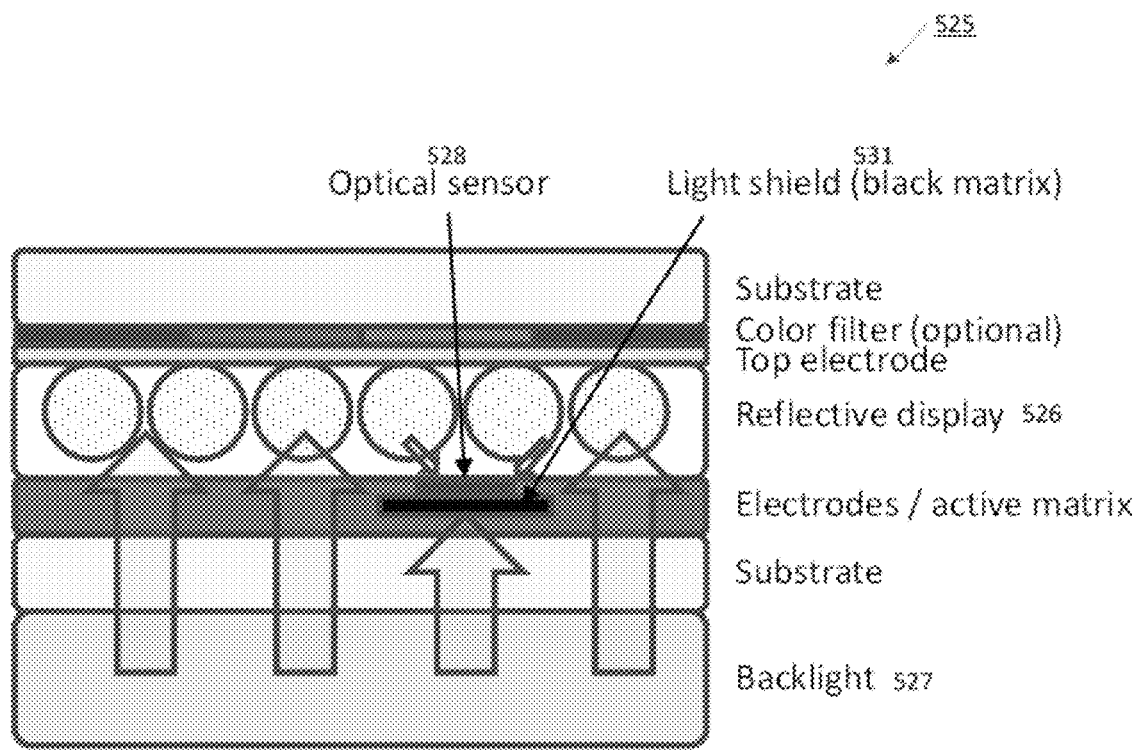
FIG. 16 is a reflective display using a light source (e.g. a backlight) and an integrated optical sensor in accord with the present invention.

Integrated light sensitive element in a back lit reflective display. In this embodiment 525 illustrated in FIG. 16, a reflective display 526, such as an electrophoretic E Ink display, is used in combination with a backlight 527 as a light source and an integrated optical sensor 528, such as a photo diode or a photo transistor as the detector. The optical display (from the back side) will scatter the light back onto the light sensor, with a light level indicative of the optical state of the display (pixel). In case of an E Ink electrophoretic display, the sensor 528 will sense the inverse image as it is sensing on the backside. When the backside of the display is black only a fraction of the light impinges on the sensor as compared to a white state. Intermediary grey states can also be detected.

Figure 17:
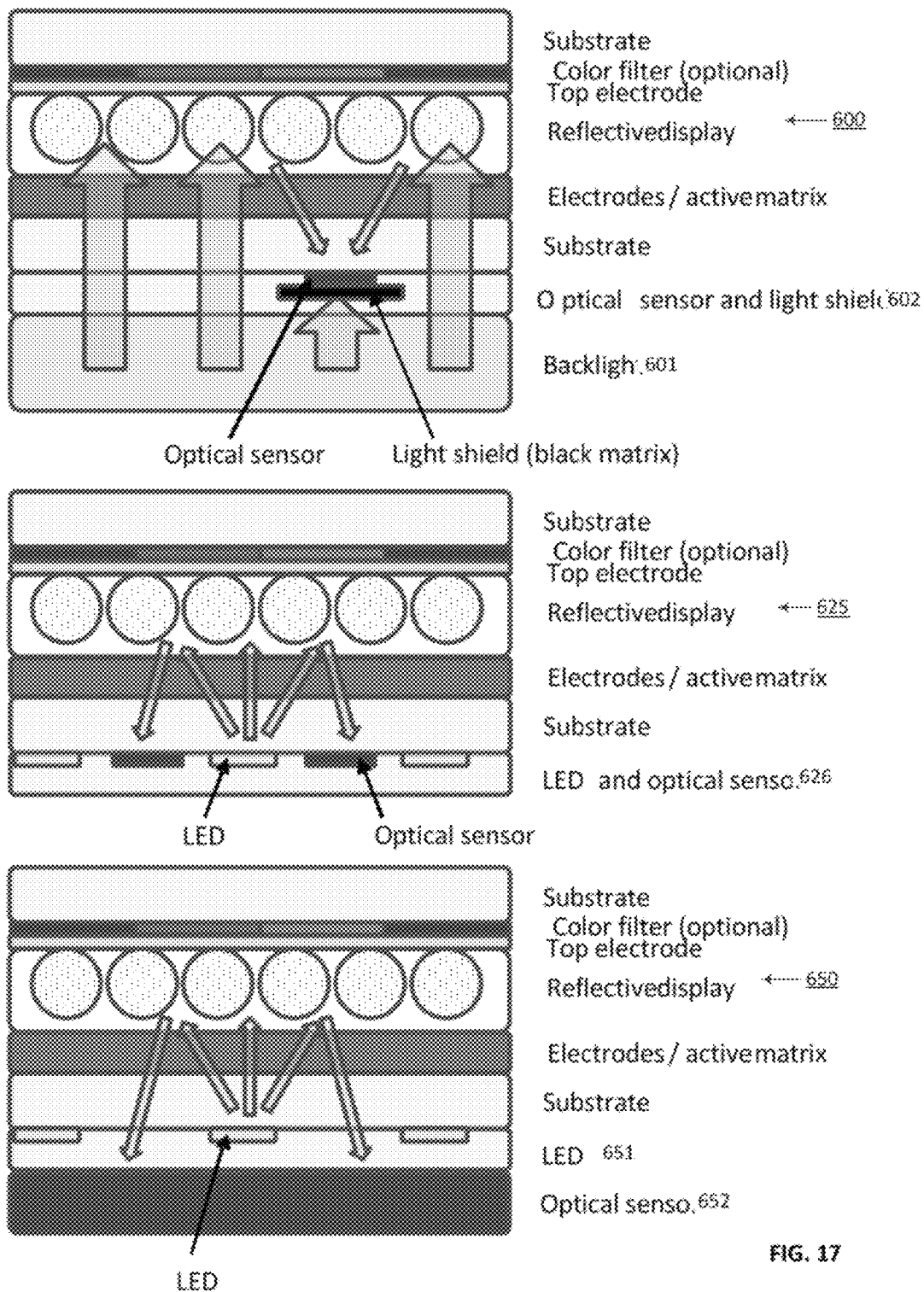
FIG. 17 is a reflective display in accord with the present invention.

Especially for an E Ink display this is preferable as the E Ink medium needs a transistor backplane for matrix displays. The optical sensor 528 can then be implemented as a light sensitive transistor in the same technology as already used for the matrix backplane. The light shield 531 under the sensor 528 can easily be implemented by using one of the metal layers underneath the sensor 528. Of course it is possible to use the sensor 528 without a light shield 531, but the optical contrast will then be much lower. The backlight 527 can also only emit non-visible light, such as IR or UV, in order to avoid light leakage through the reflective display impacting the viewer. The sensor 528 can be tuned to be sensitive to the particular wavelength of the backlight. In this embodiment vertical separation (e.g. a spacer layer) of the optical sensor 528 and the reflective display 526 is desirable in case larger pixel areas are employed. Separate light sensitive element in a back lit reflective display. It is also possible to add the light sensitive element as a separate layer to the display, as shown in FIG. 17. This could be useful in case a simple display structure, such as a few segments, is used or when a separate add-on is more economical. The bottom display substrate and electrode structure must be transparent enough to be able to sense the switching state of the display medium through these layers. This can be done by using ITO or other transparent metals for the pixel electrode.

In display 600 of FIG. 17, a backlight 601 is used in combination with a light sensor sheet 602. Depending on the required pixel resolution the light sensor sheet 602 can be made with light sensitive transistors or diodes build by photolithography. In cases where the resolution is lower it is also possible to mount discrete light sensors to a flex foil, as long as the flex foil has enough transparency for the backlight. This embodiment is similar to the embodiment shown in FIG. 6, but is now using an optical sensor with a light shielding element instead of a photosensitive layer.

In the display 625 of the embodiment shown in FIG. 17, a separate sheet 626 with light sources and light sensors in a side-by-side configuration is integrated. This is typically a low resolution solution build with discrete components (e.g. LEDs and photo detectors) on a flex foil, although it is also possible to build such a layer with high resolution OLED with integrated photo diodes or transistors. As in this embodiment an array of light sources and detectors is used, it is possible to switch light sources and detectors sequentially or in groups in order to get the best possible optical contrast for the display state verification.

In display 650 of FIG. 17, a separate sheet 651 only contains the light sources in a side-by-side configuration, while a photosensitive layer 652 is positioned behind the display and the light source layer. By switching one light source on at-a-time the detector will detect the switching state of the illuminated part of the display. This works well for low resolution segmented displays or, in case the light sources are made in a high resolution technology, like a matrix OLED array, this could even be used for high resolution matrix displays. Of course the photosensitive layer could contain multiple discrete sensors for a faster response time, like in display 626 or be processed in a grid with row and column electrodes.

Figure 18:
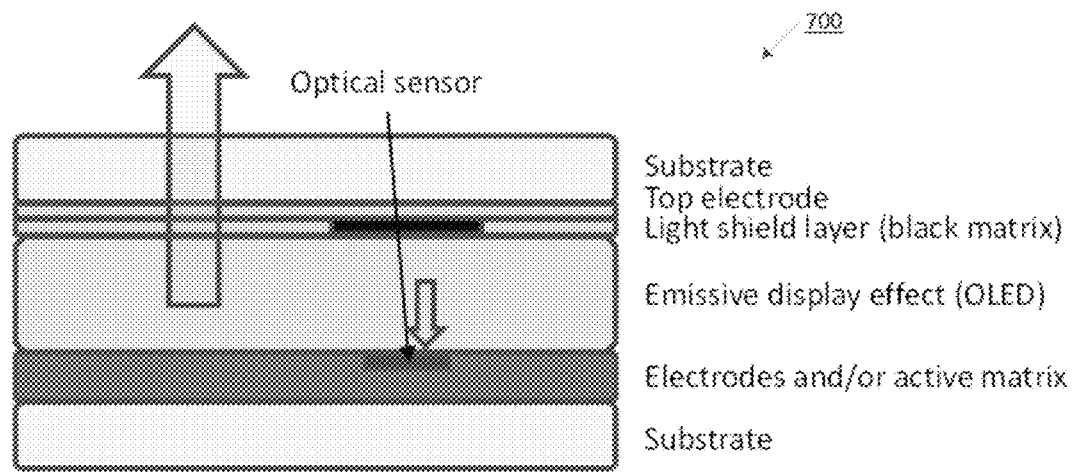
FIG. 18 is an emissive display in accord with the present invention.

Emissive display (e.g. OLED) with light sensitive element. In FIG. 18, an emissive display 700 embodiment with an integrated optical sensor is shown. The emissive layer emits light in all directions. The light that is emitted down is sensed by the optical sensor. The optical sensor can be integrated into the active matrix using the same layers and technology. The optional light shield layer shields the ambient light from the sensor in order to reduce bias. Instead of an absorbing layer it is also possible to make it a reflective layer as that increases the amount of light falling on the optical sensor even further, but it will also decrease the display optical performance for the viewer. Advantageously, the shield layer can be reflective on the back side and absorbing on the front side In another embodiment the optical sensor is positioned just below the light shielding layer and above the emissive layer, but the disadvantage of that is that the sensor now needs to be processed separately and cannot be made at the same time as the electrodes and transistors on the bottom substrate.

Figure 19:
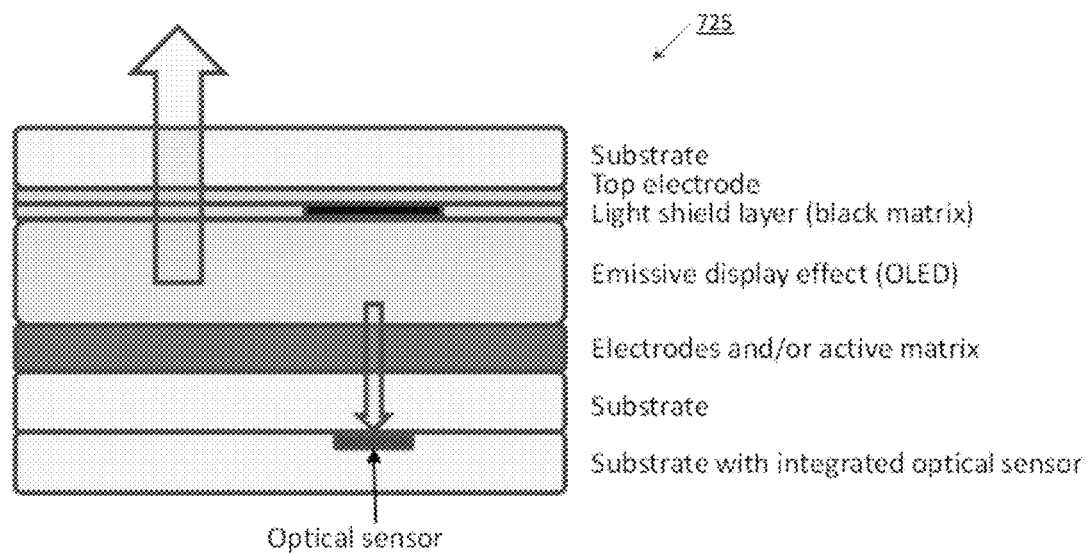
FIG. 19 is an emissive display in accord with the present invention.

In FIG. 19 a similar structure 725 is shown, but now with the light sensor implemented in a separate sheet. This could be beneficial for simple segmented emissive displays or when it is more economical to separate the display and sensing functions. In this case it is important to have enough light emitting towards the back of the display in order to sense the state of the display. This can be achieved by making the bottom display electrode semitransparent. This embodiment is similar to the embodiment shown in FIG. 7A, but is now using an optical sensor with a light shielding element instead of a photosensitive layer.

It is also possible to position the separate substrate with the optical sensor on top of the display, that is, with the optical detector on the front side of the substrate and in front of the display layer. In that case the optical sensor could have an additional ambient light blocking layer. The disadvantage of that configuration is the decreased optical performance of the display and the requirement for optical transparency on the sensor layers and substrate. This configuration would be similar to the embodiment shown in FIG. 8, but is now using an optical sensor with a light shielding element instead of a photosensitive layer.

Figure 20:
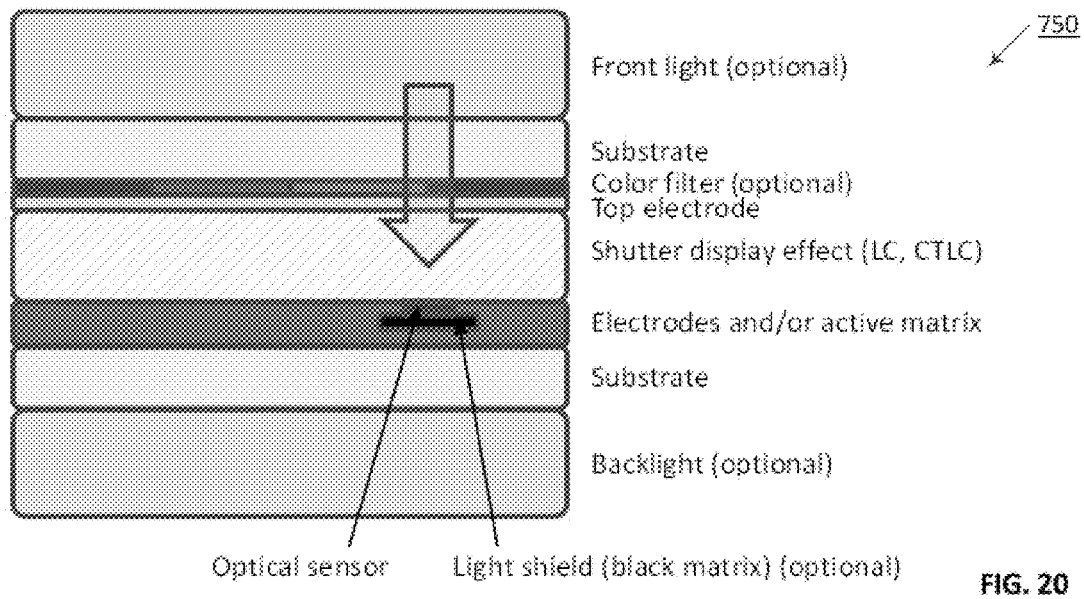
FIG. 20 is a shutter display with an integrated optical sensor in accord with the present invention.

Integrated light sensitive element in shutter display. In FIG. 20, a shutter display 750 with an integrated optical sensor is shown. A shutter display has various degrees of transparency depending on the switching state of the material. For example, in case liquid crystal (LC) is used, the LC can be switched between a semitransparent state and a dark state by sandwiching the LC material between crossed polarizers. In case the display has a backlight it is advantageous to use a light shield layer just below the light sensor to reduce signal bias induced by the backlight. By using a front light, the light sensor can detect the state of the pixels even without ambient light. Further, by using non-visible (IR) light in the front light the optical performance in the visible wavelength range is largely unaffected, while the signal level for the optical detector could be further increased. In case the shutter display is a reflective display (with a reflective bottom electrode), a backlight is not functional, but the front light could provide additional visibility for the user and the sensor when the ambient light is poor. Again, it is also possible to add a separate detector sheet behind or in front of the display and in case the resolution is low it is also possible to add discrete light sensors on a flex foil to the display. Accordingly, a simple way to integrate light sensing is provided by using the active-matrix transistors to sense the state of the display.

Optical Shutter for Blocking Ambient Light During State Detection

In general, in the following embodiments an optical shutter is added to the display, such that the photo sensitive layer only receives the reflection, transmission, or emission from one pixel at a time. The advantage is that this allows the photo sensitive layer to be unpatterned (i.e. not have any pixels) which makes it much easier to manufacture. As the shutter can be a simple LC display, the shutter and the display can be made with the same manufacturing infra-structure which makes it easy to manufacture with matching pixel size and shape. LC displays are now extremely cheap, thus adding only marginally to the cost of the display system. Also, it is possible to make the shutter normally transparent (i.e. normally white) in order to make the transparent state the state without any power to the shutter.

The photo sensitive layer is preferably made by a solar cell type of manufacturing infrastructure, having much larger feature sizes compared to displays. By adding the shutter, the photo sensitive layer does not need to be pixelated anymore, something that is very compatible with the general structure of solar cells. Of course it is also possible to use other materials for the photo sensitive layer, such as photosensitive transistor or diode structures, or even use discrete photo sensitive components mounted on a flex board, as also previously described.

Figure 21:
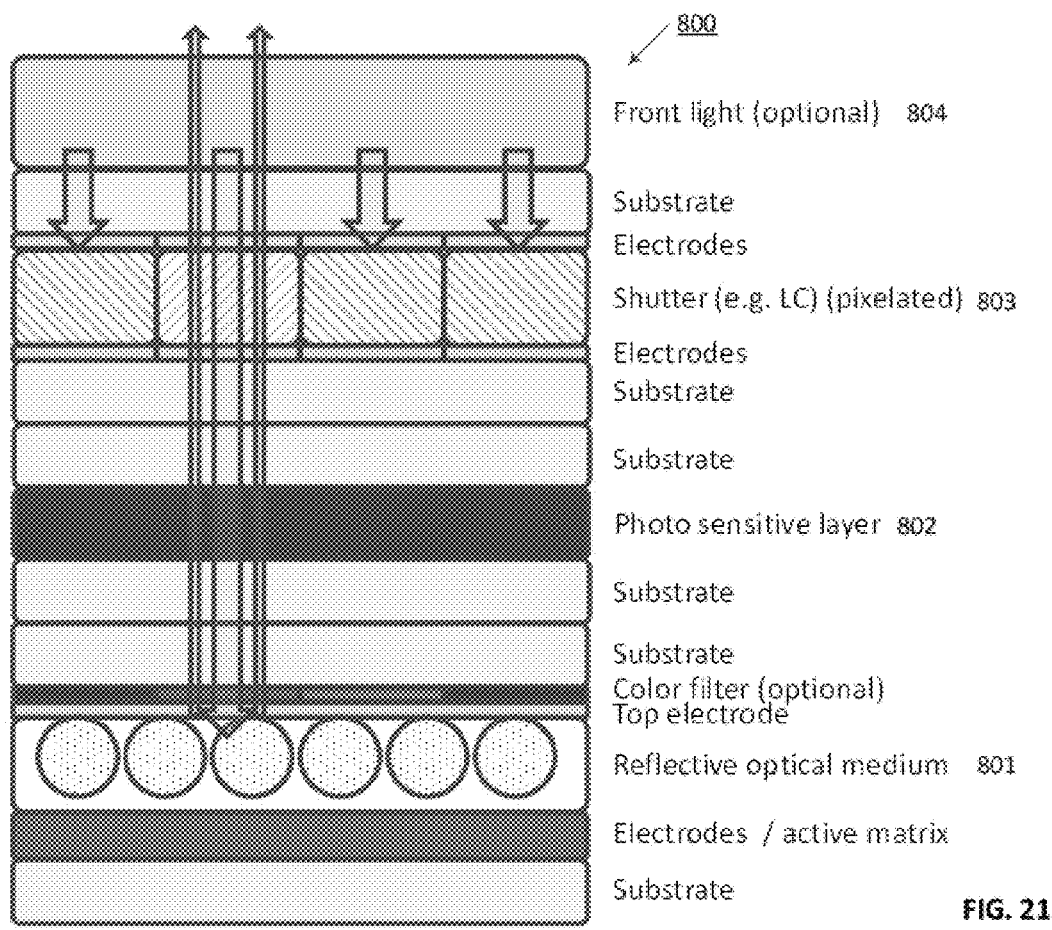
FIG. 21 is a reflective display in accord with the present invention.

Reflective display with shutter and photo sensitive layer. In FIG. 21, a reflective display device 800, with an exemplary electrophoretic display layer 801, is shown with a photo sensitive layer 802 in front. A shutter 803 is positioned in front of the photo sensitive layer 802. The shutter 803 has a pixilation that is such that it can pass or block light per pixel of the display. Depending on the type of display (e.g. high resolution matrix or segments) the pixilation of the shutter 803 can be identical to the display or it can be different (larger or smaller than one pixel), but still allowing the passing or blocking of the light per (part of a) display pixel.

The photosensitive layer 802 is not pixelated and only registers the amount of light that is passing through its light sensitive layer. By switching the shutter from pixel to pixel, the state of each pixel can be registered.

The front light 804 and color filter 805 are optional. Substrates can be shared or some of the components could even by monolithically integrated on top of each other.

Of course the user looking at the display will see the shutter 803 blocking part of the image depending on the speed of the shutter and the way the shutter 803 is driven. This can be addressed by operating the shutter 803 at a high speed, for example 50 Hz or higher. When all pixels are scanned once every 20 ms, the user cannot see the shutter 803 operating the individual pixels anymore; it will only see that the average brightness is lower. In order to get a good measurement of the switching state of the pixels, the pixels can be opened by the shutter multiple times, for example 50 times. This would result in a total measurement time of 1 second, where each pixel is measured 50 times for short periods of time. It is also possible to use more complex shutter addressing schemes, such as blocking only one pixel at a time in order to measure the loss of light on the sensor per pixel that is blocked. This has the advantage that the user will still see most of the image. When this way of measuring the state is performed at a high speed as described above, the user will hardly notice the measurement. Even more complex measurement schemes can be used, where (orthogonal) blocks of pixels are blocked at a time, such that the sum of the blocks of pixels that are measured give the information about all the individual pixels. Again this can be done at high speed by scanning multiple times.

Figure 22:
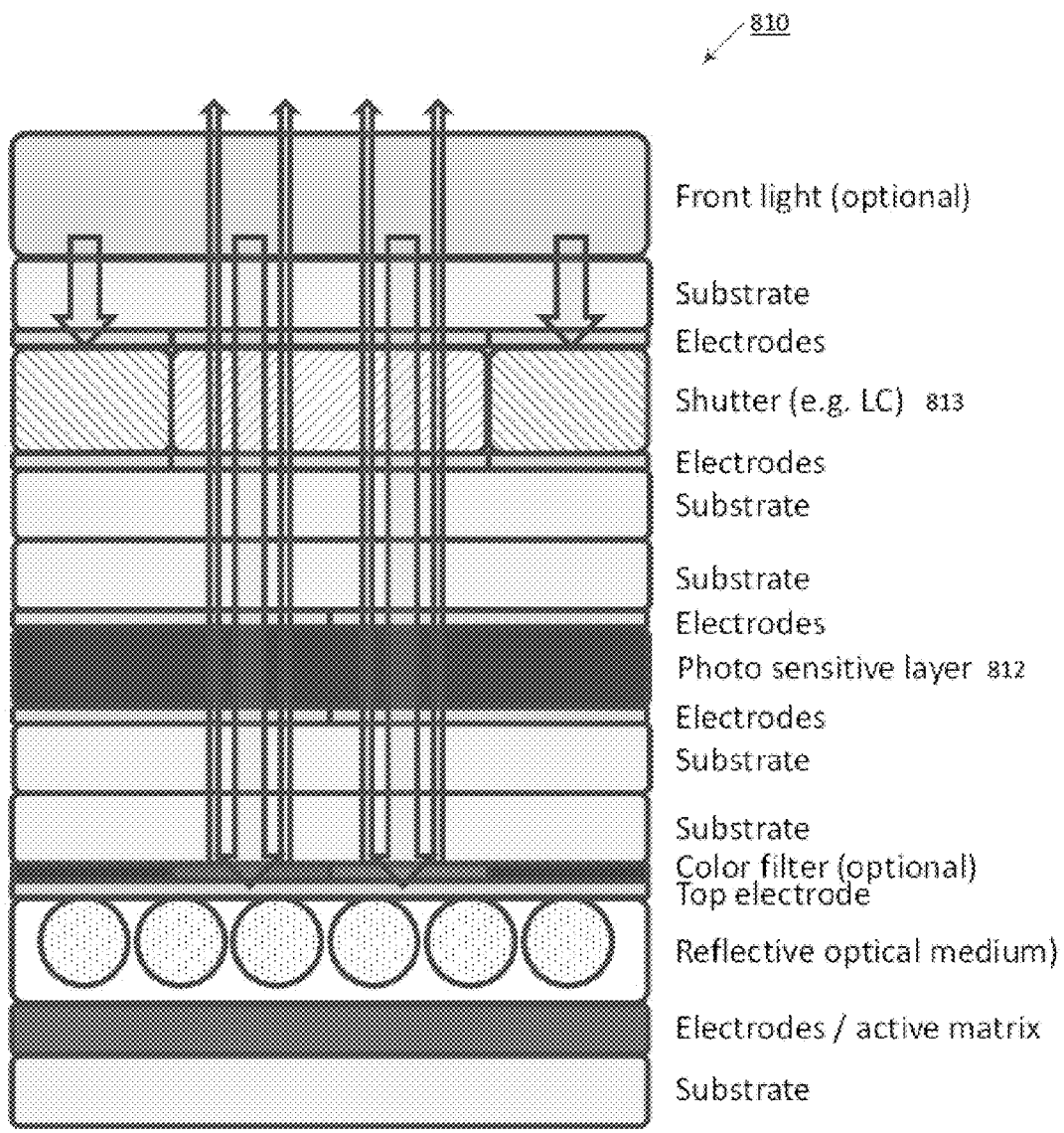
FIG. 22 is a reflective display in accord with the present invention.

An alternative embodiment 810 is shown in FIG. 22, where now both the shutter 813 and the photo sensitive layer 812 are pixelated, such that the combination of the two allows a per display pixel measurement of the switching state. Any trade-off is possible between the two layers in order to find the optimal solution from a manufacturability and cost standpoint. This same embodiment can be used for all other embodiments below, where this is not specifically added as a separate embodiment.

Figure 23:
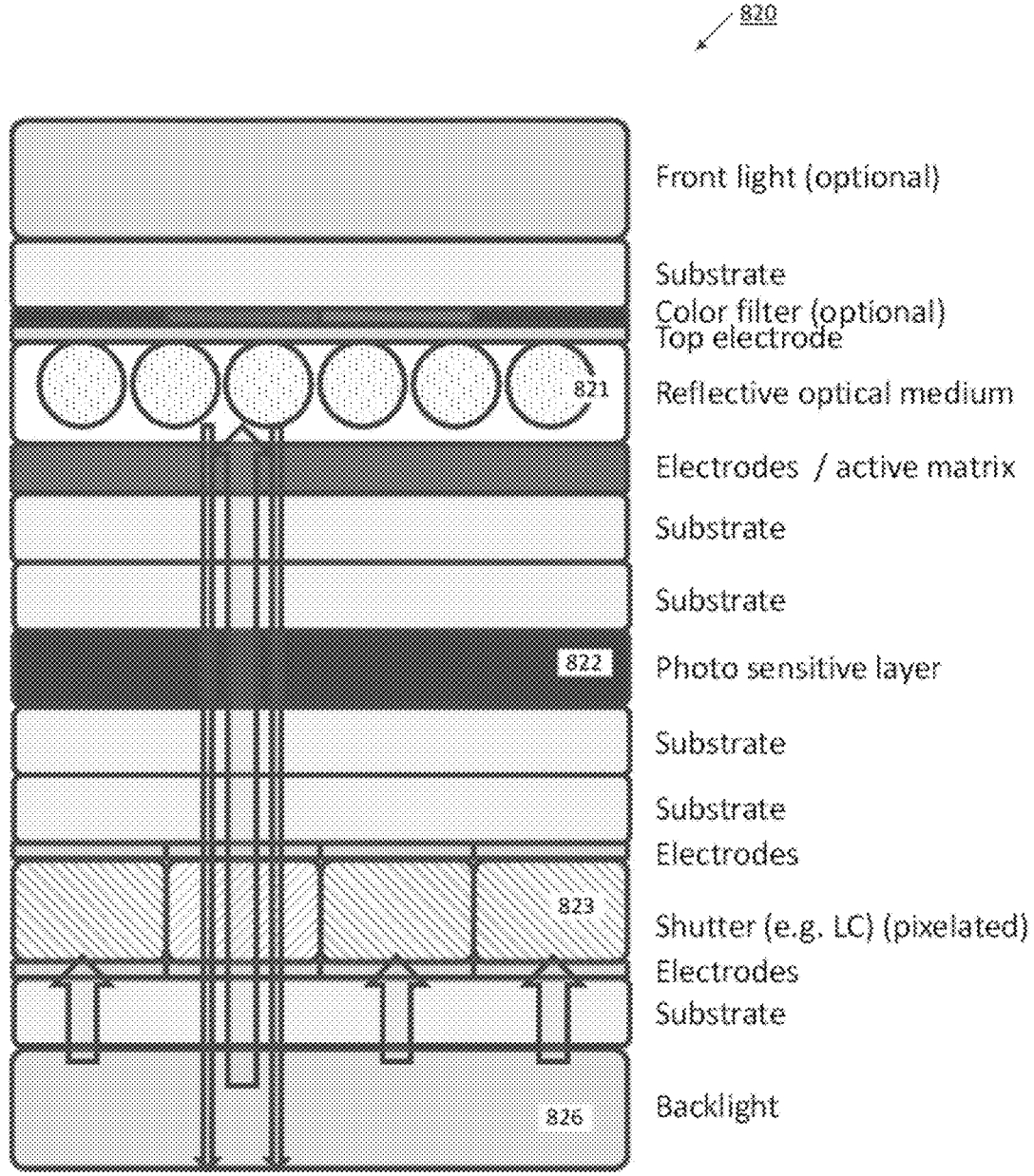
FIG. 23 is a reflective display in accord with the present invention.

In FIG. 23 an alternative embodiment 820 is shown where the shutter 823 is positioned in-between the back light 826 and the photo sensitive layer 822. The photo sensitive layer 822 now senses the switching state of the backside of the display. For some reflective displays, such as electrophoretic E Ink 821, this results in a detection of the inverse state as compared to the state at the viewing side. This embodiment can also be well used for shutter like display effects, such as LC, instead of reflective E Ink. In that case the front light is omitted, but the rest of the stack is the same. Again, it is also possible to pixelate both the photo sensor and the shutter, such that the combined resolution allows for per display pixel sensing.

Figure 24:
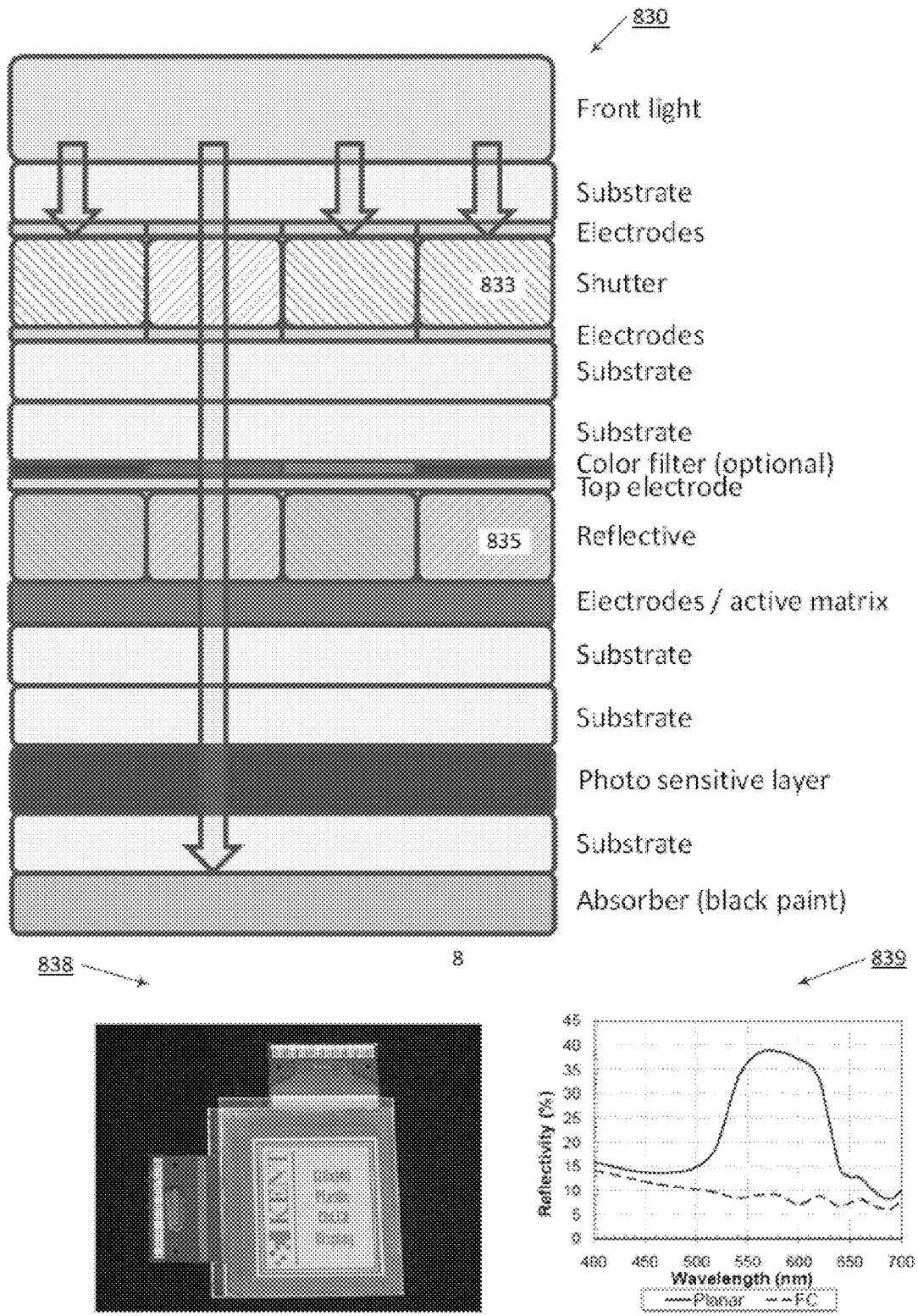
FIG. 24 is a reflective display with shutter in accord with the present invention.

In FIG. 24 an embodiment 830 using a shutter 833 is shown for a reflective display that is switched between a reflective state and a transparent state, such as a Cholesteric Texture Liquid Crystal (CTLC) display layer 835. The shutter again selects the pixel to be measured. When the display pixel is in its reflective state the photo sensor will not detect light, while it does detect light when it is in its transparent state. The reflectivity curve 839 for the CTLC display 838 is also illustrated.

Figure 25:
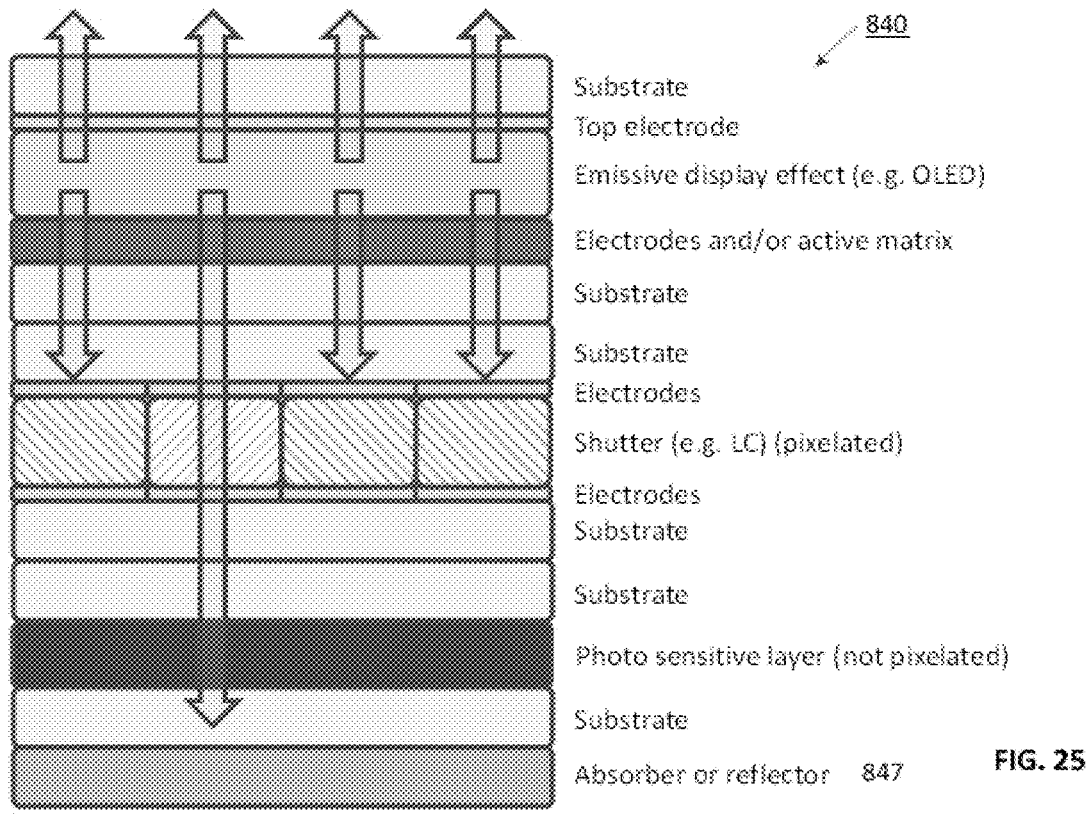
FIG. 25 is a reflective display with shutter in accord with the present invention.

In FIG. 25 the shutter embodiment is shown for an emissive display 840. Compared to the embodiments above the emissive display is not bi-stable, so it only emits light when it is powered. As the emissive display typically emits light in both directions, the light emitted towards the back is used to detect the state of the display. The amount of light that is emitted towards the back can be tuned by optimizing the layer thickness of the back electrodes of the display layer. There is a back absorber or reflector 847 added at the far back layer of the stack. Typically, this will be an absorber, as reflection of the light can, on the one hand, create unwanted interference effects, but reflection, can on the other hand, increase the light intensity impinging on the photosensitive layer allowing for a stronger detection signal.

Figure 26:
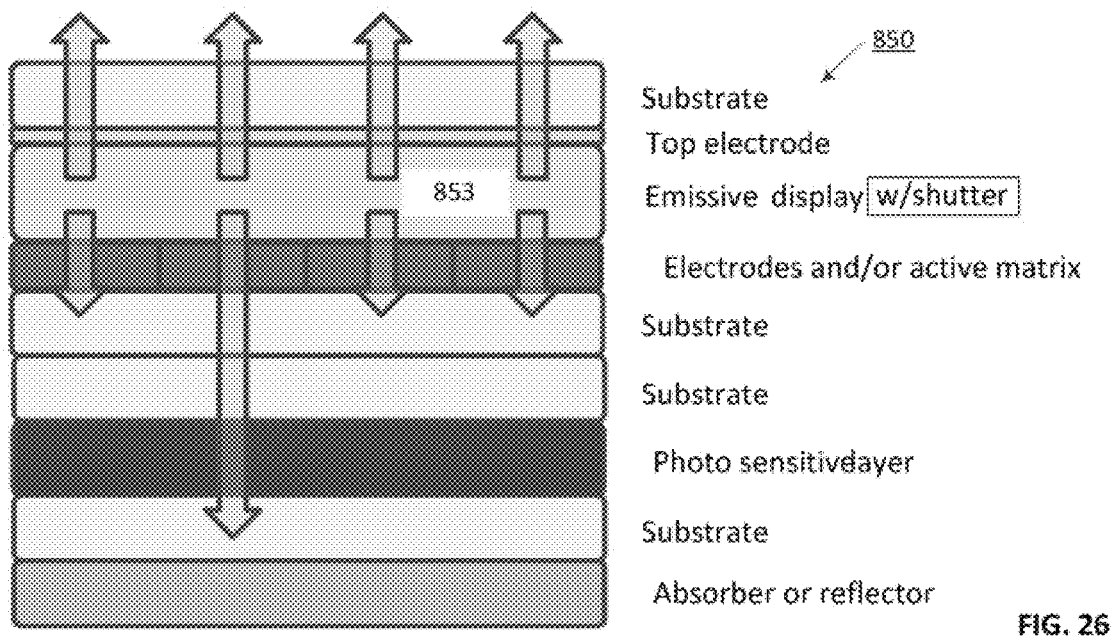
FIG. 26 is a reflective display with shutter in accord with the present invention.

In FIG. 26 a simplified embodiment 850 is shown where the shutter function 853 has been integrated into the emissive display layer. When the emissive layer is showing the image to the viewer, it can modulate each pixel at a high speed, such that the photo sensitive layer can detect the change in light and thereby can detect the correct switching state of the pixel. This can be done with the same methods described for drive schemes of the shutter above.

Figure 27:
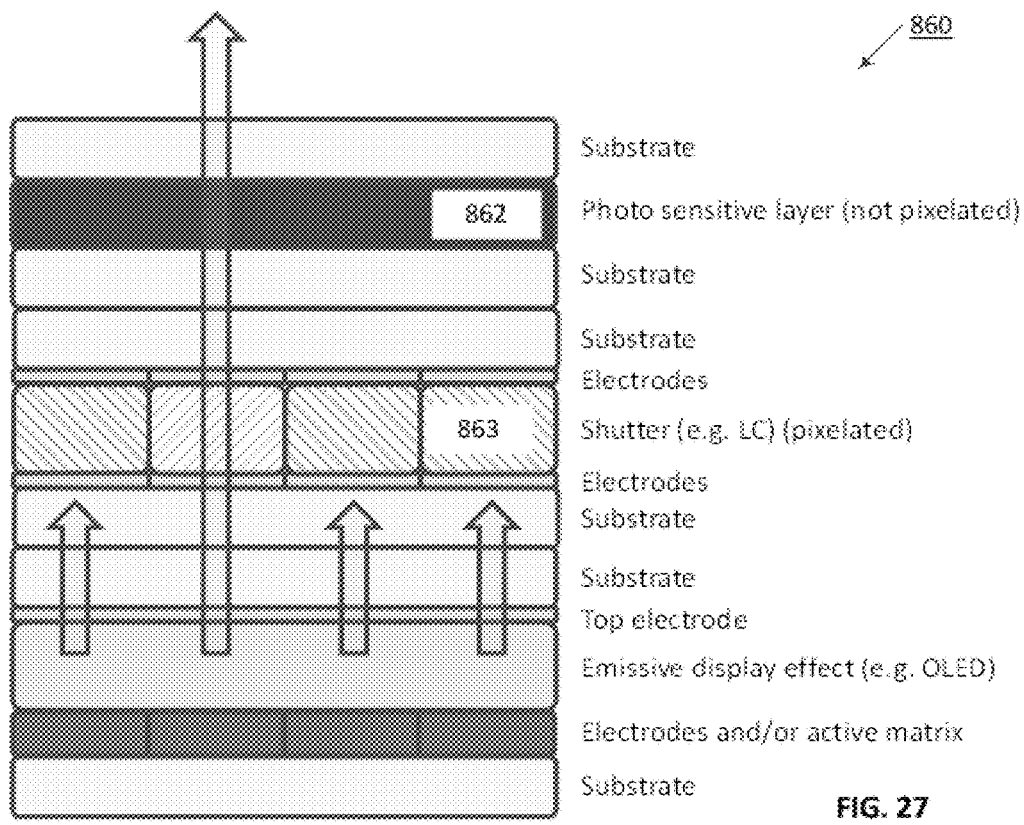
FIG. 27 is a reflective display with shutter in accord with the present invention.

In FIG. 27 the embodiment 860 of the emissive display with the shutter 863 and photo sensitive layer 862 in front of the display is shown. The advantage of this embodiment is that the emission of the display is unidirectional towards the viewer. The disadvantage is that more layers are now between the display and the viewer including the shutter that needs to be operated. Of course the integrated shutter function into the emissive layer can be used here as well, as shown in device 850.

Figure 28:
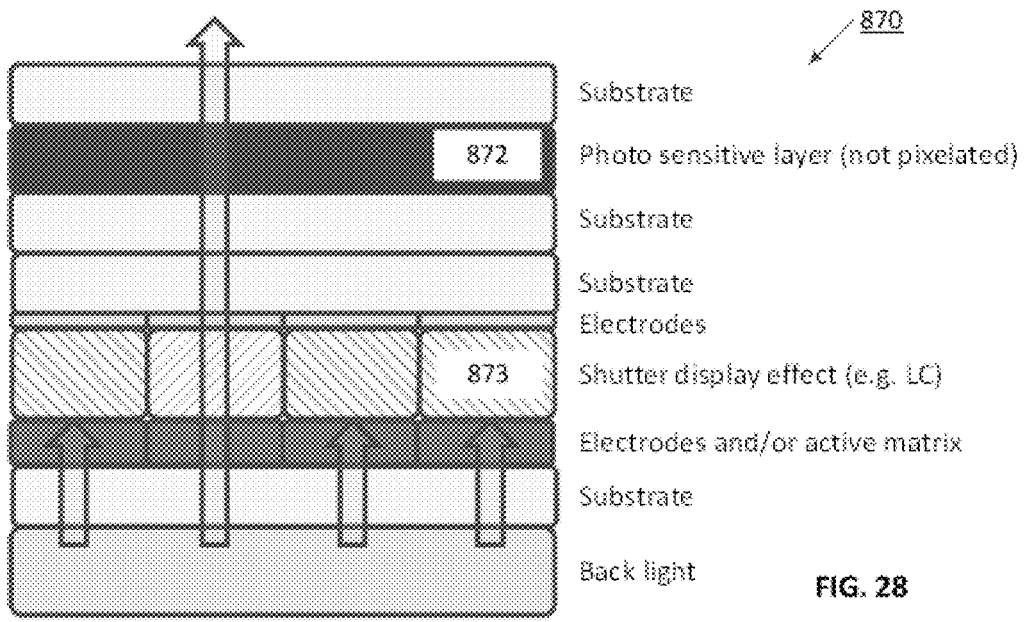
FIG. 28 is a reflective display with shutter in accord with the present invention.

In FIG. 28 an embodiment 870 is shown where a shutter 873 display effect is used, both to display the image and to function as the shutter for the photo sensitive layer 872. By using the high-speed per pixel switching as described above the user will not see the per pixel sensing while the image is displayed. This is very similar to the embodiment proposed in FIG. 26, but now using a shutter display effect with a backlight. The sensing is now done as follows: while the (static) image is displayed the shutter display effect switches every pixel individually to the inverse state and back again to the original state at high speed (50 Hz or higher). By doing this multiple times (50 times for example) the photo sensitive layer registers the state of the pixel by a change in the light falling on the sensor. Other drive schemes, as discussed above are also possible. This way the user still sees the (static) image, while the sensor registers what is displayed. Of course the sensor will also be exposed to ambient light. Therefore, using a specific wavelength, such as IR, in the backlight with the sensitivity of the photosensitive layer tuned for the same wavelength, would minimize the effect of ambient light. Further advantageously, the backlight could be modulated (or strobed) from two light sources, e.g. one emitting in the visible wavelength range for viewing the emissive display and one emitting at a wavelength range outside of the visible range (e.g. in the IR or UV) for detection purposes with a corresponding wavelength-tuned detector.

Figure 29:
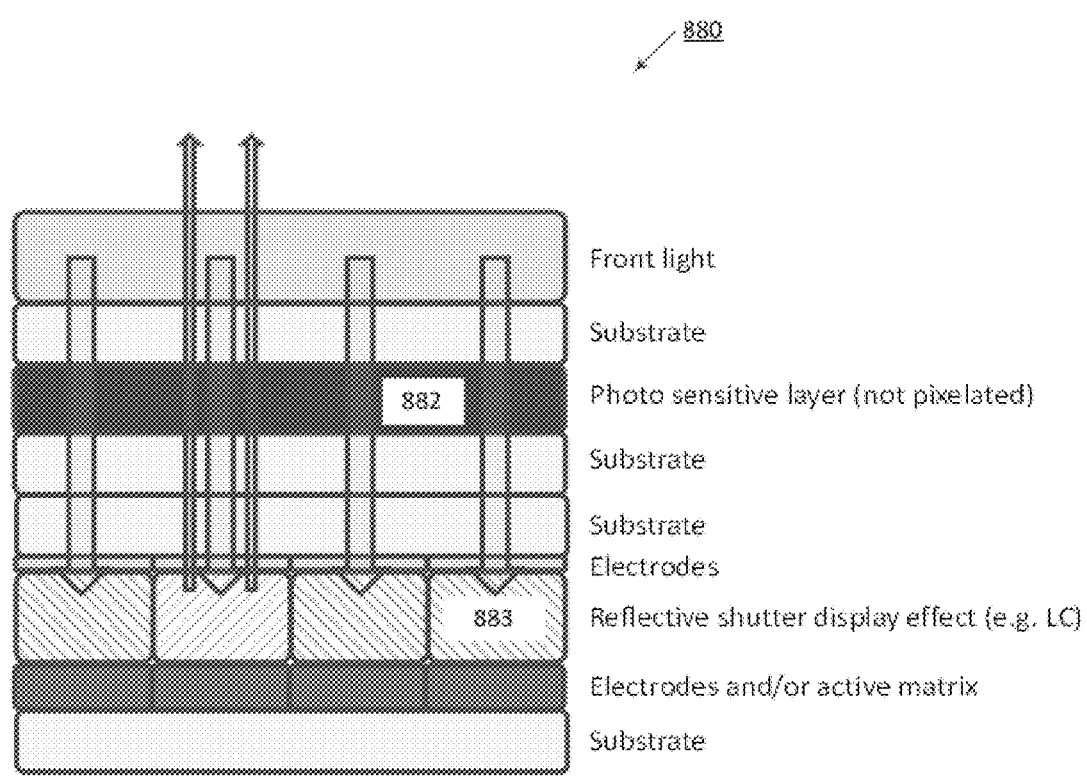
FIG. 29 is a reflective display with shutter in accord with the present invention.

In FIG. 29 a similar embodiment 880 is shown, but now using a reflective shutter 883 type display effect. In this case the photo sensor 882 will always be subjected to the bias light from the front light while detecting the pixel state at high speed. This is possible by the polarization sensitive sensors as previously discussed with the front side polarizer of the display layer placed in front of the detection layer. Accordingly, an unpatterned or coarsely patterned photo sensor can be used in combination with a low-cost off-the-shelf shutter.

Addressing Schemes and Electrode Structures for Verification of Displays

Display pixel state verification by a detector generally requires a detector that has at least the same resolution as the pixels of the display itself. Especially for high resolution displays this would require an expensive optical detection system. Further, large area optical sensors, such as solar cells, are manufactured with different (low resolution) infrastructure than displays. The applicability of an optical sensor it is therefore highest when the resolution requirements on the sensor are low.

In one embodiment a lower resolution optical sensor in combination with a consecutive update of the display in matching orthogonal blocks can be employed to determine the optical state of the display pixels. Alternatively, in another embodiment, a scanning front or backlight can be used. These systems and methods can be applied to not only bi-stable displays, such as electrophoretic and CTLC displays, but also to non bi-stable displays, such as LCD, OLED, QD or micro LED. It is applicable to segmented displays, passive matrix displays and active matrix displays. In all cases a differential signal is recorded by the sensor, meaning that the pixels are switched to a reference state and the final state, where the difference is recorded for verification of the state of the pixel. The sensor can be a solar cell, a (integrated) transistor sensor, a discrete grid of optical sensors, a capacitive sensor or any other kind of sensor that can record the (change of the) switching state of a pixel or a group of pixels.

Figure 30:
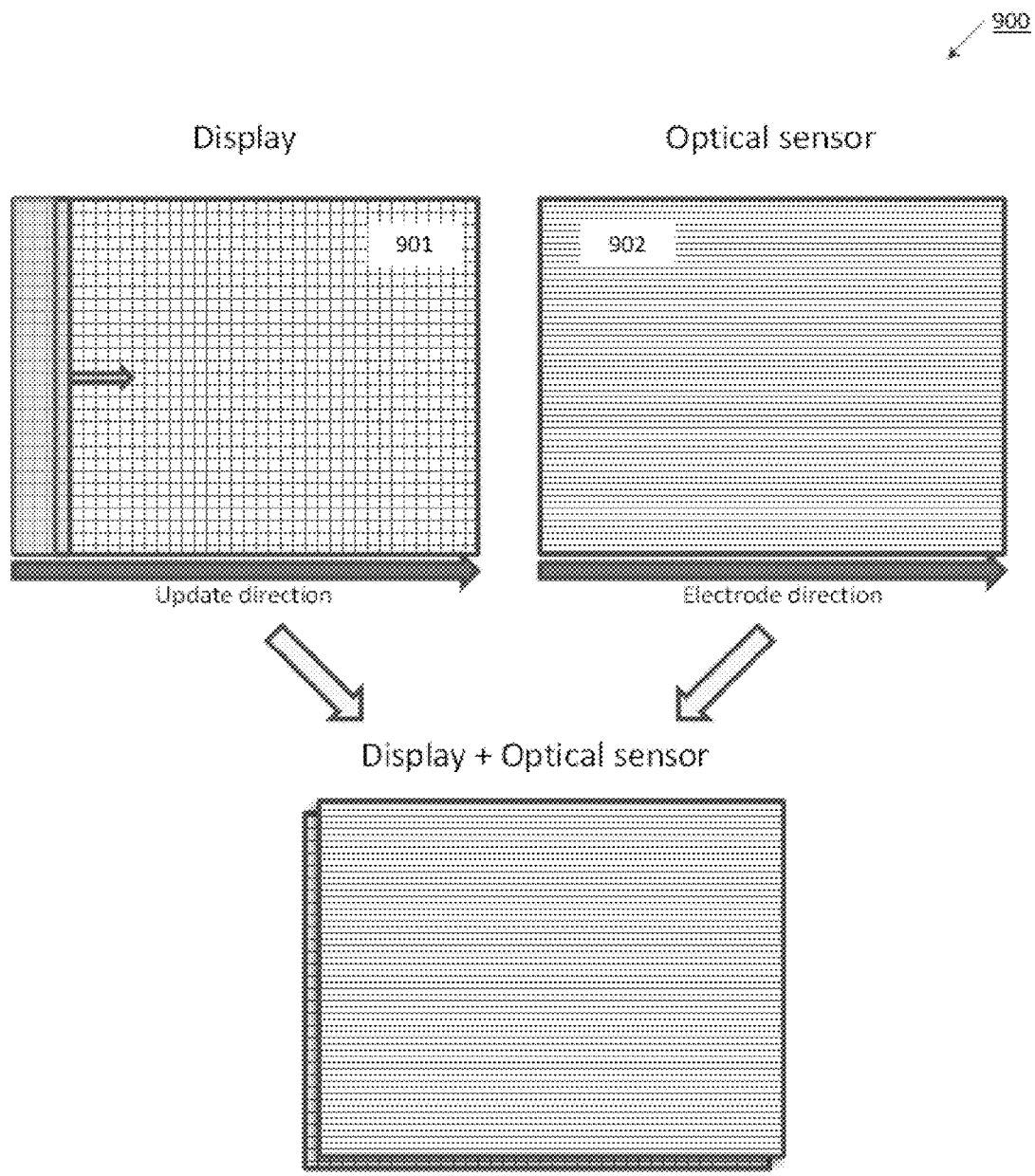
FIG. 30 is a verifiable display in accord with the present invention.

Consecutive display addressing. In FIG. 30 an embodiment 900 is shown where the display 901 is updated directionally. The new content is written to the display 901 from left to right, i.e. pixel column by pixel column in this case. This makes it possible to use a simplified, low-resolution optical sensor 902 that only has electrode stripes from left to right instead of a matrix that matches the pixel structure. Every time a new pixel column is updated, the sensor detects the change in optical state per pixel in the column, as the rest of the pixels in the rows are static.

Figure 31:
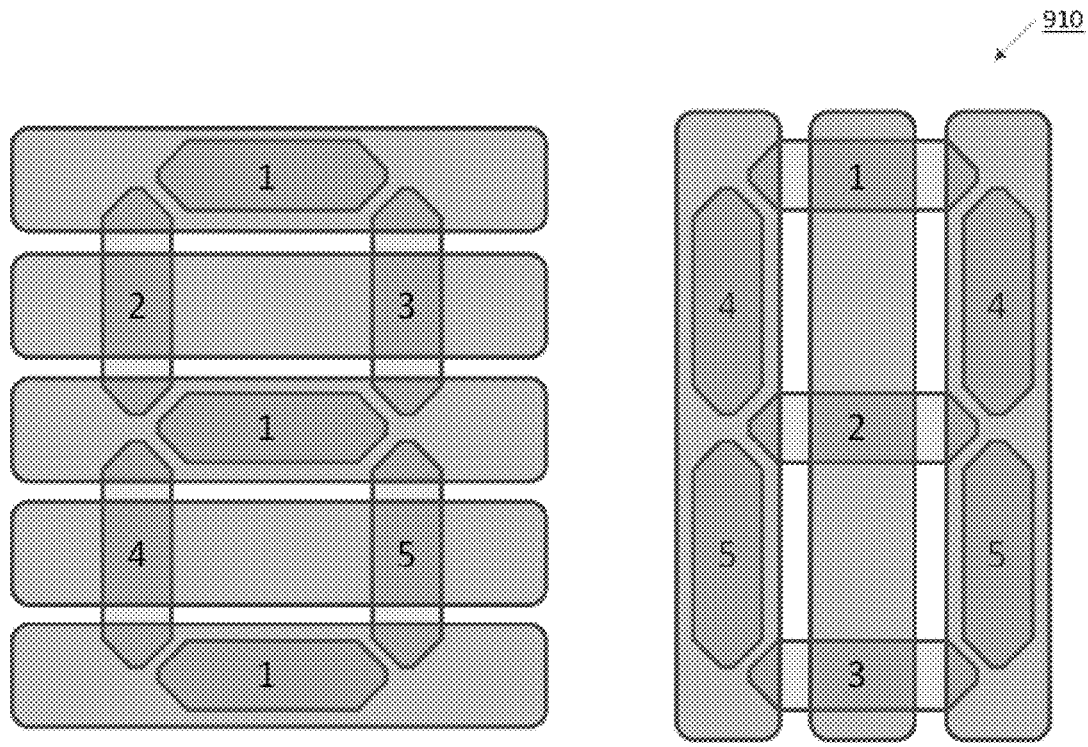
FIG. 31 is an alphanumeric display in accord with the present invention.

In general, the display 901 does not have to be updated from left to right or top to bottom as long as every group of pixels that is updated at the same time only triggers a response on one of the optical detector segments. Therefore, this same approach can also be used for segmented displays or displays with other shapes. An example 910 is shown in FIG. 31. Note that in FIG. 31, the figure on left can also be achieved with only three sensor stripes as illustrated in the figure on the right.

Figure 32:
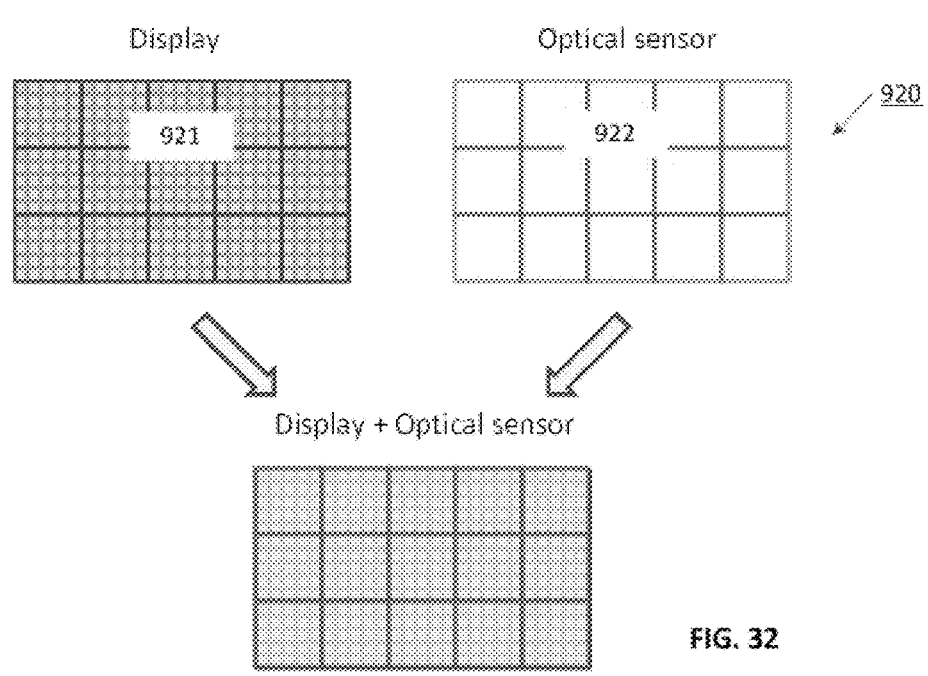
FIG. 32 is a verifiable display in accord with the present invention.

An example of an alternative 920 approach would be to have an optical sensor array 922 consisting of rectangular pixels that are large enough to overlap with 5×5 display pixels 921, as shown in FIG. 32. By updating the display such that in 25 steps every pixel in the 5×5 blocks is updated sequentially, the sensor pixels detect only the change per pixel resulting in a verification of the display state.

In the case of a bi-stable display, such as an electrophoretic or CTLC display, the display is always showing information, even when it is not powered. It is therefore best if the pixels are first switched to a known reference state (e.g. black) followed by switching them to the new state. That way the detector can detect the change in optical signal when the pixels are refreshed. Even when the image is static and does not need to change the information that is displayed, the verification action should trigger this update in order to correctly verify the state of the pixels by detecting a difference per pixel. In the case of a non bi-stable display, such as an LCD, the display is only showing information when it is powered and scanned. LCDs can either be segmented, passive matrix, or active matrix.

Segmented LCDs are direct-driven with each segment directly coupled to an output of a driver chip. Such displays can be driven in the same way as indicated in FIG. 31, where each group of segments is put in its on-state (or in its off-state) sequentially. It is also possible to use another defined grey state instead of the off or on state. When the scanning is done fast enough (e.g. >=50 Hz) the viewer just sees the image on the display, but the sensor can still sense the optical changes of the individual groups of segments.

Passive matrix LCDs are usually driven by scanning in a certain direction, for example from left to right. During the activation of a certain column of pixels, the pixels are put into a switching state that generates the right grey level for the frame time. After that all other columns are selected and addressed. By scanning fast enough (e.g. >=50 Hz) the viewer does not see the scanning per column anymore but just the complete image. By combining the passive matrix addressing scheme with a simplified optical sensor, as shown in FIGS. 30 and 32, the sensor will detect the switching of every individual pixel during the addressing. Through this scheme the optical state of every pixel can be verified.

Active matrix LCDs use a transistor circuit per pixel in order to generate a substantially constant switching state (i.e. light output) per pixel during a frame time. The pixels are refreshed a row-at-a-time at high speed in order to show moving or static images. In order to use the simplified detector as shown in FIG. 30 and FIG. 32, it is advantageous to insert a short pixel-off interval (or alternatively a reference pixel switching state) per row during every scan to detect the difference between the off-state and the new state for all the pixels by the simplified detector. This method requires a fast LC switching effect and detector.

Figure 33:
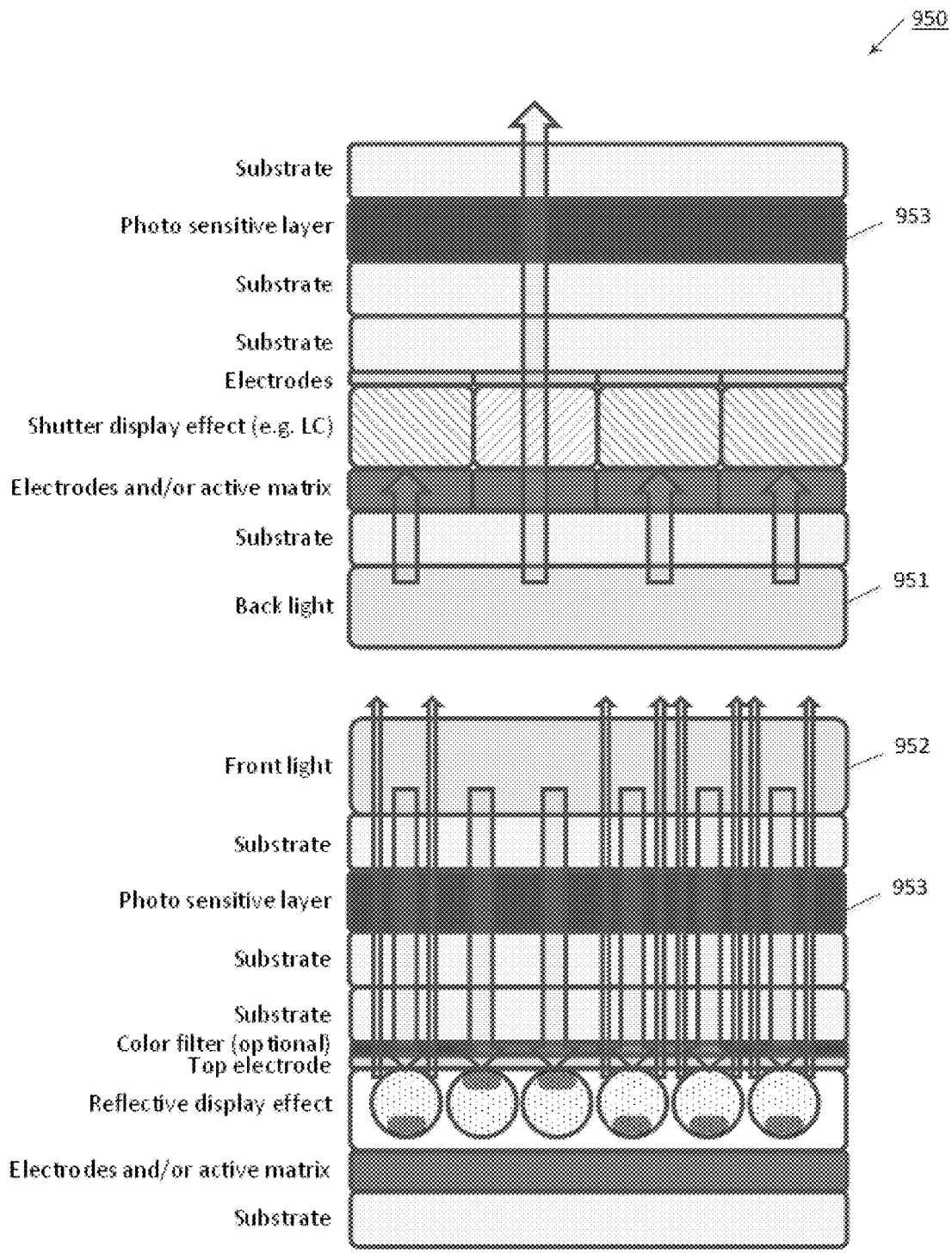
FIG. 33 is a back lit display with a shutter in accord with the present invention.

Scanning front or back light. In FIG. 33, example display 950 cross sections are shown with either a back light 951 or a front light 952. In these configurations it is possible to combine the resolution of the front light 951 or back light 952 with that of the optical sensor 953 such that the resolution requirement of the sensor is reduced.

Figure 34:
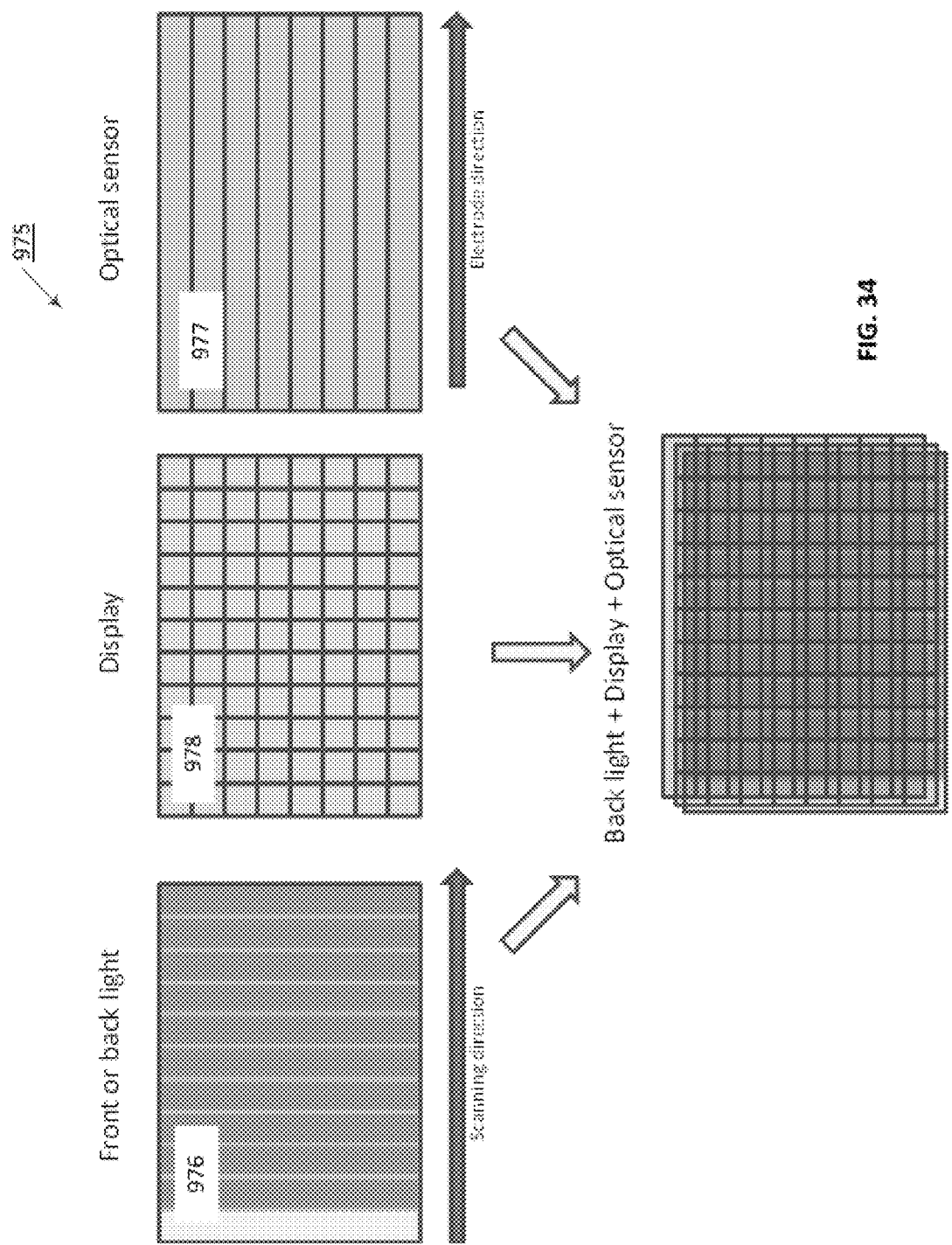
FIG. 34 is a verifiable display in accord with the present invention.

In FIG. 34 an example 975 is shown where the front or back light 976 is scanning from left to right over time, resulting in a simplified structure for the optical sensor 977. The scanning frequency can be so high that the viewer cannot perceive the scanning of the front of back light 976, while the optical sensor 977 can now detect the (change of) light per area of the display 978 that is lit by the front of back light. Important to note is that the combination of the front or back light 976 resolution and the optical detector 977 resolution must be equal to the pixel resolution of the display 978 in order to verify the pixels individually.

Again several configurations are possible that can be used for segmented, as well as, matrix displays. It is also possible to create back or front lights that scan in a different pattern, such as a block pattern instead of a stripe pattern. The scan pattern of the front or back light can be different than just a walking 1 (i.e. only one of the front or back light "pixels" on). It is also possible to have a walking 0 (i.e. all but one of the front or backlight "pixels" is on) or even a more complex pattern where also dimming between on and off can be used. It is advantageous to have at least a state where the complete back or front light is either on and off in order to detect the complete signal and the ambient only signal, respectively. These signals in combination with the scanning signals can then be used to create the per pixel verification of the state of the display.

Figure 35:
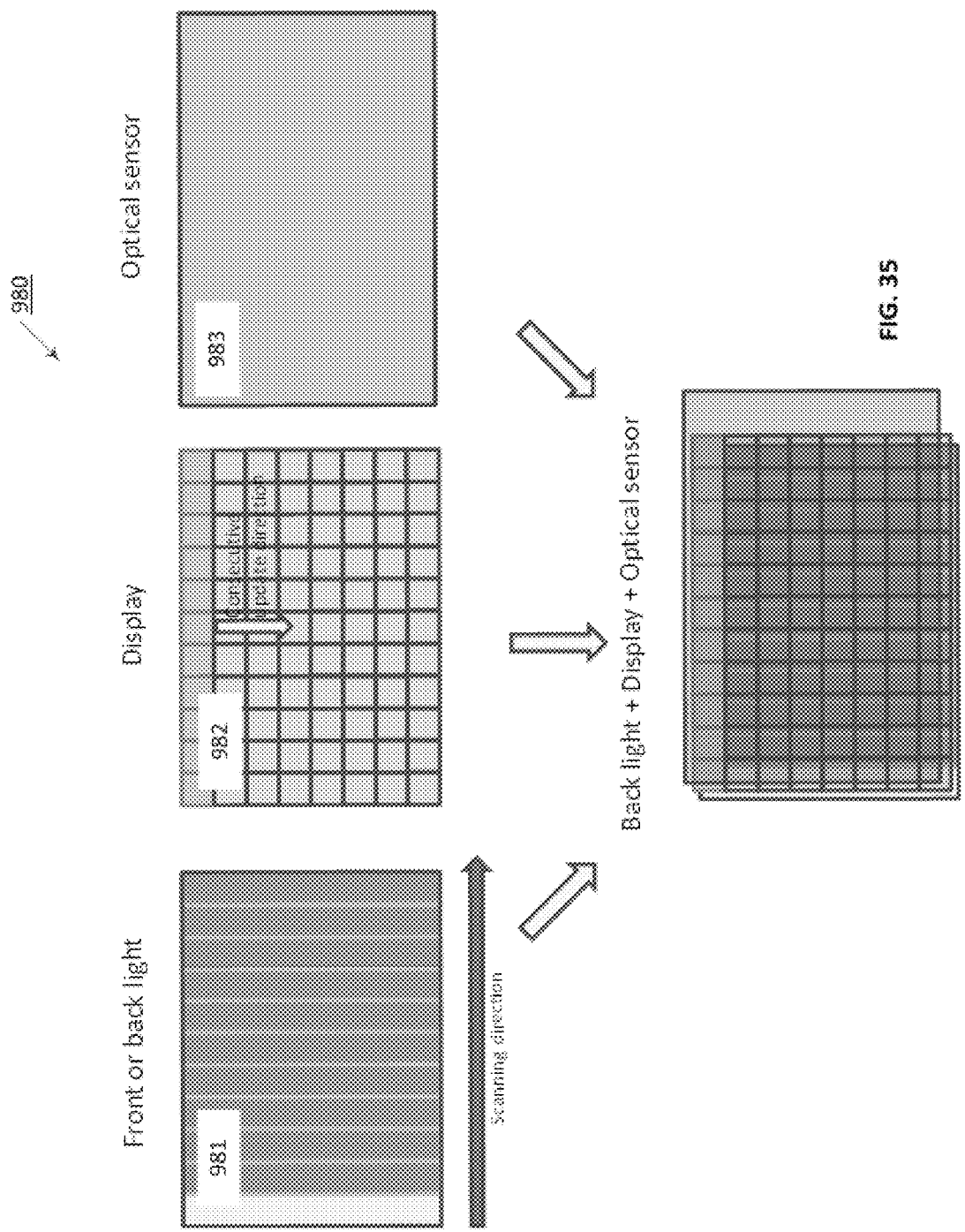
FIG. 35 is a verifiable display in accord with the present invention.

It is also possible to combine a consecutive update of the display with a scanning front or backlight in order to simplify the optical sensor. An example 980 is shown in FIG. 35, where the combination of the scanning front or back light 981 with the consecutive update of the display 982 results in the possibility to use an unpatterned optical detector 983. In order to sense the optical change of every pixel individually, the front or back light 981 has to do at least one complete scan per row of pixels that is addressed. As scanning front or back lights can typically scan at a high frequency (>=50 Hz) this is generally possible.

Figure 36:
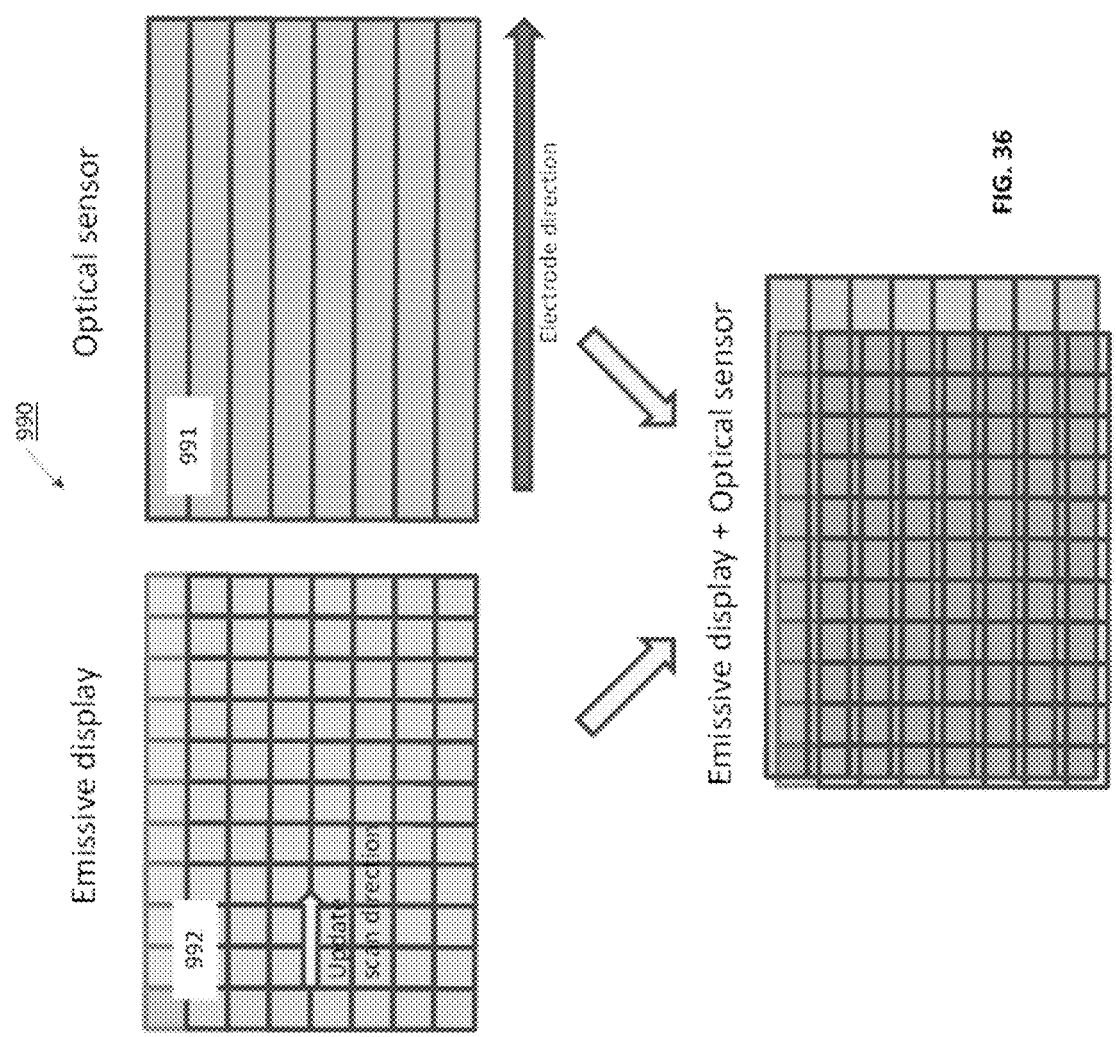
FIG. 36 is a verifiable display in accord with the present invention.

Emissive displays. In the case of an emissive display device 990, essentially the front or backlight and the display are integrated into one. By using a fast scanning update scheme, as discussed with reference to FIG. 26, it is possible to simplify the optical sensor 991 electrode structure, as shown in FIG. 36. The emissive display 992 is showing the image by emitting light from the pixels. Typically, this can be achieved by OLED, QD, or micro LED type of displays.

There are generally 3 types of emissive displays: segmented, passive-matrix and active-matrix. Segmented emissive displays are direct-driven with each segment directly coupled to an output of a driver chip. These can be driven in the same way as indicated in FIG. 31, where each group of segments is put in its on-state (or in its off-state) sequentially. It is also possible to use another defined grey state instead of the off or on state. When the scanning is done fast enough (e.g. >=50 Hz) the viewing cannot see it, but the sensor can still sense the difference in light output per pixel.

Passive matrix emissive displays are usually driven by scanning in a certain direction, for example from left to right. During the activation of a certain column of pixels, the pixels are flashed to a high intensity level. During the time all other columns are selected, the column does not emit light. By scanning fast enough (e.g. >=50 Hz) the viewer does not see the flashing anymore but just the complete image. By combining the passive matrix emissive addressing scheme with a simplified optical sensor, as shown in FIG. 36, the sensor will detect the flashing of every individual pixel during the addressing. Through this method the optical state of every pixel can be verified.

Active matrix emissive displays use a transistor circuit per pixel in order to generate a substantially constant light output per pixel during a frame time. The pixels are refreshed row-at-a-time at high speed in order to show moving or static images. In order to use the simplified detector as shown in FIG. 36, it is advantageous to insert a short pixel-off interval (or generally a reference state interval) per row during every scan to detect the difference between the off-state and the new state for all the pixels by the simplified detector.

It is also possible to use other scan methods for the active matrix emissive display, such as putting the pixels to the reference state individually while scanning the display, for example by putting one pixel to the reference state per frame. Accordingly, an unpatterned optical detector can be used to detect the optical state of each pixel by detecting the difference between the light output in the reference state and the actual state of the pixel. Verifying the state of all pixels takes longer in that case. Other patterns can also be used. Accordingly, by using smart addressing schemes, the sensor can be simplified resulting in a total system that is easier to manufacture.

Compensation for Ambient Light in Front or Backlit Systems

An issue may arise due to the dependence of the display state detection signal on the local or temporal fluctuations of the ambient light. This can lead to unreliable detection and verification of the pixel state.

Figure 37:
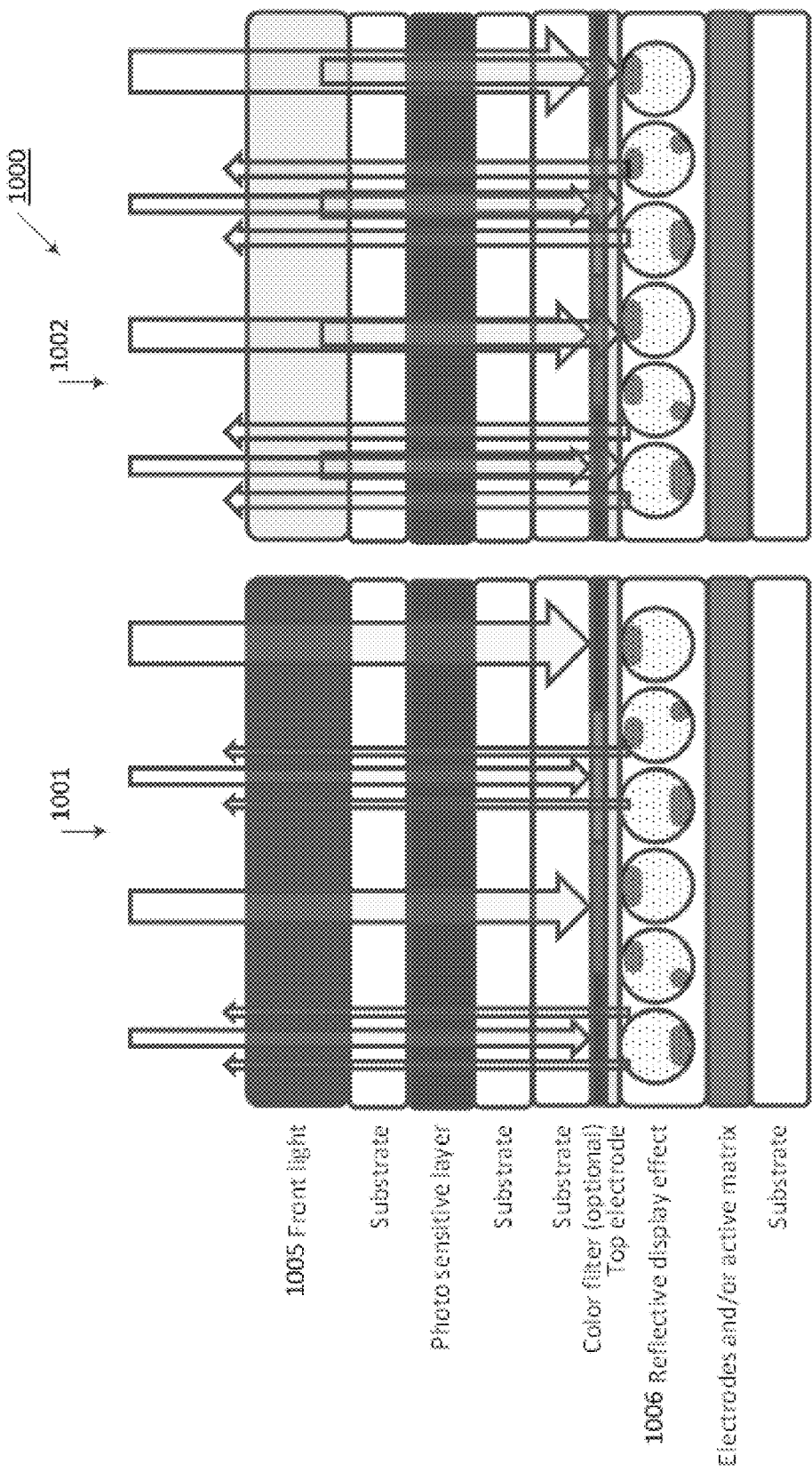
FIG. 37 illustrates measurements of a verifiable display in accord with the present invention.

In one example embodiment 1000 shown in FIG. 37, two consecutive measurements 1001, 1002 are made with a reflective display layer 1006 with a front light 1005. The first measurement 1001 is done with the lighting 1005 off, while the second measurement 1002 is done with the lighting 1005 on. The difference between the two signals corresponds to the ambient light contribution, which can thus be compensated for in the state detection signal (by subtracting a bias). In FIG. 37 the width of the arrow pointing towards the pixels represents the local amount of ambient light falling on the part of the display. Without these two consecutive measurements, the possible spatial fluctuations in ambient light intensity can easily lead to errors in the pixel state verification as there can only be a global ambient light sensor on the display that cannot take pixel to pixel variations of the ambient light intensity into account. This is eliminated by the consecutive measurement method described here.

The two measurements can be done closely space in time, where the front light 1005 is quickly flashed to the off state for the off measurement while it is on the remaining time or vice versa. Further is it also possible to use a scanning front light as proposed in FIG. 34 so that the measurement in the off- or on-state can be done in a scanning way to please the eye of the viewer. As a front light can generally be switched fast (i.e. 50 Hz or higher) the user does not need to see this as flashing, but more generally as a continuous light intensity (low if the front light is off or just below high when it is on).

Figure 38:
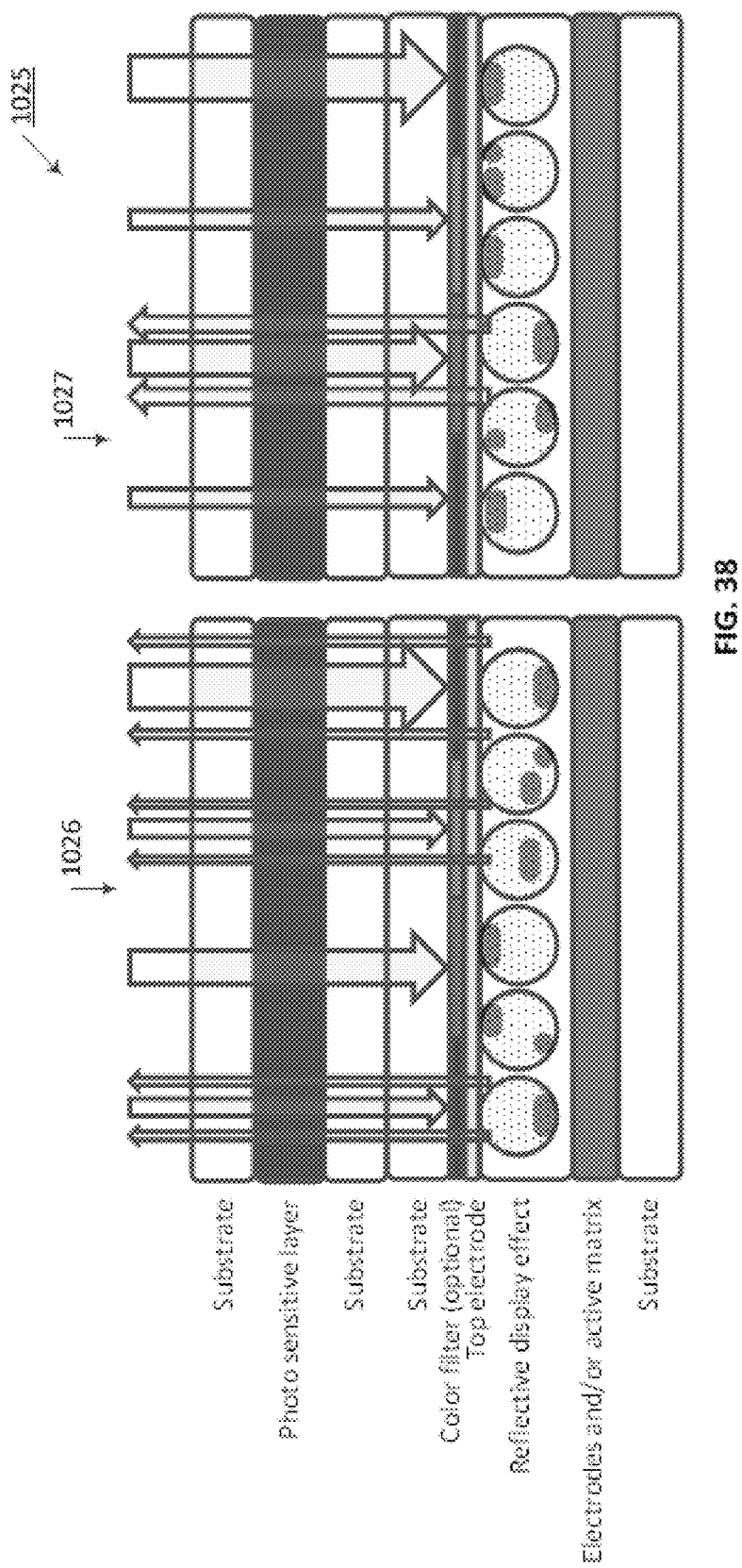
FIG. 38 illustrates measurements of a verifiable display in accord with the present invention.

Two consecutive measurements with a reflective system without a front light. In the case 1025 illustrated in FIG. 38, the first measurement 1026 is done with the regular image on the display, while the second measurement 1027 is done with the pixels switched to a known reference state. The second measurement 1027 where the pixels are switched to a known reference state result in a local measurement of the light intensity. This measurement can then be used to correct the first measurement for local fluctuations in the light intensity or to even discard a whole measurement if the lighting conditions were not good enough for a reliable state verification. It is also possible to even add more reference state measurements, such as a white and a black state reference measurement in order to increase the reliability of the verification. The measurements need to be done closely spaced in time in order to avoid temporal fluctuations in the light intensity to affect the pixel state verification. It is possible to make this multi-step verification measurement more pleasing to the eye of the viewer by doing the consecutive measurements pixel-by-pixel or in certain blocks of pixels in order to make the measurement less visible.

Figure 39:
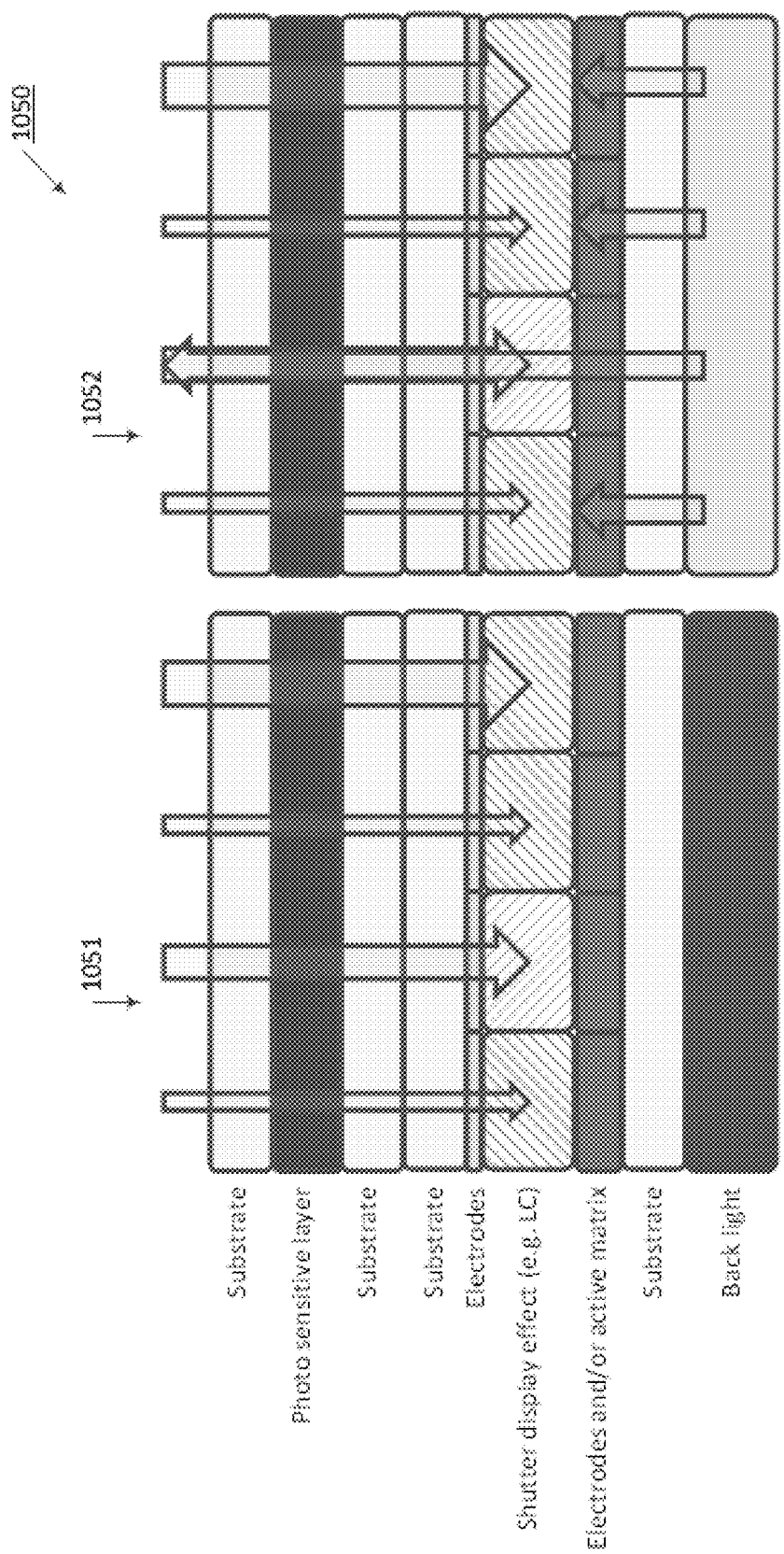
FIG. 39 illustrates measurements of a verifiable display in accord with the present invention.

Two consecutive measurements with a transmissive system with a back light. In the case 1050 illustrated in FIG. 39, the first measurement 1051 is done with the lighting off, while the second measurement 1052 is done with the lighting on. The difference between the two signals corresponds to the ambient light contribution. This works similar to device 1000 described with reference to FIG. 37.

A combination of switching the front or back light on and off in two consecutive measurements (FIG. 37 and FIG. 39) with switching to reference states (FIG. 38) is also possible for transmissive or shutter based displays. This could further improve the ambient light measurement compensation on a pixel basis.

Figure 40:
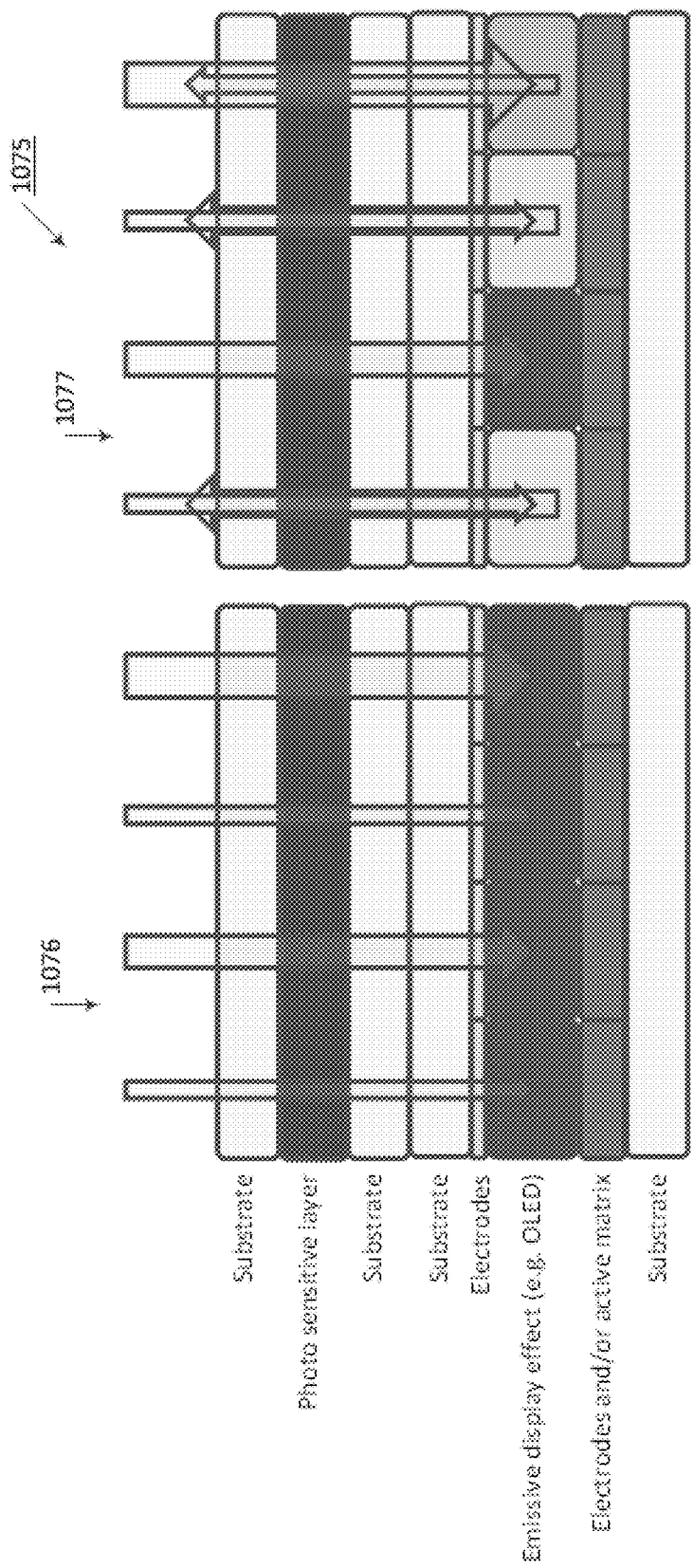
FIG. 40 illustrates measurements of a verifiable display in accord with the present invention.

Two consecutive measurements with an emissive display. In the case of the display device 1075 illustrated in FIG. 40, the first measurement 1076 is done while all pixels are off (not emitting). During this measurement the local (pixel) intensity is of the ambient light. The second measurement 1077 is done while showing the image. In this case both the ambient light and the composite signals are measured. By subtracting the two measurements, the ambient light component can be compensated for. As emissive displays can typically be switched fast (i.e. 50 Hz or faster) the two measurements can be spaced closely in time. It is also possible to do the two measurements per pixel or per row or column of the display in order to make it more pleasing to the viewer.

Generally, the two (or more) measurements that can be used to subtract the ambient light contribution can also be used to detect lighting conditions that are not good enough to do a reliable measurement. In that case multiple actions can be taken. One of them could be to temporarily increase the intensity of the artificial lighting (front, back or self-lighting), in order to reduce the relative contribution from the ambient lighting. It is also possible to do the reference measurement of the ambient lighting multiple times instead of only one time in order to not only assess the spatial fluctuation of the ambient light, but also the temporal fluctuation. This can help to assess whether the lighting conditions are reliable enough. Accordingly, this also prevents tampering with the display by creating ambient light patterns that would result in errors in the pixel verification measurements.

Tamper-Proof Verification

In some cases, optical and electrical verification methods can be manipulated or distorted resulting in an ambiguous or even a wrong state indication to the tag or backend system while in fact the display was showing the correct information in a perceivable way.

Figure 41:
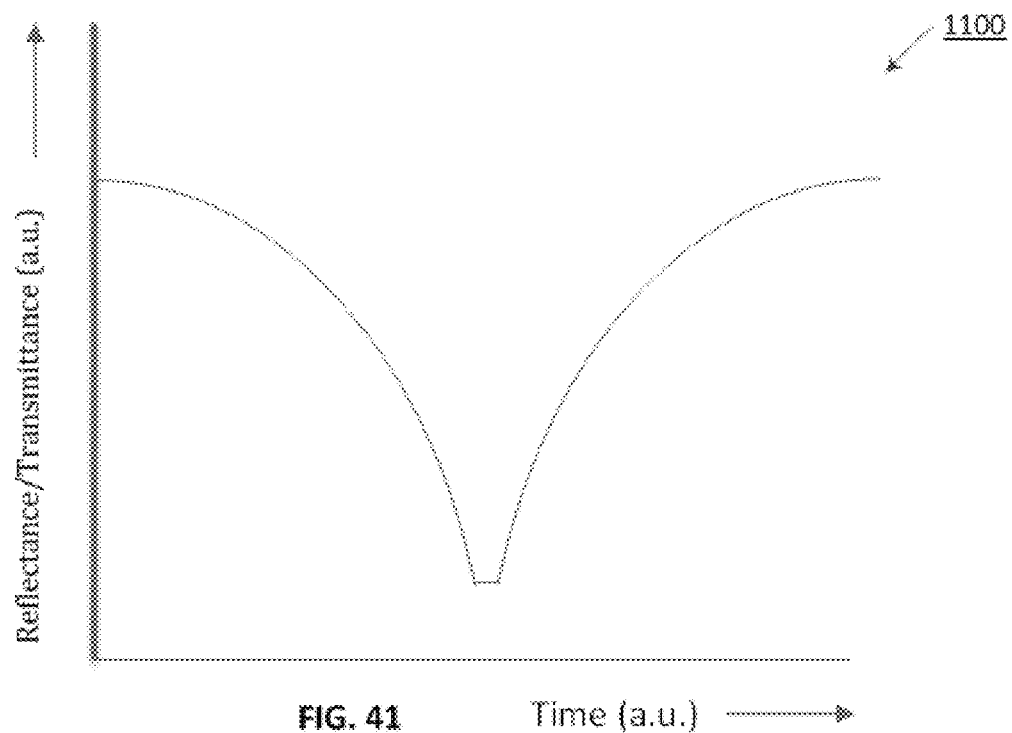
FIG. 41 is a switching curve of a pixel that is switched from white to black and back to white again in accord with the present invention.

Addition of a reference pixel. One or more reference pixels can be added that are switched in a predefined way during every verification cycle. For example, a display could have one reference pixel that is switched from white to black and back to white again during every measurement of the pixel state, as shown in FIG. 41. As this is a predefined switching cycle 1100 going through all possible optical states of a pixel, the measurement output for this pixel should also behave in a predicable way. By taking a measurement of the switching state at multiple points on the switching curve, the switching curve can be sampled. This should result in a smooth curve (i.e. the consecutive measurement should either be increasing or decreasing in value) with a certain minimum and maximum readout when the external conditions are good enough and constant enough for the measurements.

Figure 42:
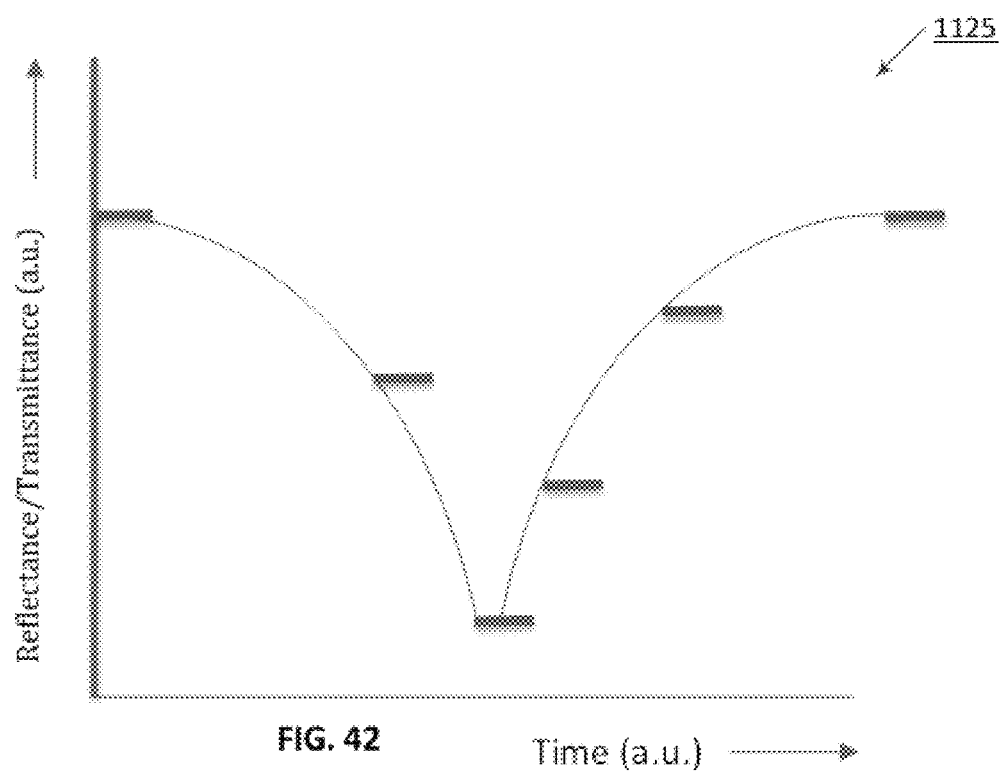
FIG. 42 is a switching curve of a pixel that is switched from white to black and back to white again in accord with the present invention.

By doing the state verification of all other pixels in the display during the same time as the time it takes to measure the reference pixel, the quality of the external environment during the pixel verification can be verified. Of course it is possible to add multiple reference pixels at certain positions in the display. It is also possible to use certain pixels that are part of the display as reference pixels. In that case the pixels that are used as reference pixels should first be brought into a reference state and at the end of the measurement should be put back into the state that is part of the image that is displayed. Further, it is also possible to do the reference pixel measurement in different ways. For example, the switching curve could be sampled by switching the pixel to a number of states on the switching curve and keeping it in that state for a certain amount of time to do the measurement, before switching it to the next state to be measured, as shown in FIG. 42.

Switching curves. The switching curves of the pixels to be verified can be measured. This is especially useful for displays that are not bi-stable, such as LCD or OLED, as they are continuously driven. The pixels are switched from their current state to a certain reference state and then back to the current state again. The reference state can either be the full on or off state or a small difference compared to the current switching state such that the user can hardly notice the difference. During this time, not only the current state is measured, but also the reference state or even states in between the current state and the reference state. As the switching curve is known and smooth the multiple measurements should result in a predicable relative outcome. When the external environment is fluctuating in time or position or is in general not good enough to do the measurement reliably, the series of measurements will result in a switching curve that is not as predicted. The measurements can be done optically and/or electrically in ways already disclosed before.

Multiple consecutive measurements. By doing more than one measurement at different moments in time, it is possible to detect a fluctuating environment when the pixel state is constant. This can help to detect if external lighting or electrical conditions are fluctuating in time. For example, the verification of the pixel state can be done twice, closely spaced in time. When the two measurements differ too much the pixel state verification is not reliable. In that case another measurement could be done or a (error) message could be displayed, stored or sent.

Environmental sensors. By adding environmental sensors, such as optical sensors, electromagnetic radiation sensors, vibration sensors, acceleration sensors, etc. it is possible to sense if the environment is good enough to perform a reliable pixel verification and if the environment is not fluctuating in time. The sensors can be added to the display system and it is also possible to add multiple sensors of the same type at different locations. The sensors would be read-out before, during and/or after the pixel verification in order to ensure that during the whole verification measurement the environment was good enough and not fluctuating to reliably do the verification.

Combinations of measurement data. By combining multiple measurements, it is possible to greatly reduce the chance of tampering with the system. External sensor data, reference pixel data, optical pixel verification data, electrical pixel verification data, etc. could all be combined such the reliability of the measurement is increased. For example, sensors could be used before, during, and after the verification in order to detect if the external environment is good enough and stable during the verification. This could give data such as: the amount of external light is too low or too high or fluctuated over time or locally during the verification. Or it could detect a source of electromagnetic radiation that is too high to do reliable electrical measurements. Further, an optical verification system could be used to sense the amount of light reflected, emitted or transmitted per pixel, while an electrical verification system at the same time senses if the (switching or test) voltages put on the electrodes really reach the other end of these electrodes and also measures the capacitance of and/or the current flowing into each pixel. This combined information from multiple sources can make the system extremely robust against tampering.

Adding a static or dynamic watermark to the image. By adding a certain visible or even better an invisible pattern to the image that is displayed or to the update of the image, it is possible to detect tampering with the system. When the watermark cannot be detected, the system could well be hacked or be tampered with. As a response the system can then shutdown and/or a (error) message could be displayed, stored or sent.

The types of unique patterns can be any of:

Final image watermark.

A unique contrast modulation between parts (e.g. pixels or groups of pixels) of the display that could well be invisible to the viewer but measurable by the detection system.

Watermark during the update of the image.

A unique timing between the sequential update of several parts (e.g. pixels or groups of pixels) of the display.

A unique modulation of the electrical signals (e.g. additional high frequency modulation, modulation in frame rate, AC/DC signal added to voltage levels, etc.).

A sequence of image patterns displayed before displaying the final information. This sequence could also have a pattern of delays between the subsequent images.

For bi-stable displays especially the watermarking in the final image is useful. For non-bistable displays, such as LCD or OLED it is also very useful to add watermarking in the update. The unique patterns or watermarks can be stored in the system upon fabrication or be a generated pseudo random series that uses the unique system ID as seed. Alternatively, the unique pattern could be sent by the back-end system to the system using any known way to make a unique one-time sequence.

Accordingly, the disclosed embodiments result in a display device where tampering can become virtually impossible during the verification process. For example, placing a mirror that is a bit off-angle in front of the display in order to create an ambiguous spatial fluctuation in the lighting conditions can be detected either by using a reference pixel that detects an abnormal response when switching, by measuring pixels in a number of different switching states, by measuring the switching curves of pixels, by external detectors that detect different light intensities at different locations or by using electrical measurements of the pixel state instead of optical. Using a source of electromagnetic radiation to create electrical noise for the measurements can also be overcome by detectors, reference pixels, measuring switching curves, or using an optical detection system. When complemented by watermarking, the complete system can become tamperproof.

In using a device, such as an intelligent label, users may receive information visually as discussed above, and users may in some cases also receive information audibly. Similar to the need for verifying the visual information, there is also a need for verifying the audible information. Described herein are systems and methods for determining the audible output from intelligent audible devices configured to generate sounds in response to events as determined by intelligence integrated within the device.

Of particular interest are sounds audible to humans, although it should be understood that the systems and methods described herein extend to inaudible sounds that can be detected by animals with sensitivity to higher (e.g. ultrasound) and lower frequencies (e.g. infrasound) than humans, and machines. "Audible messages" are the audible (acoustic) outputs from intelligent audible devices. Audible messages may be any of many forms including a single simple beep or tone, periodic or random signals, complex signals (e.g. varying frequencies or volumes), recorded messages (e.g. voice or music), artificially generated speech, or any combination of the aforesaid, etc.

In general, 'determining' refers to the actions of detecting, converting and interpreting audible messages. Determination is the result of the cumulative actions required to ascertain meaningful information from the audible output. Those actions for example, could include comparing detected audible patterns to reference values or parameters that correlate to meaning (e.g. an audible pattern that is characteristic of a letter, number or word, or a specific alarm pattern). Verification is a subset of determination and includes the actions of comparing the actual audible message to an intended message. Verification for example, could involve comparing a 'digital fingerprint' of an intended audible message (e.g., a prerecorded or digitally generated message) to a digital fingerprint of the actual audible message projected by the intelligent audible device. The digital fingerprint of the actual audible message could be generated by detecting the actual audible message (the one projected) and converting it into a digital fingerprint.

Circuitry in an intelligent audible device initiates the generation and determination of audible messages in response to one or more "events". Exemplary events are changes in (or exceptions to set thresholds) monitored environmental or internal conditions, mechanical action, detected sound, location, time (elapsed or absolute) etc. They may include interactions between the intelligent audible device and 'stakeholders', that is anyone that has an interest in the good or service. Further, they may include events associated with the determination of past and present (concurrent) audible messages as well as conditions relating to their perceptibility (e.g., ambient noise, reflected noise, etc.). They may also include internal events, such as tampering, malfunction, and loss of power.

Exemplary intelligent audible devices are intelligent labels and hardware agents such as those described in the U.S. patent application Ser. Nos. 14/479,055; 15/228,270; and Ser. No. 15/602,885; all of which are incorporated herein by reference as if set forth in their entirety. Intelligent audible devices, however, may take many different forms.

Figure 43:
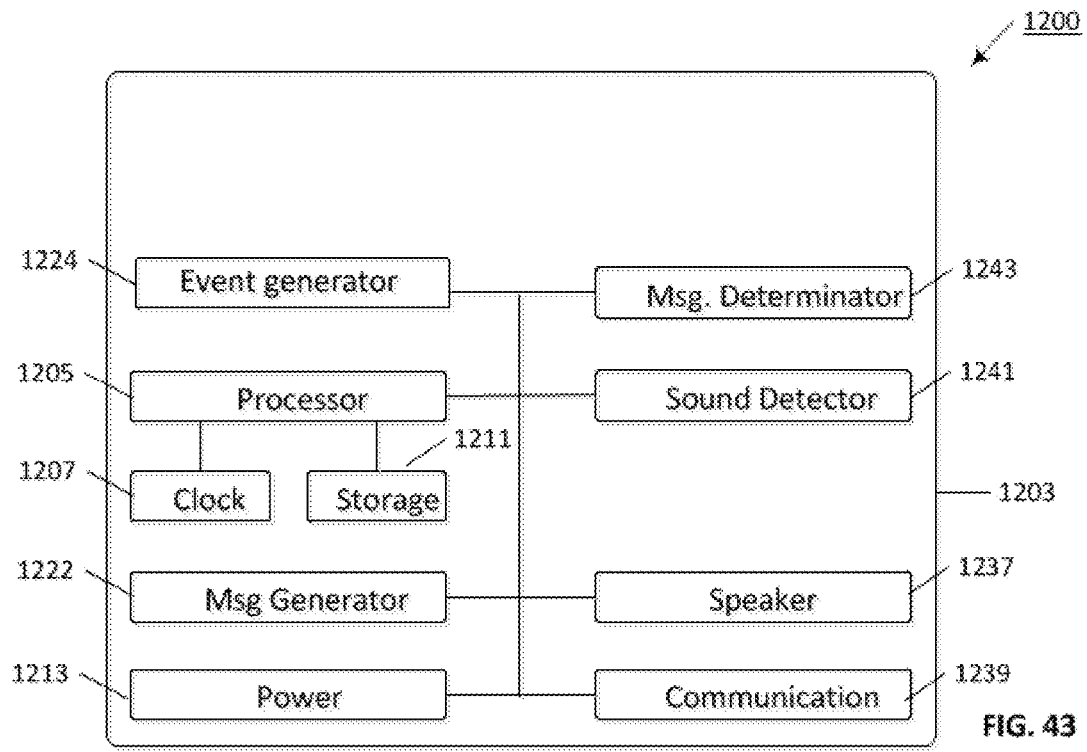
FIG. 43 is a block diagram of an intelligent audible device in accord with the present invention.

Referring now to FIG. 43, and intelligent audible device 1200 is illustrated. In one example, the intelligent audible device is in the form of an intelligent label 1203. The intelligent label 1203 may generally be constructed as set forth in U.S. patent application Ser. No. 14/479,055. It will be understood that the intelligent label 1203 may take other forms, such as being constructed in the form of a hardware agent as set forth in U.S. patent application Ser. No. 15/602,885. The intelligent label 1203 has a processor 1205 that controls and operates the functionality within the intelligent label 1203. The processor 1205 typically has a clock 1207 for managing processor functions, as well as providing timing functions that can provide actual and elapsed time. The processor also has storage 1211, which may have a combination of erasable and non-erasable memory.

The intelligent label 1203 also has a power source 1213. This power source often will be in the form of a battery, however it will be understood that other sources such as solar photovoltaic cells or RF harvesting circuitry may be used. The intelligent label 1203 also has a message generator 1222. The message generator 1222 is constructed to form messages that are intended to communicate particular information to a listener. For example, the message may be a simple alarm tone, or may be a more complicated human understandable instruction. It will be understood that the message may take many forms. The message generator 1222 may make a message signal for immediate communication, or the messages may be stored locally for use at a later time. In this way, the message generator 1222 may have its own memory, or may use storage 1211 of the processor 1205.

An event generator 1224 is constructed to provide a signal upon the occurrence of a particular event. That event can take many forms, such as events internal to the intelligent label 1203, such as an actual or elapsed time, or the event may be external to the intelligent label 1203, such as temperature, location, or shock. The event may also be receiving a message from another device from a wired or wireless connection. It will be understood that the event can take many forms. The event generator may have a set of rules for determining when an event signal is to be sent. Once the event generator has determined that an event has occurred, the event generator generates a signal that causes the message generator 1222 to cause the audio output transducer 1237 to project the message into the local environment. It will be understood that the audio output transducer can take many forms, such as a sound speaker, piezo-electric device, buzzer or other electro-acoustic device. It will be further understood that the message signal to be projected through the audio output transducer may be adjusted according to environmental conditions. For example, in a loud environment the volume of the message may be increased, or the frequency of an alarm may be adjusted to avoid frequencies that are in high use in the environment. It will be understood that the output message may be adjusted in many ways to accommodate the actual environment.

The event signal is typically used to activate the audio input transducer 1241. It will be understood that in some cases the audio input transducer 1241 may be continuously activated, or may have been activated responsive to other events. The audio input transducer 1241 may be for example a microphone in which case it only needs to be active during the time that the intended message is expected to be announced. The audio input transducer may be in close proximity to the audio output transducer, or may be spaced apart. It may consist of a single audio input transducer or multiple audio input transducers—one e.g. to detect ambient noise—directed away from audio output transducer, and one directed toward the audio output transducer, and possibly a third audio transducer to detect reflected audio from audio output transducer. In another example, the audio input transducer may be an array of audio input transducers. The sound captured by the audio input transducer 1241 will typically undergo an analog to digital conversion, and the digitized sound signal is then transferred to a message determinator 1243. The message determinator processes and analyzes the captured sound, and compares it to the intended message. The message determinator 1243 is thereby able to provide an indication of whether or not the intended message was properly projected from the audio output transducer 1237.

Once a determination has been made whether or not the intended audible message was perceptibly projected, that result may be stored locally on the intelligent label 1203, or may be communicated to a remote location using communication circuitry 1239. It will be understood that this communication circuitry may be a wired communication circuit, or may provide for wireless communication. In one example, the wireless communication would be an RFID or NFC communication radio. It will be understood that the communication circuitry 1239 can take many forms.

Figure 44:
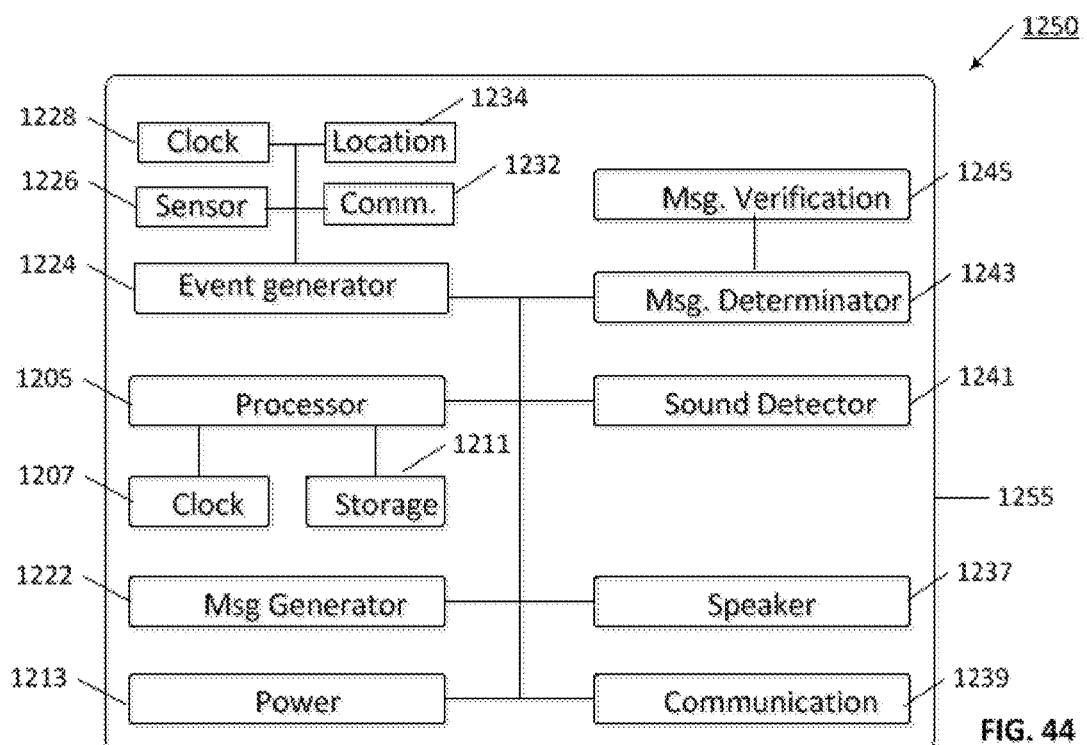
FIG. 44 is a block diagram of an intelligent audible device in accord with the present invention.

Referring now to FIG. 44, another intelligent audible device 1250 is described. Intelligent audible device 1250 is similar to intelligent audible device 1200 described above. The circuitry described with reference to intelligent audible device 1200 will not be described again, and only additional circuitry and functionality will be discussed with reference to intelligent audible device 1250. The intelligent audible device 1250 is again illustrated as an intelligent label 1255. The intelligent label 1255 is illustrated showing that the event generator 1224 may have one or more sensors 1226 for sensing environmental conditions. By way of example, these conditions may be temperature, shock, vibration, humidity, lighting conditions, or any other environmental condition. These sensors may be continuously active, or may be activated by the processor at particular times. The event generator is constructed to monitor the sensor 1226 and monitor for the presence of a particular condition, or that a condition has exceeded a predefined threshold. When that happens, the event generator generates an event signal.

The event generator may also have its own clock 1228 for providing actual or elapsed time. The event generator 1224 may also have location sensing circuitry 1234, such as a GPS receiver, for determining a particular location. Accordingly, upon an actual or elapsed time, or being in a particular location, the event generator may generate an event signal.

The event generator 1224 may also have its own communication circuitry 1232. This communication circuitry 1232 may be a wired connection, or may be a wireless connection such as an RFID or NFC radio. Accordingly, upon receiving a message from the communication circuitry, the event generator may generate an event signal.

The intelligent label 1255 is also illustrated with the message determinator 1243 having separate circuitry 1245 for performing message verification. In verifying that the intended message was actually projected, a verification may be performed on the actual intended message as compared to the actual captured sound. However, this may require considerable power and processing capability. In a more efficient manner, the intended message is analyzed and a fingerprint, profile, or signature of that intended message is generated. Typically, the fingerprint will be substantially smaller than the actual intended audible message. Once the actual sound has been captured, the actual sound is also analyzed to generate a fingerprint, profile or signature. Accordingly, the message verification 1245 may then be efficiently performed by comparing the intended fingerprint to the actual fingerprint. Further, the message verification 1245 may additionally provide a confidence value that indicates the closeness in fit between the intended message and the captured message.

Figure 45:
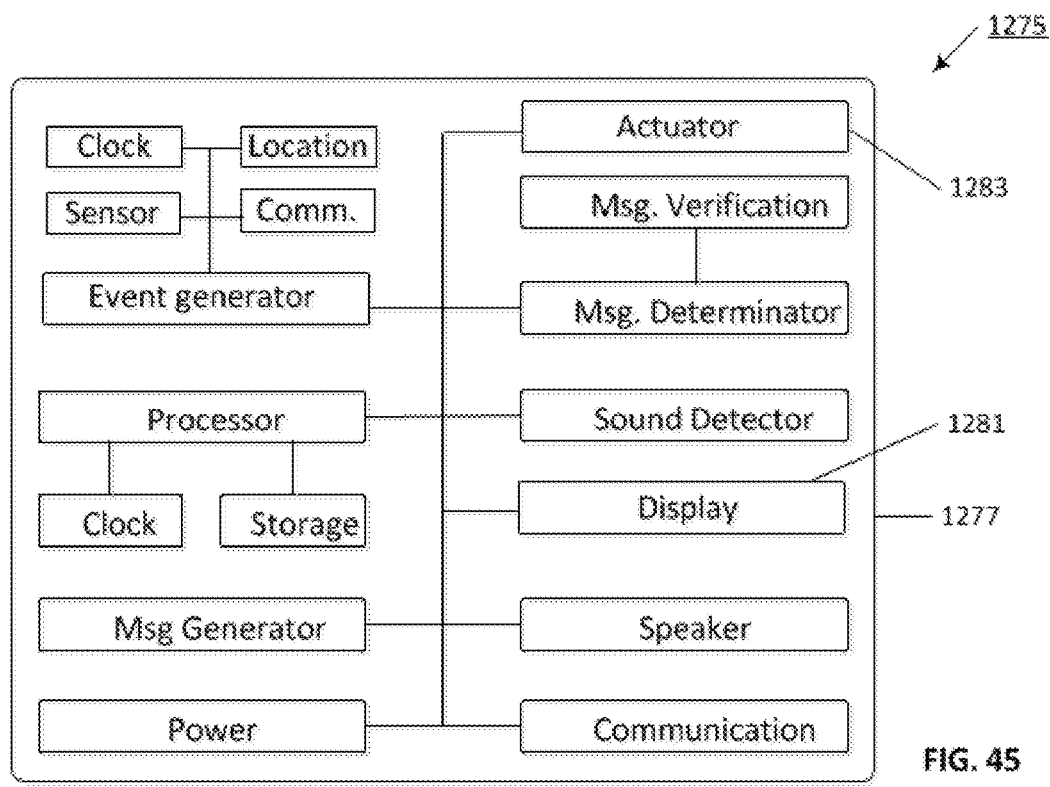
FIG. 45 is a block diagram of an intelligent audible device in accord with the present invention.

Referring now to FIG. 45, another intelligent audible device 1275 is illustrated. The intelligent audible device 1275 is similar to intelligent audible device 1250 described above, so only additional circuitry will be described. Intelligent audible device 1275 again is in the form of an intelligent label 1277. The intelligent label 1277 may have a visual display 1281, this display may be, for example, an LED, LCD, electrophoretic display or other type of display as previously described. It will be understood that the intelligent label may also have visual verification circuitry and function as described previously.

The intelligent label 1277 may also have an actuator 1283. Generally, the actuator is a device which allows the intelligent label 1277 to operate in a very low power state until a particular action has been taken. On that action, such as pulling a tab and breaking a circuit, or completing a seal and closing a circuit, the processor and the other circuitry on the intelligent label 1277 may be placed in a power-on or activated state.

Figure 46:
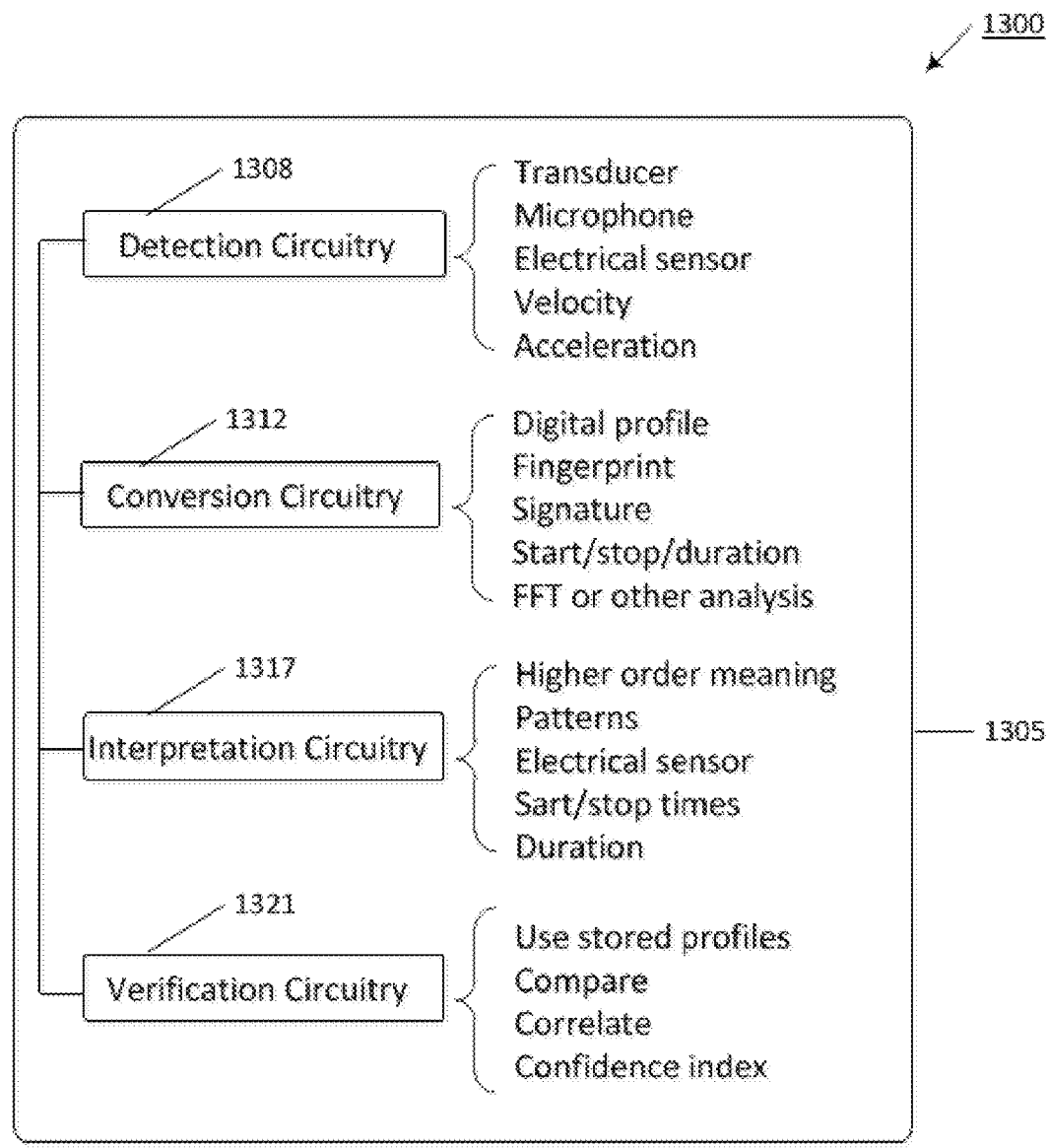
FIG. 46 is a block diagram of determinator circuitry for an intelligent audible device in accord with the present invention.

Referring now to FIG. 46, message determinator circuitry 1300 is described. The message determinator circuitry 1300 is illustrated on an intelligent label device 1305. In this way, the message determinator circuitry 1300 is similar to the message determinator described with reference to FIGS. 43, 44, and 45. The message determinator circuitry 1300 has detection circuitry 1308. This detection circuitry is used to capture the actual sound that was projected from the intelligent label's audio output transducer. This detection circuitry may include a audio input transducer or other type of sound transducer. It may also detect velocity and acceleration of sound waves, or may be an electrical signal sensor. The electrical signal sensor would be used to detect the change in voltage, current, or capacitance of a device that is acting responsive to the sound waves. Generally, the detection circuitry 1308 will create an analog sample of the sound that is then passed to the conversion circuitry 1212.

Conversion circuitry 1212 generally will convert the analog sample to a digital sample. Although this digital sample could be used directly for comparison, it is more efficient to convert the digital sample in to a more compact form. For example, the conversion circuitry 1312 may convert the digital sample into a digital profile, digital fingerprint, or digital signature that represents the digital sample, but is in a far easier to use form. In a specific example, the conversion circuitry 1312 can provide an FFT analysis on the digital sample, which can then be used as a very simple digital profile. It will be understood that many types of digital profiles or other types of analysis can be used to create a shorthand for the actual digital sample. In generating the digital profile, the interpretation circuitry 1317 will be able to use information regarding the start and stop times of the sound, as well as the duration of the sound.

The digital sample and the digital fingerprint may then be used by interpretation circuitry 1317 to extract higher order meaning from the captured sound. For example, the interpretation circuitry 1317 may look for particular patterns, variations, frequency changes, cadence changes, or other features that may indicate that the intended message was projected. Verification circuitry 1321 is also used to compare the fingerprint of the captured sound to a fingerprint of the intended sound. This intended sound fingerprint could be generated at the time the message is played, however more likely the intended fingerprint would be determined beforehand, and stored for later use. Accordingly the verification circuitry 1321 can use this stored fingerprint and directly compare it to the captured fingerprint. In doing so, the verification circuitry 1321 would correlate the fingerprints by aligning start times, stop times, and durations, or embedded marks. The comparison can then indicate whether or not the intended message was actually projected. In a further example, the verification circuitry 1321 can provide a confidence value that would be a numerical indication of the closeness of fit between the actual fingerprint and the intended fingerprint. The verification circuitry may thereby require that the confidence value exceed a predefined threshold before it will be determined that the captured message perceptibly matched the intended message. And depending on the confidence value, optionally repeat the sequence or initiate another action.

Figure 47:
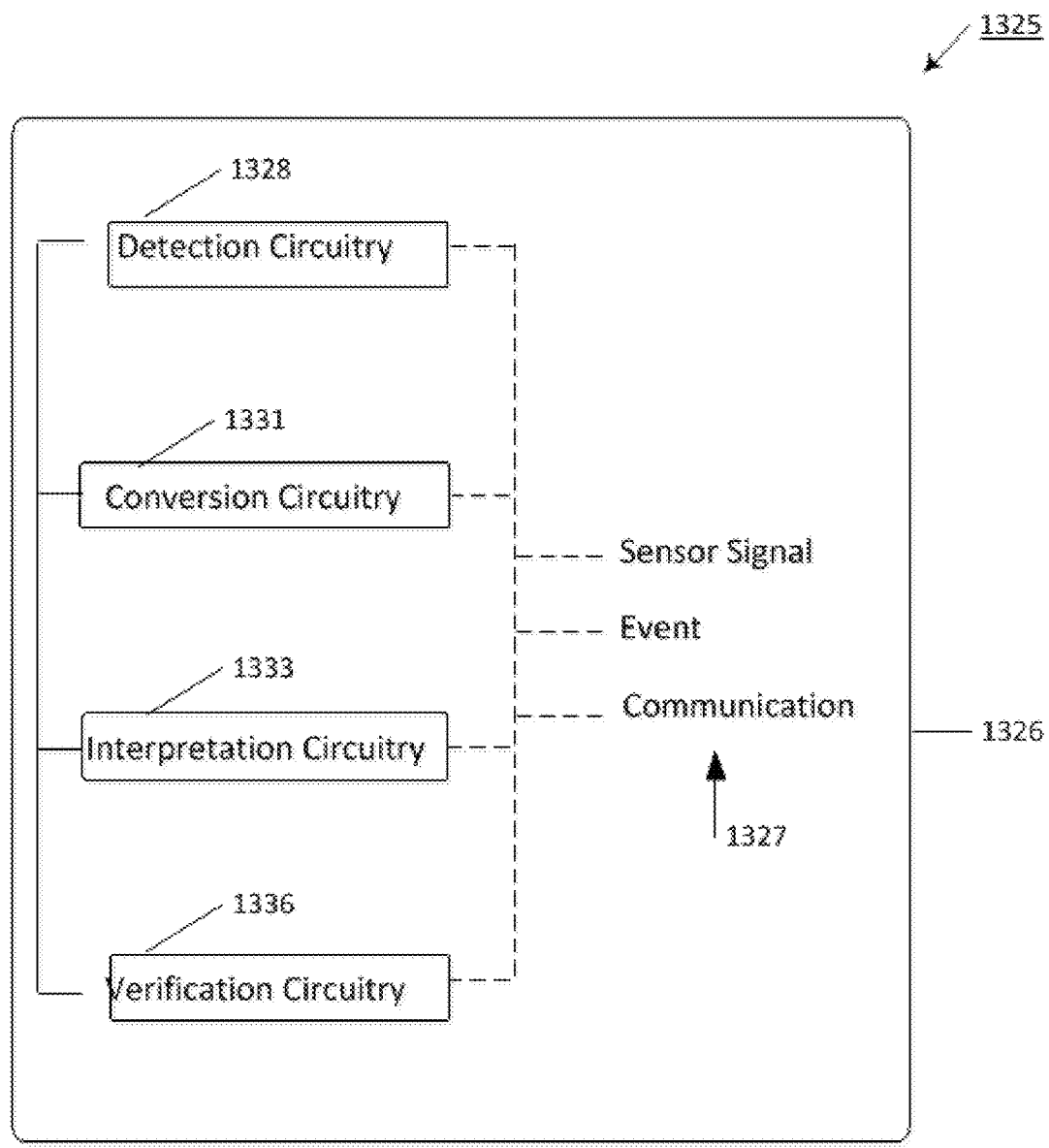
FIG. 47 is a block diagram of determinator circuitry for an intelligent audible device in accord with the present invention.

Referring now to FIG. 47, determinator circuitry 1325 is illustrated. Determinator circuitry 1325 is similar to determinator circuitry 1300 described with reference to FIG. 46, so only the differences will be described. For the intelligent label 1326, input signals 1327 are provided to detection circuitry 1328, conversion circuitry 1331, interpretation circuitry 1333, and verification circuitry 1336. It will be appreciated that the input signals 1327 may be provided to fewer than all of the detection, conversion, interpretation, and verification circuitries. The input signals may be used to adjust the way the determinator circuitry performs its functions depending upon external causes. For example, a sensor may be used, such as the microphone, to detect background ambient noise. Such noise may initiate an event or affect the way the detection, conversion, and interpretation processes may need to be performed.

Figure 48:
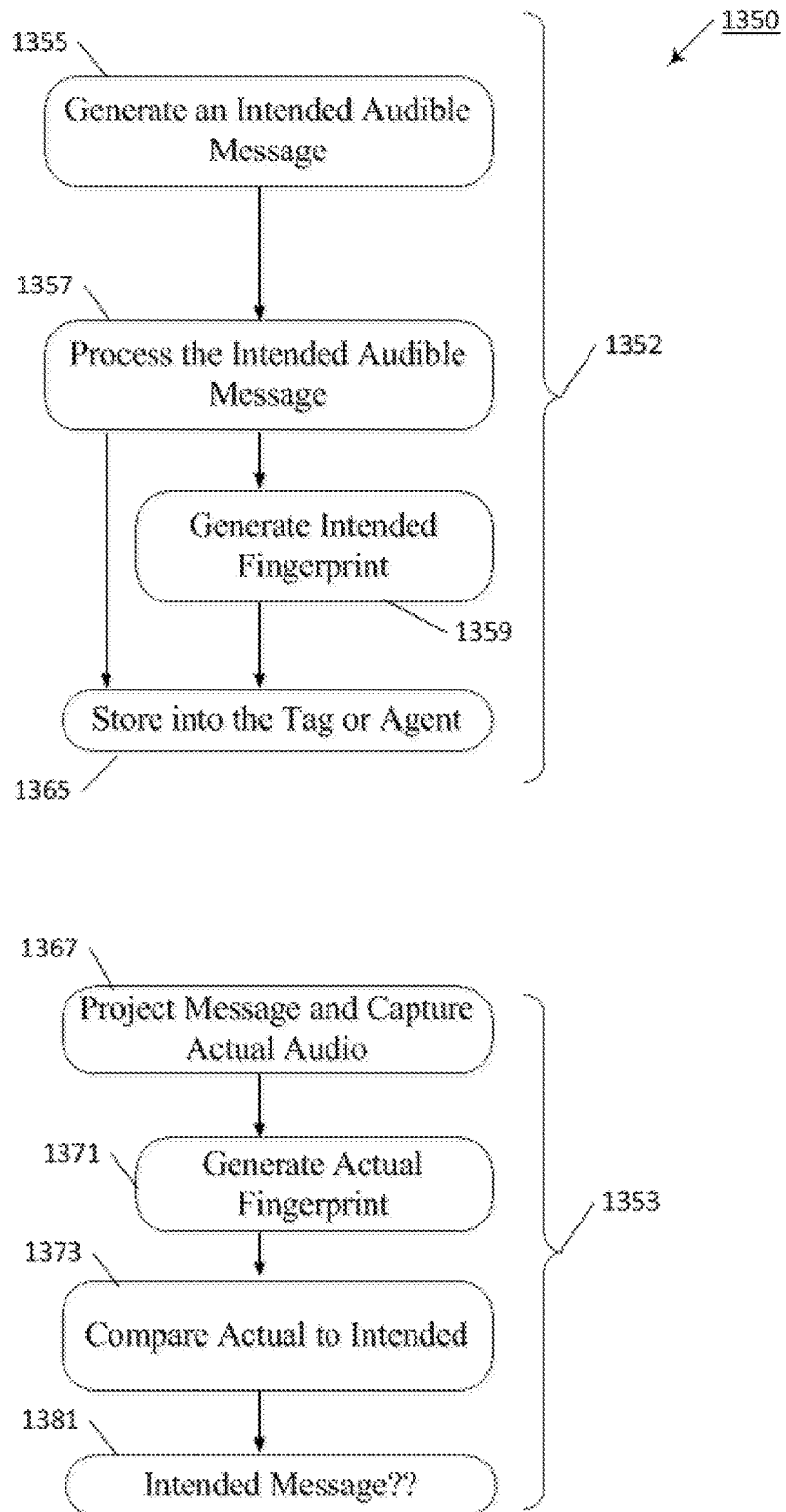
FIG. 48 is a flow chart of method of operating an intelligent audible device in accord with the present invention.

Referring now to FIG. 48, a method 1350 is illustrated for providing an intelligent audible device. Method 1350 has a first portion 1352 which are processes performed before the sound or message is projected into the local environment. Method 1350 also has a second portion 1353 which is performed as or after the sound is being projected into the local environment. Method 1350 starts by generating an intended audible message 1355. This message may be a simple alarm, or may have a higher order meaning, such as language to be understood by a human. It will also be understood that the audible message may be at ranges not intended for human hearing, but for machine or animal hearing. The audible message is then processed as shown in block 1357. The purpose of the processing is to anticipate the actual environment in which the sound will be generated, thereby allowing a certain level of predictability as to what the captured sound should sound like. The message may also be calibrated according to the specific type of hardware that is used on the intelligent audible device, such as the particular audio output transducer and the particular audio input transducer. The intended message may also be processed according to a particular environment, such as anticipated level of background noise. Advantageously, noise cancellation schemes including passive (e.g. analog or digital filtering), or adaptive (active) noise suppression or cancellation may be employed, which may incorporate more than one (e.g. an array) of audible input transducers. Even more advantageously, the noise cancellation schemes may be specifically tuned to the set of intended audible messages for the device. It will be understood that there are many ways in which the audible message can be processed to anticipate the actual environment. Once the intended message has been fully processed, it is converted in to a digital fingerprint, digital profile, or other type of signature, as illustrated in block 1359. This digital fingerprint can then be stored into the intelligent agent as shown in block 1365. In some cases, it may also be useful to store the intended message and the processed message in the intelligent audible device. It will be understood that the intelligent audible device may take many forms, such as the intelligent label and hardware agent as described previously.

At some time an event will occur, either internal or external to the intelligent audible device. When that event happens, the intelligent audible device will cause the intended audible message to be projected into the local environment through an audio output transducer as shown in block 1367. Accordingly, concurrent with activating the audio output transducer, the intelligent audible device will activate its audio input transducer or capture device to capture the actual audio that is being projected into the environment, as shown in block 1367. The captured audio is used to generate a fingerprint of the actual audio as illustrated in block 1371. The process for creating the actual fingerprint is similar to the process for generating the intended fingerprint and is described with reference to block 1359. The actual fingerprint may then be compared to the stored intended fingerprint to determine whether or not the actual message was projected, as shown in block 1373. Depending upon the level of correlation or closeness of fit between the actual fingerprint and the intended fingerprint, it may be determined whether or not the intended message was perceptibly projected into the actual environment, as shown in block 1381

Figure 49:
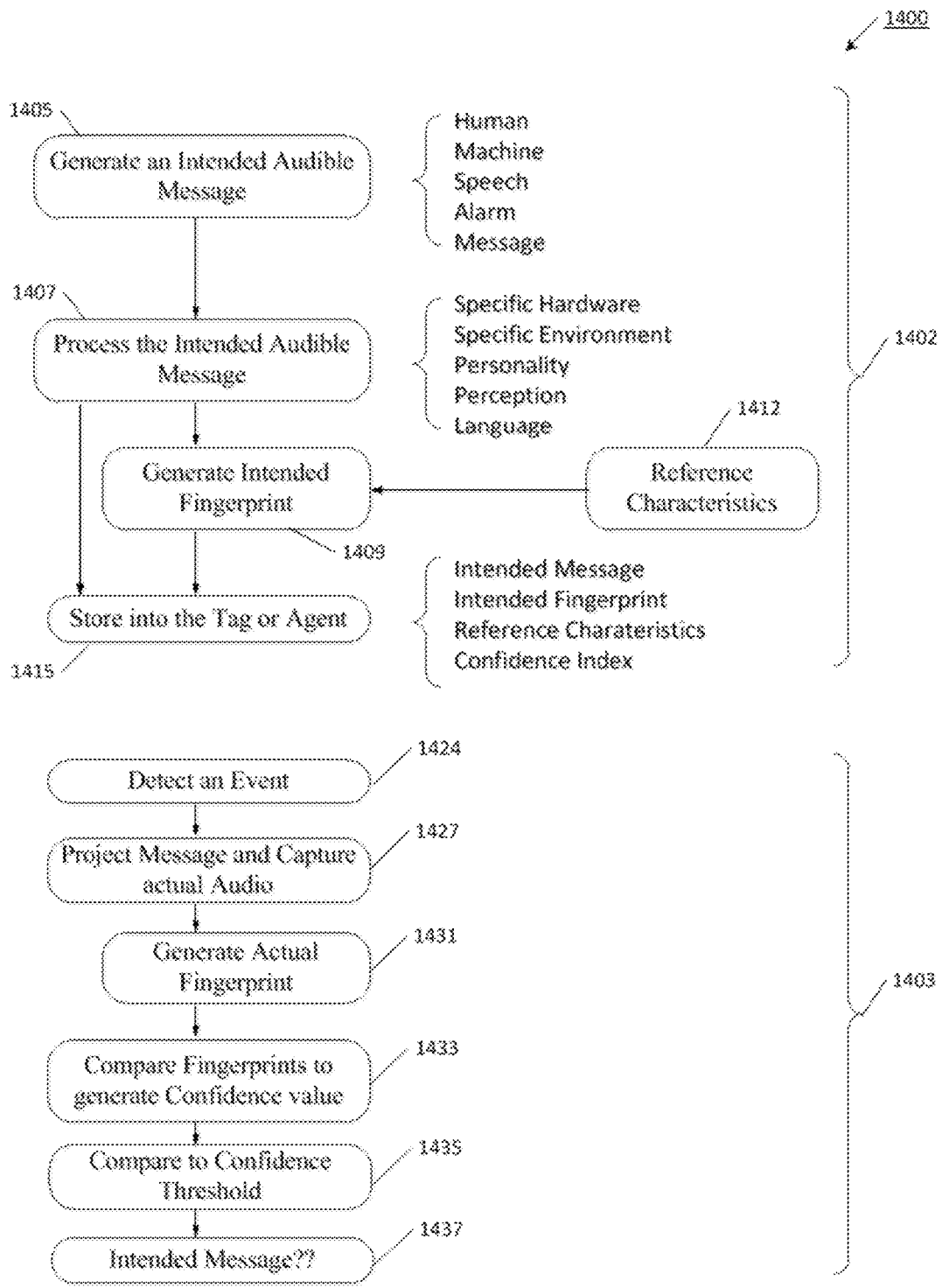
FIG. 49 is a flow chart of method of operating an intelligent audible device in accord with the present invention.

Referring now to FIG. 49, a method 1400 is illustrated. Method 1400 has a first part 1402 which is used prior to projecting the sound into the actual environment, and a second part 1403 which is used as or after the sound has been projected. In method 1400 and intelligent audible device generates an intended audible message as shown in block 1405. This message may be intended for human perception in the form of an alarm, speech, or message, it may also be intended to non-humans, such as animals or to a machine. It will be understood that the intended audible message may take a wide variety of forms. The intended audible message is then processed as shown in block 1407. The message is processed according to the specific hardware used for generating and capturing the message, such as the speaker and the microphone. It can also be processed for the specific environment that the audible message will be projected in.

Once the audible message has been processed for its intended environment, a fingerprint, signature, or profile is generated as illustrated in block 1409. In generating the fingerprint, a set of reference characteristics 1412 may be used. These reference characteristics may be, for example, using only certain frequencies or amplitudes in generating the fingerprint, or may set the particular sampling and algorithmic processes used for generating the fingerprint. In some cases, the reference characteristics may include inaudible sound, such as an audible watermark or stenographic mark. Once the fingerprint has been generated, it may be stored in the intelligent audible device as shown in block 1415. The intended message, reference characteristics, and a confidence threshold may also be stored.

When an event has been detected as shown in block 1424, the sound will be generated and projected into the actual environment as shown in block 1427. As described earlier, the event can be anything from an internal clock to sensing an external event. Just prior to, or concurrent with, the intended message being projected into the environment, the intelligent audible device will activate its audio input transducer or capture device to capture the actual audible message as shown in block 1427. This captured audio is then used to generate an actual fingerprint shown in block 1431. The same analytic processes is used for creating the intended fingerprint are used, and in most cases, the reference characteristics 1412 that were used to generate the intended fingerprint are also used to generate the actual fingerprint 1431. The intended fingerprint is then compared to the actual fingerprint to generate a confidence value as shown in block 1433. This confidence value is a numeric indication of the closeness of fit between the intended fingerprint and the actual fingerprint. In block 1435 the numeric confidence value is compared to the predefined confidence threshold. If the confidence value exceeds the confidence threshold, then it is determined that the message that was actually projected was the intended message, as illustrated in block 1437.

Referring now to FIG. 50, method 1450 is illustrated. In a method 1450, the process as described with reference to FIG. 49 has created a confidence value, and in block 1452 that confidence value is being compared to a predefined confidence threshold. If the confidence value is below the confidence threshold, then it is determined that the intended message has not been projected into the environment 1453. However, if the confidence value is at or above the confidence threshold, then it is determined that the intended message has been projected into the environment 1468. In the case when the intended message has not been properly or perceptibly projected 1453, then the system may store certain information for later use, such as the actual captured sound, the captured digital signature, and the confidence value, as shown in block 1455. The system may also set off an alarm as shown in block 1457, or communicate a message to a remote location as shown in block 1459. This communication may be immediate through a wired or wireless communication circuitry, or may be stored and communicated at a later time. In another example, the intelligent audible device may have a built-in visual display which may be changed to visually indicate that the audible message was not projected properly, as shown in block 1462. In another example, the alarm may be activated if the visual display failed verification. Further, the method 1450 may adjust the determination process as shown in block 1464. In this way, the next time a sound is to be projected, the system may be adjusted for improved projection of the intended message, as shown in block 1464. In a similar way, block 1466 shows that the system can adjust the actual audible message according to the reasons that the intended message was not properly projected. For example, if the system determines that the environment is unusually noisy, then the message may be lengthened or repeated, or enhanced to give the listener a better opportunity to hear the message.

In the case when the intended message was projected 1468, the intelligent audible device again may store the captured sound, the captured fingerprint, and the confidence measure for later use, as shown in block 1470. In a similar way, and alarm may be set off a shown in block 1472, or a message may be communicated as illustrated in block 1473. Additionally, if a display is present, the display may be updated to show that the particular sound has been properly projected.

Intelligent audio devices may dynamically optimize, localize or otherwise modify audible messages to facilitate detection, conversion and interpretation of audible messages (e.g., in response to monitored environments). Intelligent audio devices may insert or combine audible messages with audible and inaudible stenographic marks and watermarks (1) prior to, or concurrent with projection of an audible message (e.g. a prerecorded sound file), (2) during generation of an audible message (dynamic insertion) or post detection of an audible message (e.g. to uniquely identify the intelligent audio device, date/time, location etc. where generated or detected). Intelligent audio devices may include circuitry and devices to detect, convert and interpret the presence of items proximate the intelligent audible device that interfere with the acoustic path and thus the perceptibility or detectability of audible messages, such as, but not limited to sensor(s) (e.g. light), and appropriate to the method, a signal generator (e.g. optic, acoustic etc.), and rangefinders.

Additionally, intelligent audio devices may include circuitry for detecting relative motion between the intelligent audio device and proximate items (or surroundings) to, for example, adjust for frequency in projected message. Intelligent audio devices may contain memory and logic configured appropriately for specific stakeholders to set one or more audible messages (e.g. stored in memory, often immutable once set). Intelligent audio devices may contain logic (optionally immutable) to select from a database of stored audible messages in response to different events. Intelligent audio devices may also contain logic and communication capability to retrieve audible messages via live communication with a remote source.

Audible messages may be compressed digital sound files or text files (for synthesized output). Audible messages may be dynamically altered/adapted in anticipation of, or in response to, events and monitored conditions (e.g. intensity, duration, frequency, pattern, etc.). The functions of an intelligent audio device, e.g. generation, detection, conversion and interpretation of audible messages, are advantageously immutable, and set in the intelligent audio device. However, they may be distributed in the intelligent audio device and remote systems. Conversion and interpretation for example may be conducted remotely (e.g. detected audible profiles transmitted to an external location for processing).

Projected sound is not persistent, thus it is helpful to think of audible messages as having "audible periods" (or "projection periods")—the intended or actual length/time over which the audible message is projected), as well as detection periods, that is, the length or time the detection circuitry is operable.

Detection periods are advantageously initiated to precede the audible period or to span the audible period. They may also be periodic, random or follow set sequences. Elapsed, relative or absolute time, are advantageous in determining:

the length of time the intended audible message was actually projected, the time when the audible message was actually projected, and the period of time when the audible message was perceptible.

Detection may occur at predetermined or random times. Detection may also be dynamic (e.g. occur in response to 'event's such as those previously described). Detection may be synchronized with the start/initiation of the audible message. The intelligent audio devices actions of projecting and determining audible messages may be concurrent (e.g. both triggered by the same event), however, it is often advantageous to space them temporally. In one embodiment for example: an event triggers detection, followed by generation of an audible message, followed by termination of the audible message, followed by termination of detection.

In addition to ensuring that the detection period spans the entire audible period, the above sequence would also allow the intelligent audio device to detect (sense/monitor) the intelligent audio devices acoustic environment and adapt the projecting of the audible message (e.g. increase volume) or aid in the detection process (e.g. noise cancellation). The outcome of the detection and conversion, and advantageously the interpretation process, may be used to provide internal feedback to improve the generation and detection of audible messages. It may also be used as a "learning system" either local/internal or remotely with results from multiple intelligent audio devices.

Advantageously, a multitude of intelligent audio devices may also be grouped or nested depending on the application. The intelligent audio devices could have the same configuration and capabilities, but may also be different (e.g., they may have different types of sensors and be able to react to different types of triggers). Some or all of the grouped intelligent audio devices could, for instance, respond to secondary events (yielding in secondary projected messages) by re-projecting the message of a specific intelligent audio device or other specific message in response to a triggered primary event occurring in the specific intelligent audio device. Furthermore, depending on the primary projected message, the secondary projected messages could be optimized for the particular environment (with knowledge of the intended [primary] projected message through a network).

In one embodiment, an audio file is created containing an audible message (audible message file). Note that the steps below would typically be taken using an appropriately configured external device and application(s), however they could also be taken by an appropriately configured intelligent audio device.
1. An "intended" audible message is generated and digitally processed to enhance perception and determination. E.g. for
    a. Hardware (e.g. speaker and microphone) specific to an intelligent audio device
    b. Anticipated (or detected) environments the intelligent audio device is likely to encounter
    c. Personality (e.g. voice, language, sound etc.)
    d. Perception (e.g. taking into account psychoacoustics)
2. A "reference" digital fingerprint of the intended audible message is generated
    a. For example, specific values or ranges for amplitude of the sound at different frequencies at a series of moments in time during the audible message.
3. The intended audible message and the digital reference fingerprint of the intended audible message are set into the intelligent audio device.
4. Also set in the intelligent audio device is a "confidence index": parameters corresponding to the level of 'confidence' in the perceptibility of the audible message based on a comparison between the intended audible message and the actual audible message (as determined using their respective digital fingerprints).

In response to an event as determined by the intelligent audio device, the intelligent audio device:
A. Detects the characteristics of the audible message used to create the reference digital fingerprint (e.g. amplitude of the sound at a specified frequency and time)
B. Converts the detected characteristics into an "actual" digital fingerprint
C. Interprets the actual digital fingerprint by comparing it to the reference digital fingerprint and generates a corresponding value or set of values.
E. Those values are then compared to the confidence index and a determination is made to verify the perceptibility of the actual audible message.

It will be understood that algorithmic comparisons can compensate, adjust and account for errors in the measured results. Error correction techniques may also be applied. Confidence indexes may be generated/employed by using the detected/measured values, emphasizing specific frequencies to the perceptibility of the audible message, the accuracy of the detection/conversion of the audible message. In some instances, the comparison of measurements corresponding to the intended and measured information will be advantageously conducted off the label at the network level (e.g., to enable 3rd party verification/auditing).

In response to the determination of the actual audible message (and confidence in the determination) the intelligent audio device may take a variety actions including for example: Storing the result for later access or generating an alarm (visible, audible or wireless signal).

The intelligent audio device processor in conjunction with an appropriate confidence index may also include measures of proximity to items that influence the perceptibility of the actual audible message. While audible is the typical output of interest, in certain applications inaudible output generation and detection are desirable (e.g. outside the human range): silent alarms, range for dogs or machines, higher sensitivity or optimized total power. Concurrent audible messages of different frequency ranges may also be advantageous, e.g. one human perceptible and another machine perceptible, or one human and one animal perceptible. It will be understood that the audible message may be optimized by emphasizing frequencies that are known to be of high perception value, selecting frequencies with a higher likelihood of being perceived in a noisy environment, or for perception in a particular language.

Noise cancellation may advantageously be done once the message has been positively confirmed and its intended reference audio stream has been subtracted from the captured message. Applying advanced sequence models such as Hidden Markov and neural network based models may provide advantageous results.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. An intelligent audible device, comprising:
a processor;
a power source;
an event generator constructed to generate an event signal responsive to an event;
a message generator constructed to generate a message signal responsive to the event signal, the message signal corresponding to an intended audible message;
an audio output transducer constructed to project, responsive to the message signal, the intended audible message;
an audio input transducer constructed to capture, responsive to the event signal, a sample of the actual sound projected by the audio output transducer; and
a message determinator that is constructed to determine if the intended audible message was properly projected by the audio output transducer.

2. The intelligent audible device according to claim 1, further including communication circuitry.

3. The intelligent audible device according to claim 1, further including location circuitry.

4. The intelligent audible device according to claim 1, further including an environmental sensor.

5. The intelligent audible device according to claim 4, wherein the environmental sensor is a temperature sensor, a shock sensor, a vibration sensor, a motion sensor, a pressure sensor, a strain sensor, a chemical sensor, a radiation sensor, a humidity sensor, an acoustic sensor, or a light sensor.

6. The intelligent audible device according to claim 1, further including a visual display.

7. The intelligent audible device according to claim 6, further including visual verification circuitry.

8. The intelligent audible device according to claim 1, further including a label actuator.

9. The intelligent audible device according to claim 1, wherein the intelligent audible device is constructed as an intelligent label or tag.

10. The intelligent audible device according to claim 9, wherein the intelligent label or tag is attached to a physical good.

11. The intelligent audible device according to claim 1, wherein the intelligent audible device is constructed as a hardware agent.

12. The intelligent audible device according to claim 1, wherein the message determinator further comprises verification circuitry that is constructed to perform message verification.

13. The intelligent audible device according to claim 12, wherein the message determinator further comprises conversion circuitry that is constructed to convert the sample of the actual captured sound into a digital representation of the actual captured sound to be used in the performance of the message verification.

14. The intelligent audible device according to claim 1, wherein the message determinator further comprises verification circuitry that is constructed to compare the intended message to the actual captured sound.

15. The intelligent audible device according to claim 1, wherein the message determinator further comprises verification circuitry that is constructed to verify that the actual sound sample has a sufficient closeness in fit to the intended audible message.

16. The intelligent audible device according to claim 1, wherein the message determinator further comprises verification circuitry that is constructed to verify that the actual sound sample has a sufficient closeness in fit to the message signal.

17. The intelligent audible device according to claim 1, wherein the message determinator further comprises interpretation circuitry that is constructed to extract a higher order meaning from the actual sound sample.

18. The intelligent audible device according to claim 1, wherein the higher order meaning is a pattern, a variation, a frequency change, a cadence change, starting time of the sound, the stopping time of the sound, or the duration of the sound.

19. A method of determining if an intelligent audible device properly projected an intended audible message, comprising:
detecting an event;
generating an intended audible message;
projecting the intended audible message responsive to the event;
capturing an actual sound sample of the projected audible message responsive to the event;
interpreting the captured actual sound sample to extract a higher order meaning from the actual sound sample; and
determining, using the extracted higher order meaning, if the intended audible message was properly projected.

20. The method according to claim 19, further comprising the steps of:
generating an intended signature of the intended audible message;
generating an actual signature of the actual sound sample; and
wherein the determining step includes comparing the intended signature to the actual signature.

21. The method according to claim 19, further comprising the step of processing the intended audible message according to the expected conditions at the time or place that the intended audible message will be projected.

22. The method according to claim 19, wherein the intended audible message is a tone, an alarm, a human recognizable message, a machine recognizable message, or an animal recognizable message.

23. The method according to claim 19, wherein the event is an actual time or an elapsed time.

24. The method according to claim 19, wherein the event is sensed by an environmental sensor.

25. The method according to claim 24, wherein the environmental sensor is a temperature sensor, a shock sensor, a vibration sensor, a motion sensor, a pressure sensor, a strain sensor, a chemical sensor, a radiation sensor, a humidity sensor, an acoustic sensor, or a light sensor.

26. The method according to claim 19, wherein the event is receiving an external message using communication circuitry.

27. The method according to claim 19, wherein the event is a position location using location circuitry.

28. The method according to claim 19, further including the step of storing the intended audible message in the intelligent audible device.

29. The method according to claim 19, further including the step of generating an alarm signal, communicating a message, or modifying a display responsive to the determining step.

30. The method according to claim 19, further including the step of verifying a visible message on a display.

31. The method according to claim 30, further including the step of generating an alarm signal, communicating a message, or modifying a display responsive to the step of verifying a visible message.

32. A method of verifying that an intelligent audible device audibly projected an intended message, comprising:
receiving an intended message;
processing the intended message into an intended audible message with its audible features set according to the expected conditions at the time or place that the intended message will be projected;
generating an intended signature of the processed intended audible message;
detecting an event;
projecting the intended audible message responsive to the event;
capturing an actual sound sample responsive to the event;
generating an actual signature of the actual sound sample;
comparing the intended signature to the actual signature; and
determining if the intended audible message was properly projected.

33. The method according to claim 32, wherein generating the actual signature includes using the start, stop, or duration times of the projected intended audible message.

34. The method according to claim 32, wherein generating the intended signature includes using reference characteristics that define frequencies of enhanced interest.

35. The method according to claim 34, wherein generating the actual signature includes using the reference characteristics.

36. The method according to claim 34, further including the step of generating a numerical confidence value reflecting the closeness of fit between the intended signature and the actual signature.

37. The method according to claim 36, further including the step of comparing the confidence value to a stored confidence index threshold value.

38. The method according to claim 32, further including the step of modifying a display responsive to determining if the intended audible message was properly projected.

39. The method according to claim 32, further including the step of sending a message responsive to determining if the intended audible message was properly projected.

40. The method according to claim 32, further including the step of storing the intended audible message, storing the actual sound sample, storing the intended signature, storing the actual signal, or storing the results of the comparison responsive to determining if the intended audible message was properly projected.

41. A method for supporting a transaction or event, comprising:
receiving a message containing audible information that was generated by an intelligent audible device, the audible information verifying whether or not the intelligent audible device projected an intended audible message into its local environment; and
using the message to effectuate the transaction or event.

42. The method according to claim 41, wherein the message further contains visual information generated by an intelligent audible device with a visible display, the visual information indicating whether the intelligent audible device presented an intended visual message, and using the message to effect the transaction or event.

43. A method of verifying that an intelligent audible device audibly projected an intended audible message according to an intended message;
providing an intended message
generating the intended audible message according to the intended message;
detecting an event;
projecting audibly the intended audible message responsive to the event;
capturing, responsive to the event, a signal indicative of the projected sound;
comparing the intended audible message to the captured signal;
determining if the intended audible message was properly projected; and
verifying that the captured signal projected the intended message.

44. The method according to claim 43 where the capturing step includes using an electrical sensor to detect a change in voltage, current, or capacitance due to the projected sound.

45. The method according to claim 43, further comprising the steps of:
generating an intended signature of the intended audible message;
generating an actual signature using the captured signal; and
wherein the determining step includes comparing the intended signature to the actual signature.

46. The method according to claim 43, further comprising the step of processing the intended audible message according to the expected conditions at the time or place that the intended audible message will be projected.

47. The method according to claim 43, wherein the intended audible message is a tone, an alarm, a human recognizable message, a machine recognizable message, or an animal recognizable message.

48. The method according to claim 43, wherein the event is an actual time or an elapsed time.

49. The method according to claim 43, wherein the event is sensed by an environmental sensor.

* * * * *